US000001506H

United States Statutory Invention Registration [19]

[11] Reg. Number: H1506

Beretta

[45] Published: Dec. 5, 1995

[54] GRAPHICAL USER INTERFACE FOR EDITING A PALETTE OF COLORS

[75] Inventor: Giordano B. Beretta, Palo Alto, Calif.

[73] Assignee: Xerox Corporation, Rochester, N.Y.

[21] Appl. No.: 805,691

[22] Filed: Dec. 11, 1991

[51] Int. Cl.[6] ..... G09G 1/28

[52] U.S. Cl. ..... 345/199; 345/186

[58] Field of Search ..... 340/703, 701; 358/75, 80; 345/186, 199

[56] References Cited

U.S. PATENT DOCUMENTS

| | | | |
|---|---|---|---|
| 4,488,245 | 12/1984 | Dalke et al. | 358/80 |
| 4,694,286 | 9/1987 | Bergstedt | 304/703 |
| 4,721,951 | 1/1988 | Holler | 340/701 |
| 4,958,220 | 9/1990 | Alessi et al. | 358/76 |
| 4,972,257 | 11/1990 | Birnbaum et al. | 358/80 |
| 4,985,853 | 1/1991 | Taylor et al. | 364/521 |

FOREIGN PATENT DOCUMENTS

| | | | |
|---|---|---|---|
| 0313796 | 5/1989 | European Pat. Off. | G06F 3/023 |
| 0403081 | 12/1990 | European Pat. Off. | G09G 1/28 |
| 0448250 | 9/1991 | European Pat. Off. | H04N 1/46 |

OTHER PUBLICATIONS

Apple Computer, Inc., Macintosh Reference, Chapter 7, "Customizing Your Macintosh", pp. 253–257, 1991.

McEndarfer, Edward M., "*An Interactive System for the Study and Teaching of Color Theory*", Ph.D Dissertation, University of Kansas, 1989, available from UMI, Ann Arbor, Mich., Order No. 9024188.

Microsoft *PowerPoint, Desktop Presentations Program*, User's Manual, Microsoft Corporation, Redmond, Washington, 1989, pp. 326–340.

Stone, M. C., "Color, Graphic Design, and Computer Systems", *COLOR research and application*, vol. 11, Supplement 1986, pp. S75–S82.

Guitard, R., and Ware, C., "A Color Sequence Editor", *ATM Transactions on Graphics*, Jul. 1990, 9:3, pp. 338–341.

Robertson, P. K., "Perceptual Color Spaces—Visualizing Color Gamuts: A User Interface for the Effective Use of (List continued on next page.)

*Primary Examiner*—Bernarr E. Gregory
*Attorney, Agent, or Firm*—Judith C. Bares

[57] ABSTRACT

A graphical user interface is disclosed for interactively editing a palette of colors in response to signals from a user, such as from a pointing device. The interface provides a color space in a color space window on the user's display and draws each color in the palette in its current location in the color space, thereby showing the relationship of each color in the palette with other colors in the palette. The interface stores all color representations as device independent color specifications in the uniform color space. The user edits a color by moving it from its current location to a destination location, or by changing its lightness coordinate. The graphical user interface also provides for storing a plurality of colorimetrically measured colors representing the display gamut. When the user edits a color, a gamut clipping process ensures that the modified color is producible in the display gamut. The user may select a color space from several color spaces available for display in the color space window, and may flexibly and conveniently display and edit the palette of colors to any of the available color spaces. One of the color spaces available is the uniform CIELAB color space. Another color space available displays a histogram of palette color lightness frequencies.

12 Claims, 34 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Perceptual Color Spaces in Data Displays", *IEEE Computer Graphics & Applications,* Sep. 1988, pp. 50–64.

Hedin, C–E., and Derefeldt, G., "Palette—A color selection aid for VDU images", *Perceiving, Measuring, and Using Color, Proceedings of SPIE,* Santa Clara, Calif., Feb. 1990, vol. 1250, pp. 165–176.

Hansen, R., "Breaking the Color Barrier", *Computer Graphics World,* Jul. 1990, pp. 39–48.

Beretta, G. B., "*A New Approach to Imaging IC Layout and Schematics",* Xerox Palo Alto Reaearch Center, EDL–88–3, 1988.

"Electronics for Imaging: Quality Color on the Desktop", *The Seybold Report On Desktop Publishing,* Oct. 3, 1990, pp. 16–22.

COLOR: "*Universal Language and Dictionary of Names",* U.S. Department of Commerce, National Bureau of Standards, Washington, D.C., Special Publication 440, 1976, pp. 1–14.

"*Color Encoding Standard,"* Chapter 2; Chapter 3, Section 3.1; and Chapter 6, Section 6–3; published by Xerox Corporation, Xerox Systems Institute, Sunnyvale, Calif. XNSS 289005, May 1990.

Hunt, R. W. G., "*Measuring Colour",* John Wiley & Sons, 1987, Chapter 5, pp. 114–116, and Chapter 6, pp. 131–139.

Meyer, G. W., and Greenberg, D. P., "Perceptual Color Spaces for Computer Graphics", *Color and the Computer,* H. J. Durrett, ed., Academic Press, 1987, pp. 83–100.

Thorell, L. G., and Smith, W. J., "*Using Computer Color Effectively",* Prentice–Hall, 1990, Chapter 9, pp. 159–184.

"*Raster Gaphics Handbook",* Conrac Corp., Covina, Calif., 1980, pp. A3–1–A3–37.

Hunter, R. S., and Harold, R. W., "*The Measurement of Appearances",* John Wiley & Sons, 2nd Ed., 1987,Chapters 7–9, pp. 95–165.

Wyszecki, G., and Stiles, W. S., "*Color Science": Concepts and Methods, Quantitative Data and Formulae,* 2nd ed., John Wiley & Sons, 1982, Table 1(3.3.2) at pp. 738–747.

Taylor, Joann M., Murch, Gerald M., and McManus, Paul A., "TekHCV™: A Uniform Perceptual Color System for Display Users", *Proceedings of the SID,* vol. 30/1, 1989, pp. 15–21.

Murch, Gerald M. and Taylor, Joann M., "Sensible Color", *Computer Graphics World,* Jul. 1988, pp. 69–72.

Beretta, G. B., "*Selecting Colors For Representing VLSI Layout",* Xerox Palo Alto Research Center, EDL–88–7, Dec., 1988.

Bauersfield, Penny F., and Slater, Jodi L., "User–Oriented Color Interface Design: Direct Manipulation of Color in Context", *Proceedings of CHI '91 Human Factors in Computing Systems,* New Orleans, La., Apr. 1991, pp. 417–418.

Bauersfield, Penny F. and Price, Elaine, "The 3D Perceptual Picker: Color Section in 3D", *Digest of Technical Papers* vol. XXI, SID International Symposium, Las Vegas, 1990, pp. 180–183.

GRAPHICAL USER INTERFACE FOR EDITING A PALETTE OF COLORS

BACKGROUND OF THE INVENTION

This invention relates generally to color display and reproduction systems and, more particularly, to a graphical and interactive user interface for assessing and modifying palettes of colors produced on such systems.

This is one of two commonly assigned and concurrently filed United States patent applications of the named inventor. The other application relates to a "Graphical User Interface for Controlling Color Gamut Clipping", Ser. No. 07/805,224, now U.S. Pat. No. 5,416,890.

Increasingly affordable and available computer controlled color display and reproduction systems will promote wider use of color in document-intensive industries or document-intensive functional areas of enterprises. Using color effectively in environments that support diverse color systems to produce color display and printed materials requires reducing the complexity of color specification so that the occasional as well as the expert color user may select, modify, and apply color aesthetically and appropriately for its intended use.

Some color specification systems utilize a device dependent color classification model which provide color descriptor classifications that are derived from, and which control, associated physical devices. Such device dependent color classification models include the additive red, green, and blue (RGB) phosphor color model used to physically generate colors on a color monitor, and the subtractive cyan, magenta, and yellow, plus black (CYMK) color model used to put colored inks or toners on paper. These models are not generally correlated to a human color perceptual model. This means that these device dependent color models provide color spaces that treat color differences and changes in incremental steps along color characteristics which are useful to control the physical devices but which are not validly related to how humans visually perceive or describe color. Furthermore, considerable trial and error may be required to select a specific color or to achieve a desired color modification because the color model and its color space representation is not uniform to the user, and a large change in one or more of the physical descriptors of the color space, such as in the R, G, or B dimensions, will not necessarily result in a correspondingly large change in the perceived color.

Other color models exist which are geometric representations of color, based on the human perceptual attributes of hue, saturation, and value (or brightness or lightness) dimensions (HSV). While providing some improvement over the physically based RGB and CMYK color models, these color specifications are conveniently formulated geometric representations within the existing physically based color models, and are not psychophysically validated perceptually uniform color models.

The nonuniformity of the underlying color model directly impacts the effectiveness of a color selection and editing user interface. A color selection and editing user interface provides the control and communications link between the system user and the underlying color model. The interface provides a color space in which the user selects and edits colors. A color space is a pictorial or graphical representation or construction of a color model, visually showing the mathematical representations of colors. User interfaces based on conventional nonuniform color models generally limit user editing functions to selecting colors from fixed palettes of colors or to providing a mechanism by which the user may create and modify colors by specifying percentages of certain primary colors, either via text input, or by manipulating graphical tools such as sliding color bars, or color wheels.

Color selection user interfaces using nonuniform color models are those typically provided with personal computer business graphics software. One such representative color selection tool is provided with PowerPoint™ software from Microsoft Corporation of Redmond, Washington. PowerPoint™ is software for planning, composing, and creating presentations. The User's Manual for the software designed for use on certain Apple® Macintosh™ computers discloses at pp. 326–340 a window-based user interface with a menu for selecting the presentation's color scheme. A color scheme dialog box allows the user to select a presentation color scheme from preset color schemes of eight colors. To add colors to the color scheme or modify an existing color, the user selects colors from a color chart of eighty eight colors, or from a color wheel by dragging a cursor around the wheel until the desired color appears in a rectangular box in the dialog window.

Brief descriptions of several types of color models and color selection tools are also provided in Stone, M., "Color, Graphic Design, and Computer Systems", *Color Research and Application,* Vol. 11 (Supplement), pp. S75–S82, 1986 (hereafter, "Stone, 'Color, Graphic Design, and Computer Systems'"). Additional computer controlled color editing systems are disclosed in Guitard and Ware, "A Color Sequence Editor", ACM *Transactions on Graphics,* 9:3 (July 1990), at pp. 338–341; in Bergstedt, U.S. Pat. No. 4,694,286, entitled "Apparatus and Method for Modifying Displayed Color Images", and in Holier, U.S. Pat. No. 4,721,951, entitled, "Method and Apparatus for Color Selection and Production".

In particular, Bergstedt discloses, in U.S. Pat. No. 4,694,286, an apparatus and method which permit selection of colors for display, and modification of displayed colors. A color index is associated with each pixel of a displayed image. Upon positioning of a cursor at a pixel of a displayed image, the user may modify the hue, lightness, and saturation of the color associated with the color index of that pixel location, thus modifying all pixels in the image having the color associated with the color index. Modification is accomplished by successive actuation of hue, lightness, and saturation keys on a keyboard input device, in accordance with a hue, lightness, and saturation color cone shown in FIG. 5 therein.

Holier discloses, in U.S. Pat. No. 4,721,951, an apparatus and method wherein a color is selected in the basis of one color characteristic system for implementation in another color characteristic system. Color selection is made from the color characteristic system of hue, saturation and value (referenced as brightness) (HSV) in the preferred embodiment, and is performed interactively with the operator individually selecting hue, saturation and brightness levels from displays which illustrate the effects of changing each of these characteristics. The displays are comprised of a display bar for each of the hue, saturation and brightness color characteristics, with the selected value or level for each characteristic being shown by a vertical black line, or slide marker, which the operator may move to a selected position. The selected values of H, S, and V are converted through the use of appropriate transforms to values of R,G, and B in the red, green, and blue color classification system for display in the current color display.

A uniform color space, based on an underlying uniform color model, attempts to represent colors for the user in a way that corresponds to human perceptual color attributes that have been actually measured. Using a device independent and uniform color model as a basis for specifying and manipulating color provides a foundation for more user control, accuracy, and precision in color selection and editing, since color specification is not tied to the physical characteristics of a particular color rendering device. One such device independent color specification system is that developed by the international color standards group, the Commission Internationale de l'Eclairage (the "CIE"). CIE color specification employs device independent "tristimulus values" to specify colors and to establish device independent color models by assigning to each color a set of three numeric tristimulus values according to its color appearance under a standard source of illumination as viewed by a standard observer. Each set of X, Y, and Z tristimulus values represents a color according to its spectral power distribution, as a summation of the color contributions of all wavelengths within the spectral distribution of a color sample, corrected for the light source used to illuminate the colored sample and for the color sensitivity of the standard observer. The CIE has recommended the use of two approximately uniform color spaces for specifying color: the CIE 1976 (L*u*v*) or the CIELUV color space, and the CIE 1976 (L*a*b*) color space (hereafter referred to as "CIELAB" space or "LAB" space).

Some color display and reproduction systems utilize uniform color models. Taylor et. al., in EP 0 313 796 A3, entitled, "Computer display color control and selection system", disclose an interface system for use in selecting and controlling colors in graphics images generated by a computer system. The interface comprises a mechanism and method for displaying a graphical representation of hue, chroma and lightness combinations available based on a color appearance type color space and associated mechanism. The interface provides for a graphical representation which includes a graph of the range of hues in one dimension and a second graph of the range of chroma and value combinations in two dimensions. The preferred embodiment of the interface makes use of a specially defined HVC color space for graphically displaying, representing, and selecting hue, chroma and value combinations for a color with a high degree of perceptual uniformity. The preferred embodiment of the system includes a mechanism for operating the interface in three different modes, providing functions corresponding to picture editing, color map editing, and continuous shading. Picture editing allows an individual color in a graphics image to be edited by positioning a cursor on a pixel in the image associated with the color to select the color for editing. Color map editing allows the color data corresponding to various parts of a graphics image to be directly manipulated. Continuous shading allows a range of colors to be generated between two colors specified by the user for smooth shading applications.

Robertson, P. K., in "Visualizing Color Gamuts: A User Interface for the Effective Use of Perceptual Color Spaces in Data Displays", *IEEE Computer Graphics & Applications,* September, 1988, pp. 50–64, discloses the use of uniform color spaces in computer graphics and image processing applications. Robertson discloses interactively controlled representations of the perceptual color gamuts of color display devices, and how these representations may be of value in color specification and data display. In particular, two-dimensional cross-sectional representations of these gamuts can be used to indicate available colors on a display device and for guiding the choice of color for representing data. Various forms of gamut representations are illustrated, including a leaf structure schematic of a three dimensional gamut of a color monitor, two dimensional cross sections through the CIELUV gamut of a color monitor and CIELAB gamut of a film or print recording device, cross sections of constant lightness through the film or print CIELAB gamut, and superimposed cross sections of constant lightness through the CIELUV gamut of a color monitor and the film or print CIELAB gamut.

An interactive palette selection system is disclosed in Hedin, C. and Derefeldt, G., "Palette—A Color Selection Aid for VDU Images", *Perceiving, Measuring, and Using Color: Proceedings of SPIE,* Vol. 1250, Santa Clara, Calif., Feb. 15–16, 1990, pp. 165–176. A color database of a predetermined number of colors, specified in RGB and tristimulus values, is colorimetrically measured from a color monitor under standard viewing conditions. The database also specifies each color in CIELUV L*, u*, and v* coordinates, chroma ($C^*_{uv}$) and hue ($h_{uv}$) coordinates, and NCS (Natural Color System) notations. A palette of colors can be created from the color database from predefined searches of the color database according to certain restrictions. The palette is displayed around the border of a display screen. The palette can be plotted in various color diagrams such as the NCS hue triangle, and the CIELAB a* -b* plane. The palette can be reduced and sorted, and colors can be selected from the palette and used to change or adjust a portion of a displayed image.

Stone, in "Color, Graphic Design, and Computer Systems", at pgs. S78–79, discloses a tool for color selection in calibrated systems which allows a user to explore a color space model based on X, Y, and Z tristimulus values, mapped into the 1931 Chromaticity Diagram, in the context of a particular device such as a color monitor. The monitor's gamut is defined as a triangle in the x, y plane and only the region inside the triangle is active, automatically constraining the values of x and y. Luminance is controlled separately.

Bauersfield and Slater, in "User-Oriented Color Interface Design: Direct Manipulation of Color in Context", 1991, at pg. 418, column 1, and Bauersfield and Price, in "The 3D Perceptual Picker: Color Section in 3D", 1990, at page 182, first and second columns, disclose a color selection tool called the 3D Perceptual Picker which uses a three-dimensional visualization based on the Munsell color model for color selection. Bauersfield and Price disclose a color space window containing one "page" of the color model presented to the user for color selection. The user may directly manipulate the model to locate and select colors, with the selected color appearing in a second, selection window. Bauersfield and Slater disclose, at pg. 418 column 1, in the last full paragraph, a color swatch interface device in the same tool for color selection tasks. The sizable and form-adjustable color swatch allows the user to move a shape of the desired color to any location on the screen.

An additional issue in the successful use of color is controlling the color appearance of colors when they are translated from one color reproduction device to another. For purposes of this discussion, a color's appearance will include its color attributes, such as, for example, hue, chroma, and lightness. Device independent color specification facilitates color reproduction among diverse color devices. A device "gamut" includes all of the colors physically producible from the primary colors on a particular device, and may be defined in a device independent form. Different color reproduction devices have different gamuts, and thus, there is no one-to-one color correspondence between device gamuts. The device independent color specification for a color on one device may then be mapped to the same device independent color specification for the corresponding color within the gamut of another device. In devices having automated color correction processes, this mapping generally assumes that the goal of color correction is to produce what is called a "metameric" match between colors.

There are, however, many variables influencing color appearance not taken into account by automated color correction and metameric matching. Preserving certain relationships between colors and achieving consistent and appropriate colors in a document or image may be far more important to the user than a producing metamerically matching colors. In addition, color correction between color systems employing different device dependent models may introduce color appearance errors, depending on the type of automatic correction algorithm used. Automatic correction algorithms, then, which are beyond the control of the color user, may affect the information content or visual effect being conveyed in the document, illustration, drawing, or graph. These color reproduction issues are more completely described by Hansen in "Breaking the Color Barrier", *Computer Graphics World,* July, 1990, pg. 39–48, incorporated herein by reference. Users who want to incorporate color effectively in printed materials need the ability to directly and predictably control color appearance across different color devices, by being able to precisely and easily modify colors on one device for predictable reproduction on another device.

Alessi et. al., U.S. Pat. No. 4,958,220, discloses a color image reproduction apparatus in which an operator may preview on a video monitor, before printing, a reproduced, scanned color image as it would appear on any of a variety of image receptive output media, such as reversal film, or negative film to print material, or reversal film to print material. Each scanned input image is first transformed, via an appropriate look up table from a first set of lookup tables, to a device independent database color space, and from the device independent database color space, via an appropriate look up table from another set of lookup tables, to a selected hard copy representation. The computer-based workstation includes operator control apparatus which enables an operator to interact with the workstation to provide input information, image manipulation commands pertinent to modifying the image displayed, and output information. Image manipulation commands include the ability to independently control color quantities of hue, chroma, and lightness.

The prior art color selection or editing systems previously described which are not based on uniform color models either provide fixed palettes of color for selection, or require a nonintuitive, often unpredictable, approach to achieving a desired color modification because changes in one or more of the physical descriptors of the color space, such as in the R, G, or B dimension, do not necessarily result in a corresponding change in the perceived color. Other prior art color selection or editing systems which are based on uniform color models may be narrowly tailored for specific color selection purposes, such as scientific mapping or adjusting colors for photographic film reproduction, do not provide for complete manual control over color mapping between display and print device gamuts, only provide for single color editing, or do not provide the user with both direct image pixel manipulation and color palette manipulation. In addition, many of the previously described color selection tools do not display an entire palette of colors at one time so that a user may immediately perceive and preserve color relationships among all colors when one color is changed.

What is needed, therefore, is a system and method for color selection and color modification which provides visually intuitive and directly manipulable ways of organizing, managing, and predicting color in the context of a uniform color model. The graphical user interface of the present invention displays an entire palette of colors in a two dimensional view of a uniform color space while permitting the user to edit individual palette colors by directly manipulating the colors in the color space. Thus, the graphical user interface makes explicit to users the relationship among colors in the palette of colors as they are being edited. In addition, the present invention provides a facility for the user to manually control how a color will be reproduced in a given device gamut, on one or more output devices. The graphical user interface also provides support for various user skill levels so that both the experienced graphical artist or designer, trained in the principles of using color effectively and familiar with using the uniform color spaces, as well as the casual user, who may only create or use color illustrations or color documents occasionally, may utilize their respective skill levels, to benefit from an easy and intuitive access to the full range of colors available on the devices being used.

SUMMARY OF THE INVENTION

There is provided in accordance with the present invention a graphical user interface for modifying the appearance of a plurality, or palette, of colors, for use in a color display or reproduction system. The graphical user interface is cooperatively associated with the system's input means for receiving signals from a user, such as a pointing device, and the system's display, such as a color CRT monitor, and comprises a color space window and color space drawing means for drawing in the color space window a color space. An input palette of colors, each represented by a set of color information signals, is retrieved from system memory means and transformed into and stored as device independent color information signals. The color space drawing means draw each color in the palette of colors in a current location in the color space by transforming the color information signals representing each color to a set of colorimetric coordinates defining and locating the color in the color space.

Means, cooperatively associated with the color space drawing means, permit each color in the color space window to be modified, in the context of the other colors in the palette by moving the color from the current location to a destination location in the color space to produce a set of modified color information signals representing a modified color. The modifying means determine a set of modified color information signals for the modified color from the destination location in the color space. Preferably, the color space is a uniform color space in which spatial distances between the displayed colors correspond directly with human perceptual color differences so that movement of the color in the coordinate system of the color space is directly related to uniform perceptual changes in the color. The modifying means also include independent lightness modifying means for modifying the lightness signal of a color in response to signals from the input signal receiving means.

There is also provided a plurality of colorimetrically measured colors representing the gamut of colors reproducible by the display means. The color information signals representing the colors of the display gamut are stored in a device independent color specification. When the user modifies a color in the color space, adjusting means ensure that the set of modified color information signals represent a color that is reproducible in the display gamut.

Another feature of the graphical user interface permits the user to select the color space in which the colors are to be edited from several color spaces available, and to flexibly and conveniently change the display among the available color spaces. One of the color spaces available is the uniform CIELAB color space. The palette of colors is drawn in the two-dimensional rectangular a* and b* coordinate plane of the CIELAB space in the color space display window. Another color space available is a lightness distribution frequency color space. The palette of colors may also be displayed according to their lightness (L*) signals on a lightness distribution frequency graph (histogram) in the lightness distribution frequency color space.

There is also provided a system for modifying the appearance of a plurality of colors. The system comprises a memory means for storing color information signals representing each of the plurality of colors; display means, such as a color CRT monitor, for displaying the plurality of colors; input signal receiving means, such as a mouse device or keyboard, for receiving signals from a user; and color modifying processing means responsive to the input means and cooperatively associated with the display means. The color modifying processing means include color space drawing means for drawing on the display means a graphical representation of a color space in two dimensions, and for drawing the plurality of colors in the color space, each color's color information signals defining the current location of the color in the color space. The color modifying processing means also include modifying means for modifying any one color in the color space, in response to the user signals received from the input means. The modifying means include moving means for moving the color from the current location to a destination location in the color space to produce a modified color, the color information signals of the modified color being defined by the coordinates of the destination location of the modified color in the color space. The modifying means also include lightness modifying means for modifying the lightness signal of each color in response to input signals received from the input signal receiving means. The system also provides for storing color information signals for a plurality of colorimetrically measured colors representing the gamut of colors reproducible by the display means. When a color in the color space is modified in response to signals received from the input signal receiving means, adjusting means ensure that the set of modified color information signals represent a color that is reproducible in the display gamut.

Another aspect of the system permits the user to select the color space in which the colors are to be edited from several color spaces available, and to flexibly and conveniently change the display among the available color spaces. One of the color spaces available is the uniform CIELAB color space. The palette of colors is drawn in the two-dimensional rectangular a* and b* coordinate plane of the CIELAB space in the color space display window. Another color space available is a lightness distribution frequency color space. The palette of colors may also be displayed according to their lightness (L*) signals on a lightness distribution frequency graph (histogram) in the lightness distribution frequency color space.

There is also provided a method for modifying the appearance of a plurality of colors in a color display system having input means for receiving signals from a user, a display device, and a memory for storing color information signals representing a plurality of colors. The method comprises the steps of drawing on the display device a graphical representation of a color space in two dimensions, plotting each color in a current location in the color space, modifying one of the plurality of colors drawn in the color space, in response to the user signals received from the input means, by moving the color from the current location to a destination location in the color space, and storing the modified color information signals in the color display system memory. The color space is preferably a uniform color space, such as the CIELAB space. The coordinates of the current location in the color space are defined by the color information signals of each color, and a modified color is defined by the coordinates of the destination location which define a set of modified color information signals representing the modified color.

In another aspect of the color modifying method of the present invention, the color information signals defining each color in the color space includes a lightness signal, and the modifying step further includes a lightness modifying step for modifying the lightness signal of the color drawn in the color space in response to signals received from the input signal receiving means.

In another embodiment of the method for modifying color appearance in a color display system, the method includes the step of colorimetrically measuring a plurality of colors representing the gamut of colors reproducible by the display device, storing the measured display gamut in the display systems memory, and performing an adjusting step, before storing the set of modified color information signals representing the modified color, of adjusting the modified color information signals to represent a reproducible color in the display gamut.

Other aspects of the present invention will become apparent as the following description proceeds and upon reference to the drawings and tables.

Figure 1:
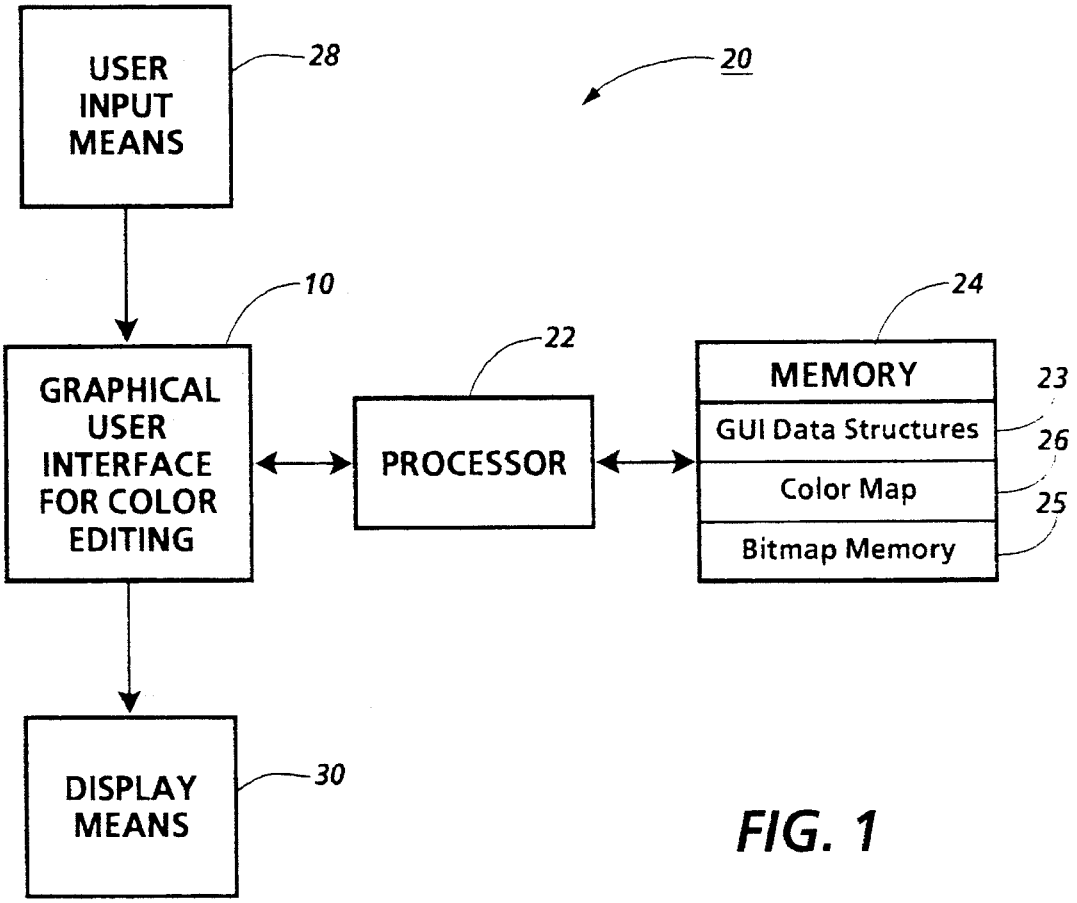
FIG. 1 is a functional block diagram illustrating a computer controlled system suitable for implementing the present invention.

While the present invention will hereinafter be described in connection with an illustrated embodiment, it will be understood that it is not intended to limit the invention to that embodiment. On the contrary, it is intended to cover all alternatives, modifications and equivalents as may be included within the spirit and scope of the invention as defined by the appended claims. During the following description of the features of the present invention, reference is made to the drawings in which like references have been used throughout to designate identical elements.

Table of Contents of Detailed Description

A. System Environment
  1. System Components
  2. Graphical User Interface Implementation
B. Overview of Screen Displays and User Interaction
  1. The Color Space Window and Menu Selection
     TABLE 1: Selecting A Color Space For Display
  2. Displaying a Palette of Colors
  3. Editing a Palette of Colors
  4. Constraining Colors Within a Gamut and Clipping Colors Between Color Device Gamuts
     TABLE 2: Measured Thermal Transfer Printer Gamut Values
  5. Modifying a Color's Lightness Signal
C. Color Spaces Available for Color Editing
  1. The 1931 CIE Chromaticity Diagram
     EQUATIONS (1), (2), (3) & (4)
     TABLE 3: Reference Numerals and Color Names in FIGS. 13 & 15
  2. The 1976 Uniform Chromaticity Scale Diagram
  3. The 1976 CIE 1976 (L*a*b*) Color Space
     EQUATIONS (5), (6), (7), (8) & (9)
  4. Transformations Between Physical Device Color Specifications and Tristimulus Values
D. Overview of Process Flow
  1. Initialization Procedures
     a. Defining Windows and Menu Procedures
     b. Computing Display Device Calibration Matrices
     c. Initializing Gamut and Spectrum Locus Data
  2. User Input Signal Processing and Basic Process Flow
E. Detailed Process Flow: Retrieving Input Color Palettes
  1. Retrieving and Displaying a Stored Input Color Palette -continued Table of Contents of Detailed Description 2. Editing a Color Palette Directly From Another Application
F. Detailed Process Flow: Painting the Color Space Window
1. Selecting a Color Space For Editing
2. Formatting the Spectrum Locus Trajectory
3. Selecting and Formatting a Gamut For Display
4. Painting the Color Space Window
a. Sizing the Window, and Drawing the Gamut and Spectrum Locus
b. Plotting the Colors in the Palette
c. Painting the Histogram Color Space
G. Detailed Process Flow: Editing a Color in the Monitor's Gamut
1. Initializing a Gamut Data Structure
2. Selecting and Identifying a Color
TABLE 4: Requesting Color Editing Functions
3. Moving a Color in the Monitor's Gamut
4. Making a Color Lighter or Darker
H. Detailed Process Flow: Constraining a Color Within a Gamut and Gamut Clipping
1. Constraining a Color Within a Gamut
TABLE 5: CONSTRAINT and INTERSECT Procedures
2. Moving a Color to Another Gamut
a. Lightness Clipping in the Device Gamut
TABLE 6: Gamut Clipping Procedure: CLIP LIGHTNESS
TABLE 7: Gamut Clipping Procedure: MAXLIGHTNESS
TABLE 8: Gamut Clipping Procedure: MINLIGHTNESS
b. Chroma Clipping in the Device Gamut
TABLE 9: Gamut Clipping Procedure: MAXCHROMA
I. CONCLUSION
Appendix A:
Table A.1: Menu & Function Selection
Table A.2: Palettes Data Structure - Palette Data
Table A.3: Palettes Data Structure - Color Space and Gamut Data
Table A.4: Palettes Data Structure - Calibration and Window Manager Data
Table A.5: Miscellaneous Data Structures

DETAILED DESCRIPTION OF THE PREFERRED EMBODIMENTS

A. System Environment

1. System Components

FIG. 1 is a simplified functional block diagram illustrating the components of a computer controlled color rendering system 20 (hereinafter, "system 20") of the type suitable for implementing the color editing graphical user interface of the present invention. System 20 may be a standalone system, such as a microcomputer-based desktop publishing system. It is also intended, however, that system 20 may be a subsystem of, or included within, a broad range of color rendering systems providing for operator control of color editing and adjustment, including but not limited to such devices as color copiers, various types of digital color printers, platemaking systems for color offset printing, and color video, film or transparency processing devices. Thus, the components of system 20 may also perform other functions not described in detail below, and interact with other system components not illustrated in FIG. 1.

As illustrated in FIG. 1, the components of system 20 include a processor 22, display means 30, and at least one memory device 24. Memory device 24 provides storage for program instructions in program memory (not shown) and for data in data memory (not shown) needed for the implementation of the color editing graphical user interface 10 software of the present invention. Memory device 24 includes a bitmap, or functionally equivalent, memory 25 for storing the color information signals representing the color to be displayed in each pixel location on display means 30. Memory device 24 may include a color map data structure 26, also used for associating color information signals with the corresponding individual pixel locations on display means 30. The operation of bitmap memory 25 and color map data structure 26 is described in more detail below.

The color editing graphical user interface 10 software (hereafter, "GUI 10") of the present invention functions as a direct manipulation user interface for controlling system 20. A user of GUI 10 selects a color editing function from available functions (described in more detail below) displayed on display 30 and provides requests for a function via user input means 28. GUI 10 is responsive to user input means 28 and accomplishes the editing task requested, displaying results of user requests through display means 30.

Processor 22 is in communication with GUI 10, executing program instructions of GUI 10 for interpreting, coordinating, and responding to the user's color editing requests. Processor 22 also executes program instructions of GUI 10 for displaying responses to user requests on display 30. Processor 22 may be any appropriate processor, such as a microprocessor. In general, during operation, processor 22 executes instructions retrieved from memory 24 in a conventional manner and retrieves and stores data in memory 24. Processor 22 also controls the communication of color information signals representing color palette information from color map data structure 26, and additionally may also control the receipt of other input data from input sources not shown. In addition, processor 22 may execute other programs to perform functions other than color editing provided by GUI 10.

Figure 2:
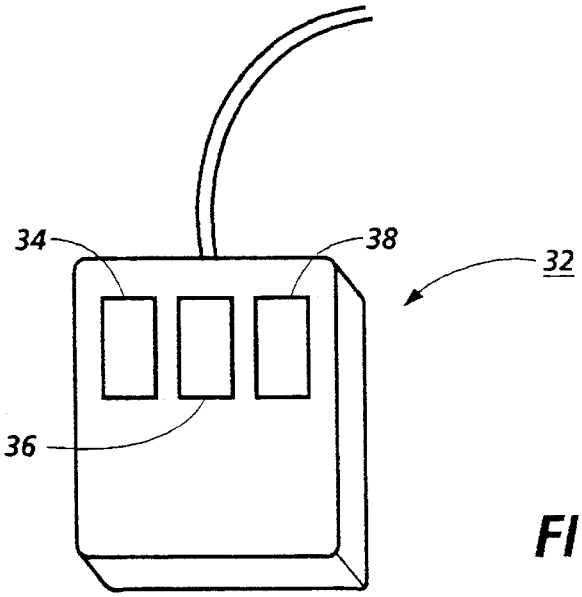
FIG. 2 is a mouse pointing device suitable for inputting user signals to the color editing graphical user interface of the present invention.

User input means 28 may include any suitable device for interacting with GUI 10, including but not limited to pointing and cursor control devices for two- and three-dimensional displays, such as a mouse, light pen, track ball, joystick, or data glove device, alphanumeric input devices such as a keyboard, and touch screen displays. In addition, a combination of several user input means may also be used, as for example augmenting a pointing device such as a mouse with the ability to enter editing requests via a touch screen or keyboard. Alternatively, the user input means 28 could be a speech recognition device for speaking input, or a location sensing device for gestural input. In the illustrated embodiment of GUI 10, the three-button mouse 32 illustrated in FIG. 2 provides the primary method for a user to send signals to GUI 10 requesting color editing functions. Mouse 32 is connected in a conventional manner to system 20.

With continued reference to FIG. 1, display 30 may be any suitable color display for displaying computer generated data, such as a cathode ray tube (CRT) raster scan color monitor or a color liquid crystal display (LCD). As will be explained below, while it is preferable that display 30 be a color display device, GUI 10 may be implemented using a monochrome display device. It should also be understood that the color information signals representing color palette data edited by the user via color editing GUI 10 of the present invention subsequently may (but need not) be output to a color rendering device (not shown) of system 20, such as an electronic or digital printer, xerographic marking engine, platemaking device, or other suitable color rendering device.

In the illustrated embodiment of system 20, refresh memory area 25, in memory 24 (FIG. 1) stores color information signals for each addressable pixel on display device 30. Some systems may use a color map data structure 26 to minimize the storage requirements needed for the color information signals in memory 24. The operation of color map 26 may be described generally as follows. In systems with n-bit color displays, where each color is limited in its definition to n bits, a total of $2^n$ different colors are producible by the system. Typical computer graphics imagery is developed on a monitor that accepts an 8-bit voltage value (a maximum of 256 levels) for each color. An image is defined as a set of pixel values in bitmap memory 25 that represent the color information signals before gamma correction. Bitmap memory 25 is a three dimensional array, with the two X, Y dimensions defined by the size needed to represent the display screen pixel locations, and with a third dimension of n bits. The data value in each location of bitmap memory 25 is an n-bit long index into color map data structure 26 (also referred to as a video look-up table, a color table, or simply, color map). The number of entries in color map 26, as determined by the number of colors displayable by display means 30, is $2^n$ entries, while the length of each entry is determined by the number of bits used to represent each primary R, G, and B color specification. The value of color map 26 at the entry index contains the actual color information signals for controlling the voltage signals of the primary color electron guns to produce color on the display. These signals are then sent to the intensity digital to analog converter to control the intensity or color on display means 30.

An embodiment of the graphical user interface 10 of the present invention has been implemented on a SPARCstation workstation from Sun Microsystems, Inc. of Mountain View, Calif., having a Conrac color monitor, a mouse pointing device, and a keyboard. Color information signals in this implementation are defined using an 8-bit color definition.

2. Graphical User Interface Implementation

As shown in FIG. 1, the color editing graphical user interface 10 of the present invention is a body of software that exchanges data with display 30 and user input means 28, and also with processor 22 in order to accomplish the color editing functions it provides to the user. This software provides a region on display means 30 called a "window" for presenting color editing functions to the user, converts signals received from input means 28 into a series of user input signals for directing control of processor 22, and receives data from processor 22 for updating the representations in the window presented on display 30.

Figure 3:
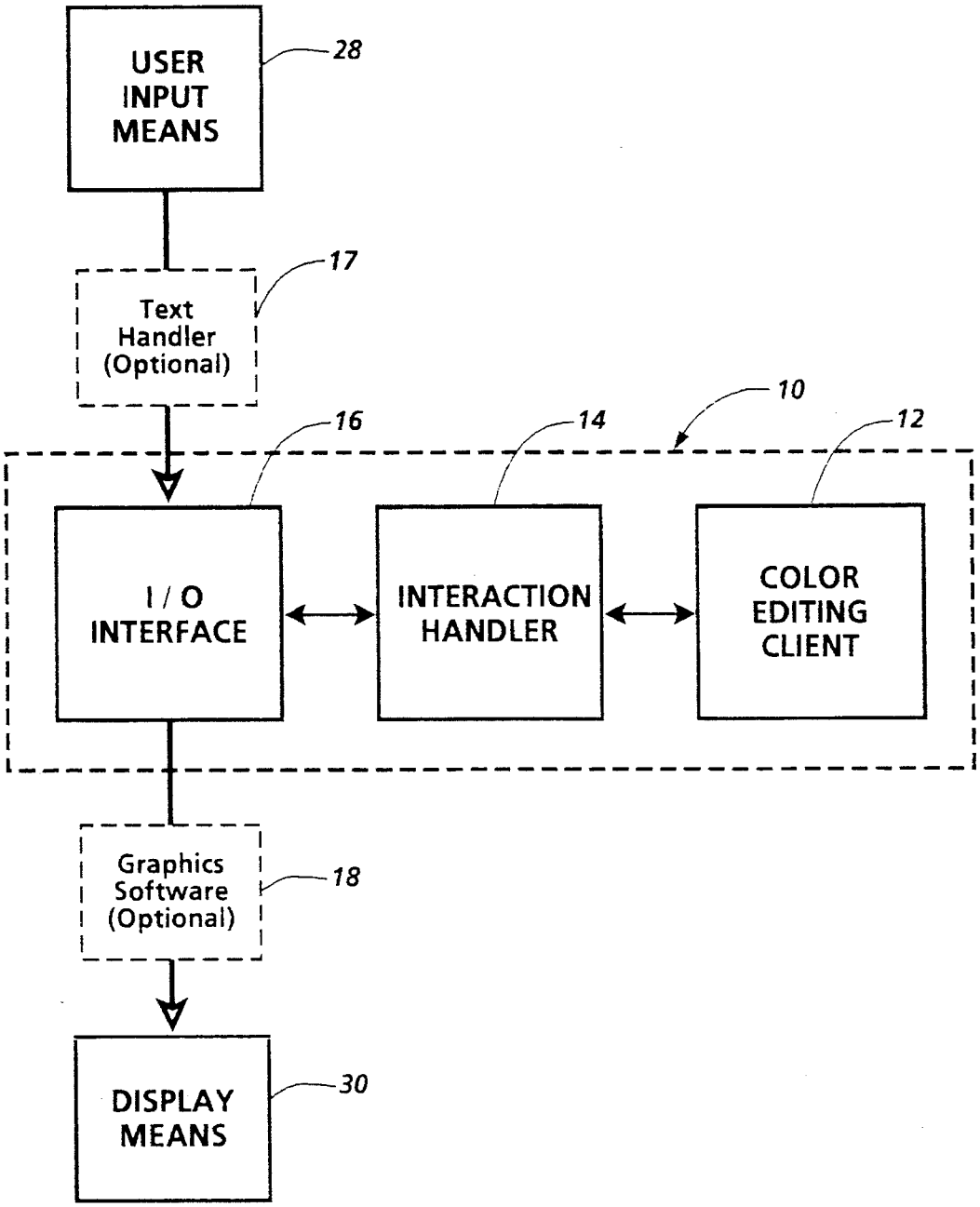
FIG. 3 is a simplified functional block diagram illustrating the graphical user interface (GUI) components of the present invention.

Turning now to FIG. 3, there is illustrated a simplified block diagram of the functional components of the color editing graphical user interface 10 of the present invention. Color editing client software 12 contains the software instructions for defining and implementing the color editing functions available to the user, for defining the color spaces and gamuts in which color editing takes place, and for directing processor 22 to perform transformations on color information signals and color spaces as needed. Color editing client software 12 also interfaces, via processor 22, with data structures 23, 25, and 26 (FIG. 1) stored in memory 24. Interaction handler 14 exchanges signals with the user through I/O interface 16 which provides signals to display 30 for viewing by the user and receives input signals from input means 28. In the illustrated embodiment, I/O interface 16 communicates with conventional graphics software 18 for formatting the signals necessary to draw the various contents of the window. However, color editing GUI 10 may be implemented without graphics software 18 by incorporating the formatting instructions for directly generating the appropriate window displays. Interaction handler 14, in turn, sends signals received from the user to color editing client program 12 for interpretation of the color editing function requested. Color editing client program 12 then sends appropriate signals to processor 22 for executing the requested function. In the illustrated embodiment, I/O interface 16 includes text handler software 17 which collects, interprets, and parses the input data stream of user input requests and data into appropriate input signals before passing the signals to interaction handler 14. However, color editing GUI 10 may be implemented without text handler software 17 by incorporating the instructions necessary to decode input signals for processing by interaction handler 14.

In the illustrated embodiment, interaction handler 14 and I/O interface 16 are part of a software environment known as a user interface management system (UIMS) which performs a variety of window management and coordination functions. A conventional UIMS, also referred to as a window manager, monitors and controls different application contexts controlled by processor 22 by separating them physically into different parts of one or more display screens. Functions implemented by the UIMS include operations to initialize a window, to save its contents, to destroy a window, and to paint its contents on the display. The UIMS also defines data fields, such as size information and display coordinates for a window, and stores implementation-dependent instance data provided by color editing client program 12 for display of color editing data in a window. The UIMS also draws and displays the text and simple graphical elements in the color editing window.

User interface management systems and tools for implementing graphical user interfaces are well known in the art. Color editing GUI 10 may be implemented in a variety of hardware and software environments providing suitable and equivalent user interface management system functions as illustrated in FIG. 3. For example, GUI 10 was implemented in a conventional workstation environment as a prototype color editing application called "MetaPalette" in the Xerox proprietary research programming development environment known as Cedar. The Cedar development environment provides extensive UIMS support functions and tools for implementing a window-based graphical user interface software application, and provides the functions described in conjunction with the interaction handler 14 and I/O interface 16 of FIG. 3. Color editing client software 12 was implemented in the proprietary Cedar programming language, a strongly-typed language similar in functionality and language structure to the Pascal programming language.

In addition, GUI 10 may be implemented in personal computer environments using low-level assembly or machine language routines for the necessary window management and application interface functions, or by using an appropriate user interface "toolkit". A toolkit contains routines and procedures for implementing UIMS functions such as windows, menus, scroll bars, and graphics, and for managing user interaction techniques for various physical input devices. Similarly, the color editing GUI 10 may be implemented in pre-press color proofing or systems reprographic machines provided that interaction handler 14 and I/O interface 16 each include software data structures and processes that mediate between the user at input means 28 and color editing client software 12 according to conventional techniques for interactive computational interfaces. It is intended that color editing GUI 10 have broad applicability to many systems environments where computer controlled color rendering is a functional component.

Figure 4:
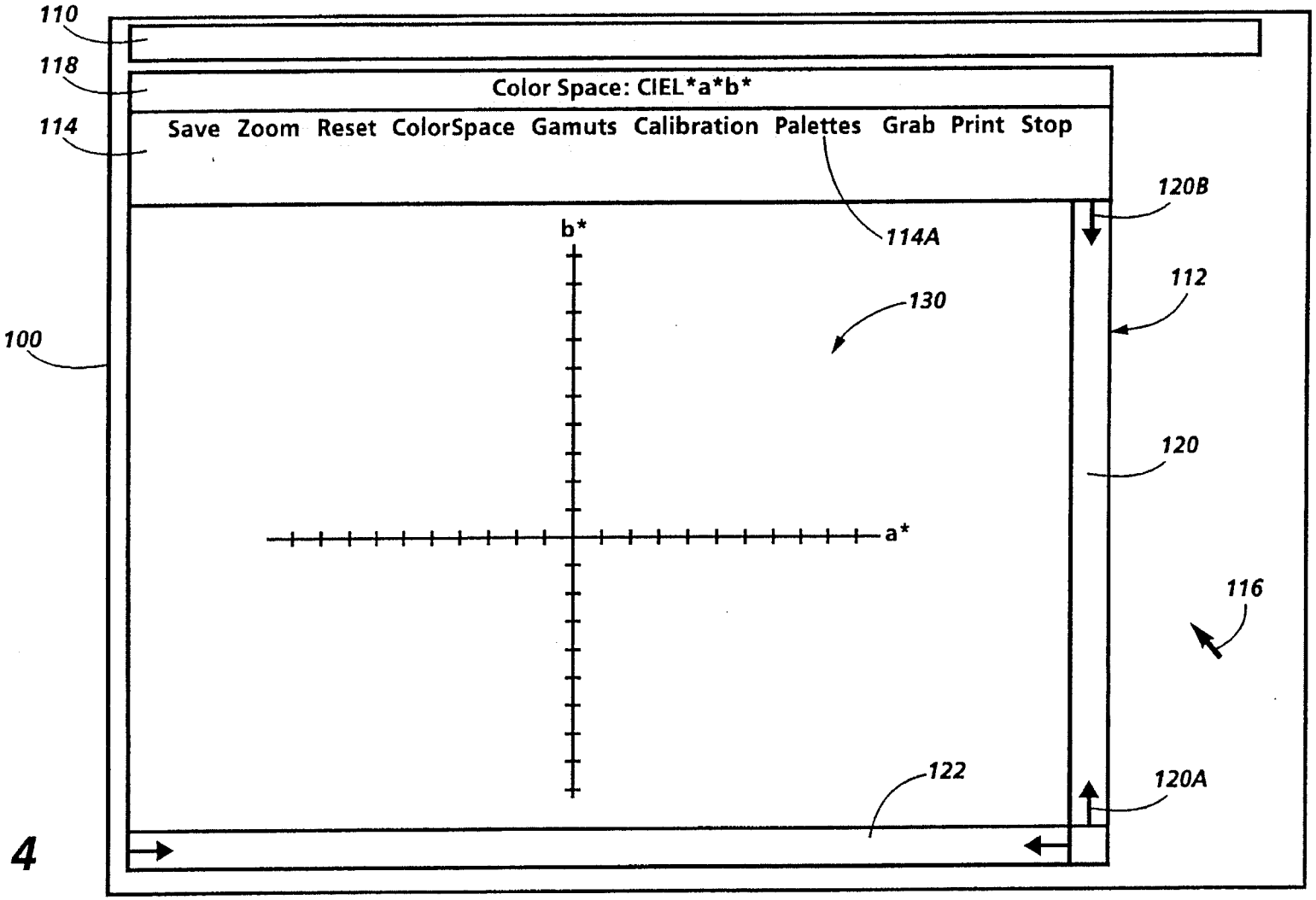
FIG. 4 is a pictorial representation of a display screen showing the color space window first displayed for the user upon initiating execution of the color editing GUI.

B. Overview of Screen Displays and User Interaction in the Color Editing Graphical User Interface 1. The Color Space Window and Menu Selection FIG. 4 illustrates display screen 100 which appears on display device 30 of computer controlled color rendering system 20 (FIG. 1). Display screen 100 displays several metaphoric objects (not shown), called icons, each representing a function, application, or data available on system 20. Color editing graphical user interface 10 may be represented on the user's desktop as such an icon. The user may directly interact with an icon by using a pointing device, such as mouse 32 (FIG. 2), which positions cursor 116 at an icon location on display screen 100 and activates or selects the icon when a mouse button is pressed. Selecting the icon representing color editing graphical user interface 10 begins execution of the color editing application software. Message header area 110 at the top of screen 100 is used for displaying system and application-specific messages to the user.

When selected for execution by the user, GUI 10 first presents color space display window 112. The user interacts with window 112 using conventional window manipulation and window content interaction techniques. To make a selection in window 112, the user uses mouse 32 to position cursor 116 on a selectable item in window 112 and depresses and releases ("clicks") one of the buttons 34, 36, or 38 (FIG. 2), on mouse 32 to select the item, or to cause the corresponding operation to be performed. Vertical scrollbar 120 of color space window 112 will permit scrolling of the color space currently displayed up or down within the window. Vertical scrollbar portions 120A and 120B represent up and down scrolling, respectively, when invoked by mouse 32. Clicking mouse 32 over either end of horizontal scrollbar 122 will cause horizontal left or right scrolling of the color space window. In addition, the user may move the entire window 112 to another location on display screen 100, and may enlarge or reduce the size of window 112 using conventional window manipulation techniques.

With continued reference to FIG. 4, caption area 118, in the top portion of window 112, may contain the window's name, or may contain explanatory information about the contents displayed in window 112. In FIG. 4, the message displayed in caption area 118 states the name of the color space currently being displayed. Just below caption area 118 is menu area 114 which displays the functions and features available for selection by the user of color editing GUI 10.

Figure 5:
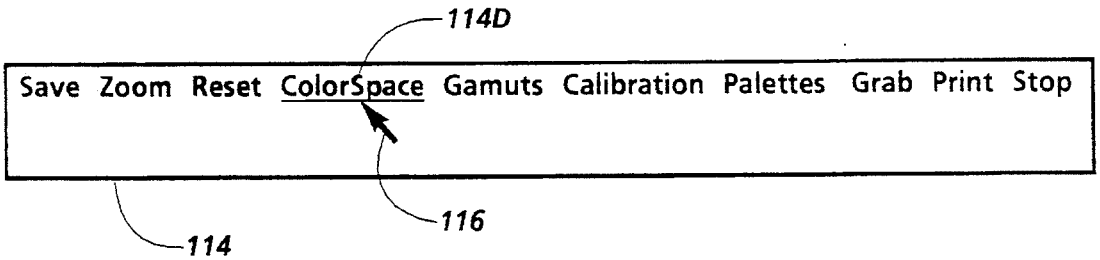
FIG. 5 illustrates a menu format and selection method which may be used to select a color space display option for display in the color space window of FIG. 4.

Initiating execution of color editing GUI 10 results in the software displaying, in color space display window 112, a graphical, two-dimensional representation of the CIELAB color space 130. In the implemented embodiment of color editing GUI 10, the user may select for display any of three different color spaces in which to perform color editing, or may display a histogram showing the frequency distribution of the lightness values of the currently selected palette. FIG. 5 illustrates the menu handling for this request. Table 1 below associates the four color space display options with the buttons on mouse 32 (FIG. 2) and with the "SHIFT" key on an input keyboard device (not shown).

TABLE 1

| Selecting A Color Space For Display | | |
|---|---|---|
| Mouse Button (FIG. 4C) | Keyboard "SHIFT" | Color Space Request |
| 34 | NO | CIELAB |
| 34 | YES | HISTOGRAM (L*) |
| 36 | NO | 1976 CIE UCS DIAGRAM |
| 38 | NO | CHROMATICITY DIAGRAM |

Figure 6:
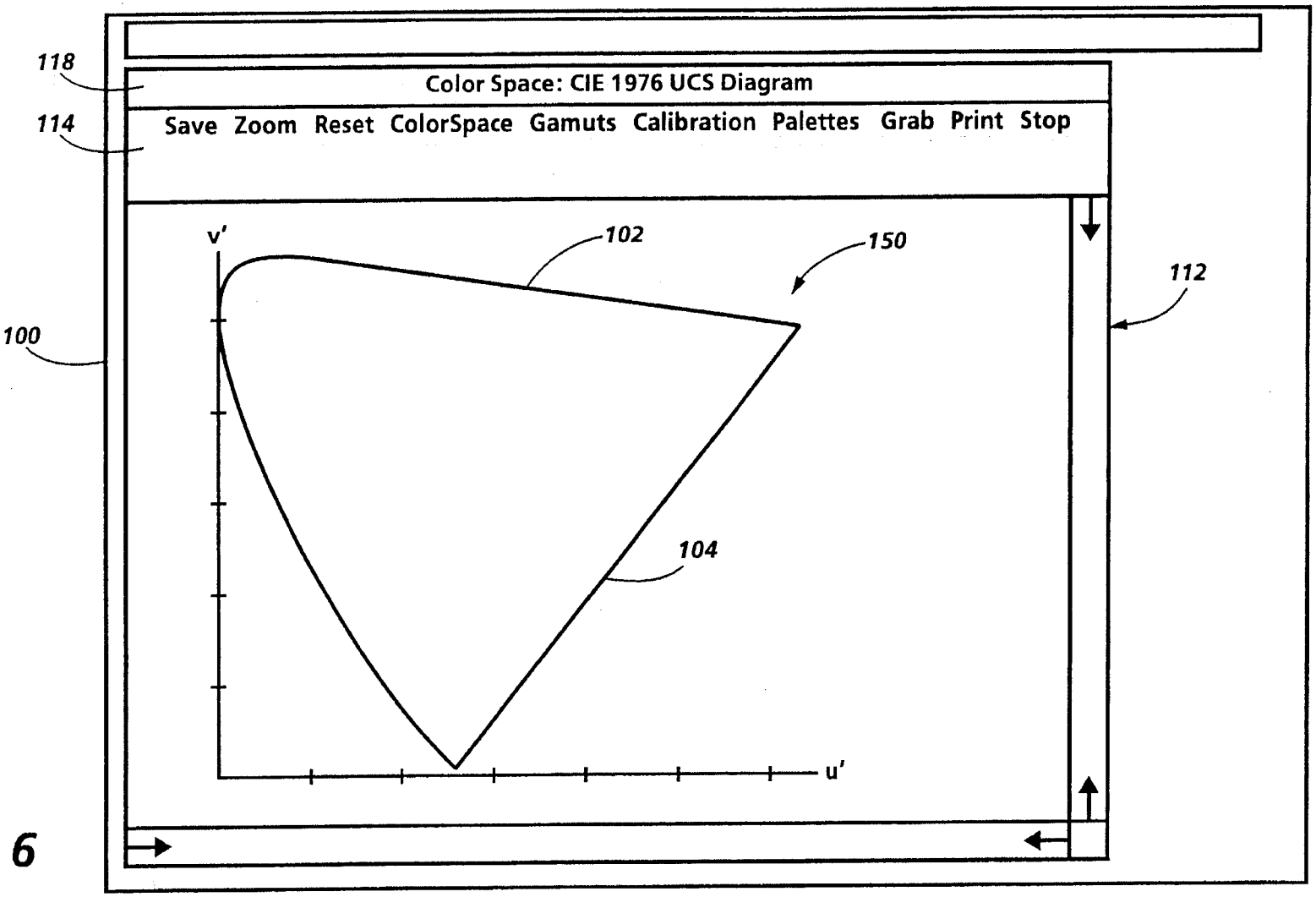
FIGS. 6 and 7 are pictorial representations of display screens showing additional color spaces the user may select for display in the color space window.
Figure 7:
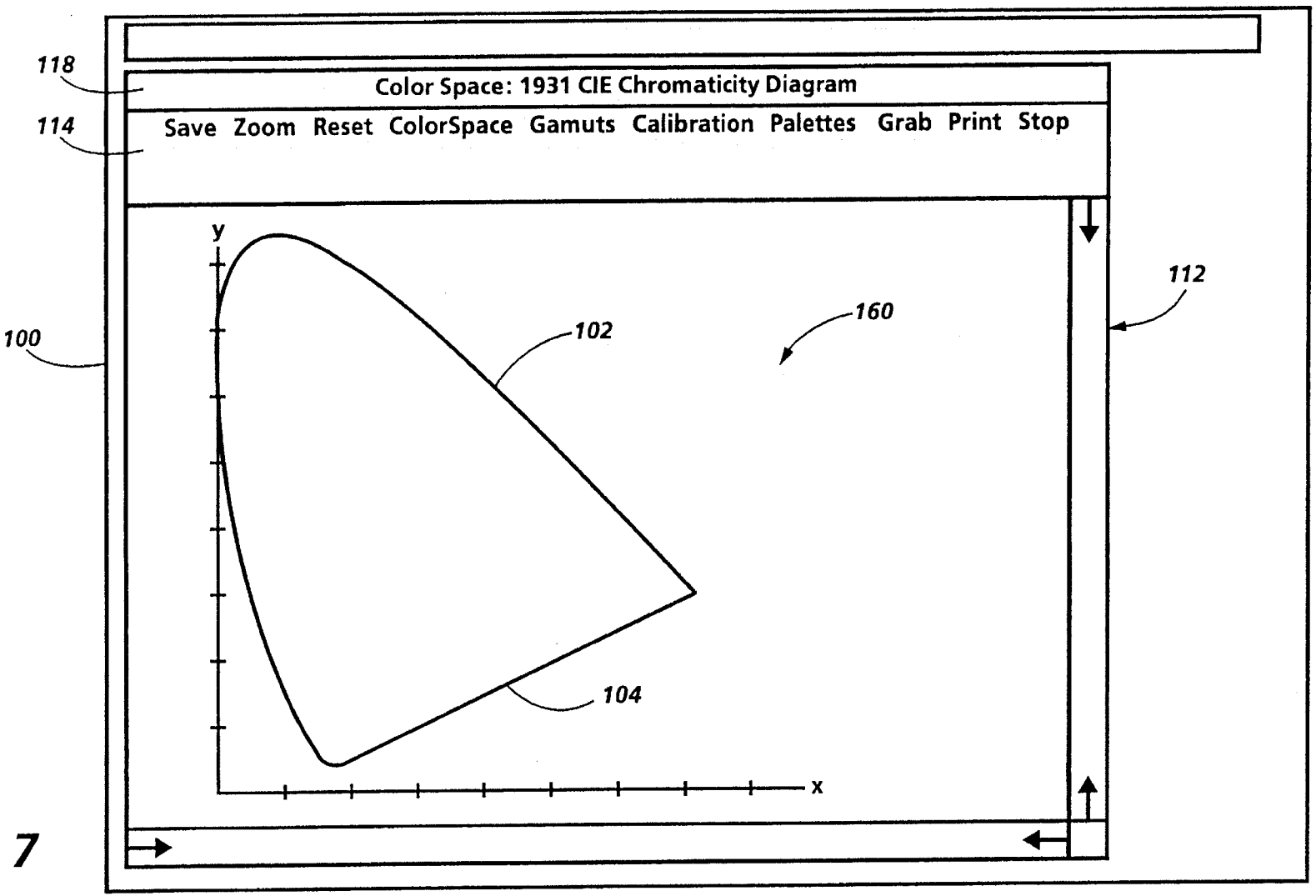

With reference to FIG. 5, the user first positions cursor 116 over the menu entry 114D, "Color Space", on menu 114, using mouse 32. While cursor 116 is pointing to menu entry 114D, the user presses one of the valid mouse button-key combinations, listed in Table 1, to request display of the desired color space. FIGS. 6 and 7 illustrate color space window 112 with, respectively, the CIE 1976 CIE UCS Diagram color space 150 and the CIE 1931 Chromaticity Diagram color space 160 displayed. An example of the L* Histogram color space may be seen in FIG. 29, below.

Figure 8A:
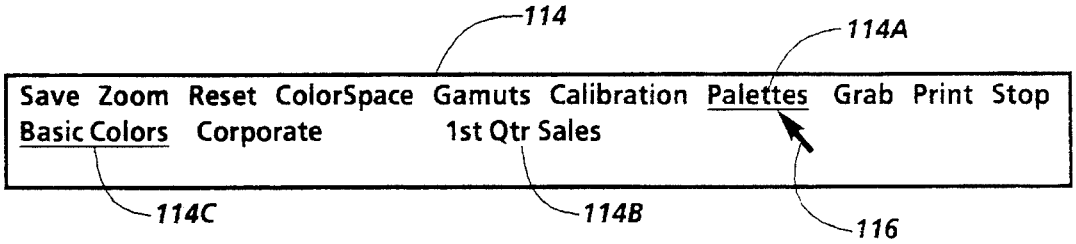
FIGS. 8A and 8B illustrate alternative menu formats and techniques which may be used for function and data selection in the color editing graphical user interface of the present invention.

In order to display a palette of colors to be edited in color space 130, the user selects menu item "Palettes",114A, with mouse 32. As shown in FIG. 8A, selection of menu item 114A acts as a toggle switch which, when activated, presents second menu line 114B containing a list of color palette names available for display and editing in color space 130. When the user selects a list item from second menu line 114B, for example, menu item 114C, "Basic Colors", the input data file of colors identified by that name will be displayed in color space 130. Processing details for selecting a palette of colors for display may be found below in the discussion accompanying FIG. 20.

Table A.1 in Appendix A below provides a summary listing of color editing GUI 10 functions, and defines the associated menu entries in menu area 114, mouse buttons, and keyboard keys for invoking these functions. It is intended that many other variations of the implementations described in Table A.1 and in the discussion above are within the scope of the invention. For example, there may also be added to menu area 114 a command such as "Background" which would function as a toggle between a white and black background against which to display color space window 112 and the palette of colors to be edited. This feature would provide the user with the ability to make more accurate color assessments since it accommodates the importance of the surround in viewing colors.

Figure 8B:
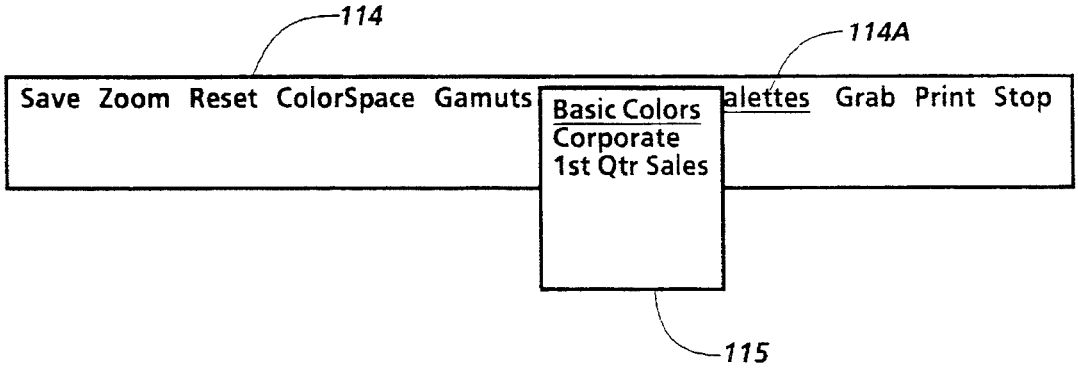

Moreover, any of the selections and functions of color editing GUI 10 described herein may be implemented using any suitable conventional window and menu management technique known in the art. For example, as shown in FIG. 8B, menu item 114A could also provide transient, or pop-up, menu 115 which contains a list of palettes of color available for display and editing in color space 130. The user would then select one of these palettes for display in the conventional manner. Thus, the color editing functions in the illustrated embodiment of color editing GUI 10 implemented using mouse button or keyboard combinations may of course be implemented using one of the menu selection and management techniques previously described. Similarly, when a small, easily remembered set of options is available to the user for a particular function, such as the color space selections available for display, the options may be associated with different mouse buttons or with different function keys on a keyboard, instead of using a menu.

2. Displaying a Palette of Colors

Figure 9:
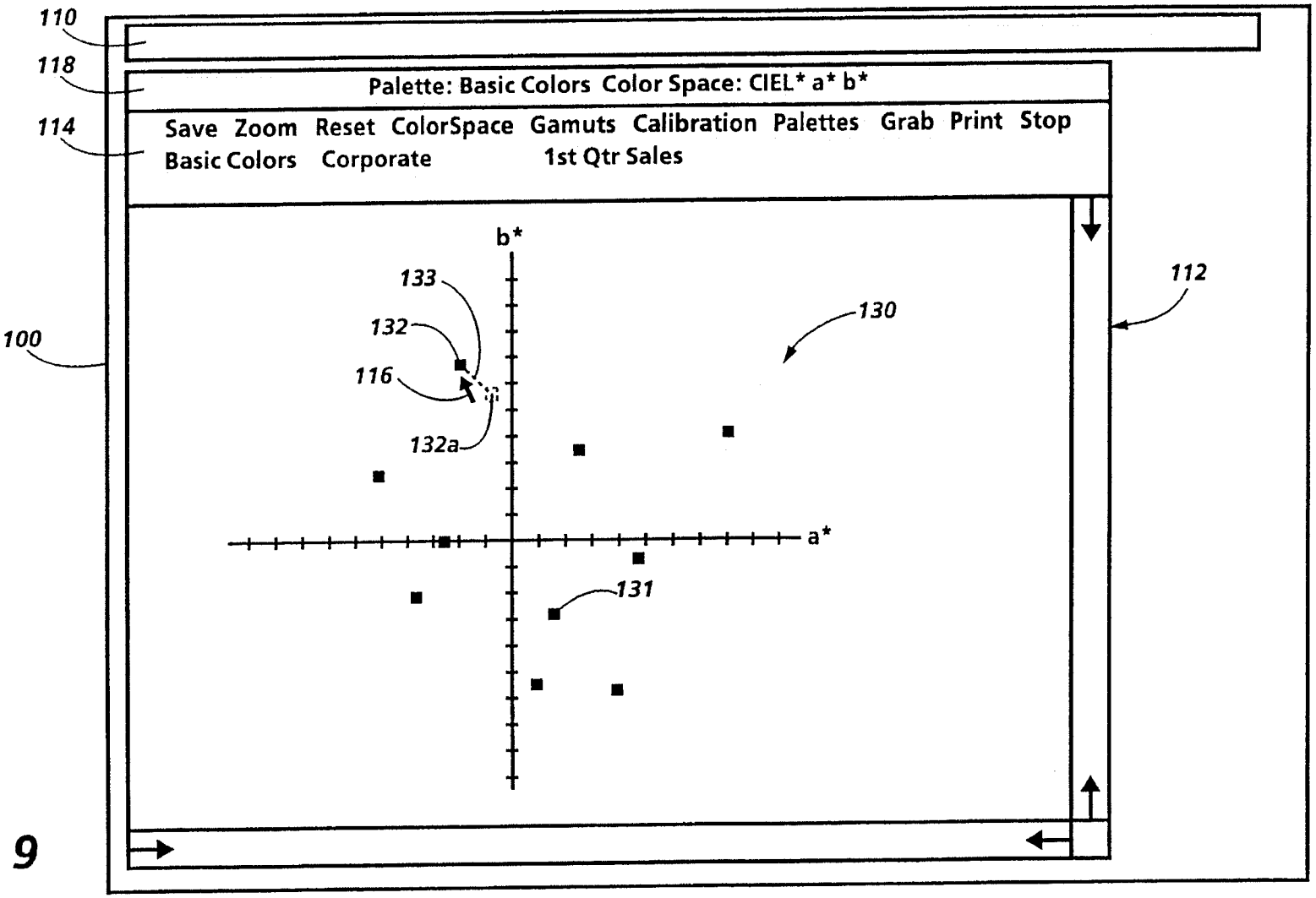
FIG. 9 is a pictorial representation of a display screen showing a palette of colors plotted in the color space window of FIG. 4, and illustrating how a color is edited according to the present invention.

FIG. 9 illustrates the display in color space 130 of a palette of colors to be edited. After selecting the palette, the caption area 118 of window 112 displays the name of the palette being edited. The individual colors of the palette are converted from their internal storage format to values in the currently displayed color space and plotted in the rectangular color space coordinate system 130 according to their respective coordinates in the displayed color space. For example, in the implemented embodiment, each of the colors is represented internally as a set of RGB values which are first transformed into an internal set of device independent X, Y, Z tristimulus values which are then converted to the set of L*, a*, and b* values needed to plot and display the color in CIELAB space. Since the representation of the color space is two-dimensional, the L* signals, or values, are ignored during the plotting process, and the location of each color is determined according to the value of its a* and b* coordinates. However, each color is represented as a square mark in the actual color represented, and thus the L* signal of each color is indirectly represented in color space 130.

The user may also display the colors according to their lightness (L*) signals by requesting the display of the histogram color space, shown in FIG. 29 below. In addition, color editing GUI 10 supports multiple color space display windows using conventional window management techniques, so that the user may display a palette of colors in CIELAB space 130 in one color space display window 112, and represent the L* distribution of the same palette of colors in another color space display window 112 on a single display screen 100.

The user may request, at any time, the display of any of the available color spaces listed in Table 1, and shown in FIGS. 4, 6, 7, and 29 (the histogram). When the user changes the color space, each of the colors, currently plotted according to coordinates in one color space, is converted to the color value representation in the newly requested color space and plotted in the correct location in the new color space. Details of the color space selection processing may be found below beginning with the discussion accompanying FIG. 22. Details of the process of drawing color space window 112, displaying a color space and plotting a palette of colors may be found below beginning with the discussion accompanying FIG. 27.

3. Editing a Palette of Colors

In the implemented embodiment of color editing GUI 10, the user may select some color functions using only mouse pointing device 32. The available color function options associated with mouse requests are summarized in Table 4 and described more fully below beginning with the discussion accompanying FIG. 33A.

For example, to simply query a color requires moving cursor 116 to the color square and clicking on it with left mouse button 34. This results in displaying, in caption area 118 of color space window 112, the color's RGB values, the color's name (according to a conventional color naming standard such as that set forth by the U.S. Dept. of Commerce, National Bureau of Standards in *Color: Universal Language and Dictionary Names,* NBSS Special Publication 440 (Washington, D.C., 1976), and identifying user information about the color. Any other available information about the color could also be displayed, such as its CIELAB or chromaticity values.

With continued reference to FIG. 9, to edit one of the colors displayed, for example, color square 132, the user selects color square 132 with cursor 116 and middle mouse button 36 (FIG. 2). While keeping button 36 depressed, the user moves, or drags, color square 132 from its current location in color space 130 to a destination location **132*a* which will represent the desired modified color in color space 130. The movement of color square 132 is shown along dotted line 133. When the user releases middle mouse button 36 at the desired destination location, the new, modified color in color space 130 is determined from its location, and color square 132*a*** is presented in the modified color.

The scrolling functions described above (see FIG. 4) as well as the "zoom" function, available in menu area 114 and described in Table A.1 in Appendix A below, provides the user with the ability to position a portion of color space window 112 for close inspection of the edited colors. In addition, color editing GUI 10 may be implemented to allow the user to select from a number of background display colors, such as black, white, or a neutral gray color, for display and editing of the input palette of colors.

Color editing GUI 10 may also be implemented to allow editing of a palette of colors for an image or illustration, imported directly from concurrently executing illustrator or graphics software. The image or illustration itself may be displayed concurrently with color space display window 112, in a separate window. Procedures in color editing GUI 10 send modified color information to the color map data structure controlled by the illustrator or graphics software to immediately display, in the concurrently displayed window, the modified colors edited by the user in color space display window 112 using color editing GUI 10, in effect "animating" the color map of the illustrator or graphics software. This processing is described in the discussion accompanying FIG. 17.

4. Constraining Colors Within a Gamut and Manual Gamut Clipping Between Color Devices As already defined above, the set comprising all of the colors physically producible from the primary colors of a particular display device is called the gamut of the device. In one embodiment of color editing GUI 10, some processing is performed to ensure that the modified, or moved, color is an actual reproducible color in the gamut of display device 30. This requires colorimetrically measuring the gamut of display device 30, and storing this measured gamut in memory 24. In order to ensure that the modified color is reproducible in the display device gamut, color editing GUI 10, in one embodiment, converts the coordinates representing the modified color value to hue, chroma and lightness values, maintains the hue and lightness of the destination color constant and adjusts the destination color's chroma by automatically clipping the chroma to ensure that the color is reproducible in the gamut. Details of the processing associated with initializing a device gamut and ensuring that the modified color is reproducible may be found below at Part G.

Figure 10A:
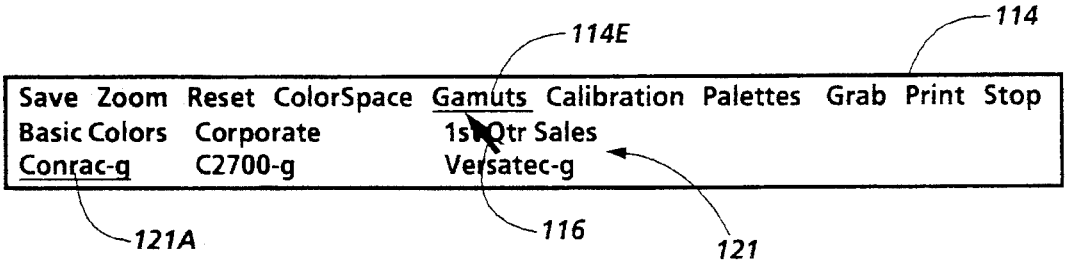
FIG. 10A illustrates a menu format and selection method which may be used to select a gamut boundary option for display in the color space window of FIG. 9.

In the illustrated embodiment of color editing GUI 10, during color editing, a user will be prevented from moving colors outside of a displayed gamut boundary. Referring now to FIG. 10A, in order for the user to see where the boundaries of the display gamut are, the user may display the gamut boundary in color space 130 at any time during the editing process by highlighting (i.e., selecting), with mouse 32, menu item 114E, "Gamuts", which provides third menu line 121 containing the gamut boundaries available for display. Third menu line 121 includes both monitor and printer devices, but in an alternative method for listing the available device gamuts, individual menu entries in menu area 114 for monitor gamuts and printer gamuts may replace menu item 114E, "Gamuts", each producing a separate menu line 121 for each set of devices.

Figure 11:
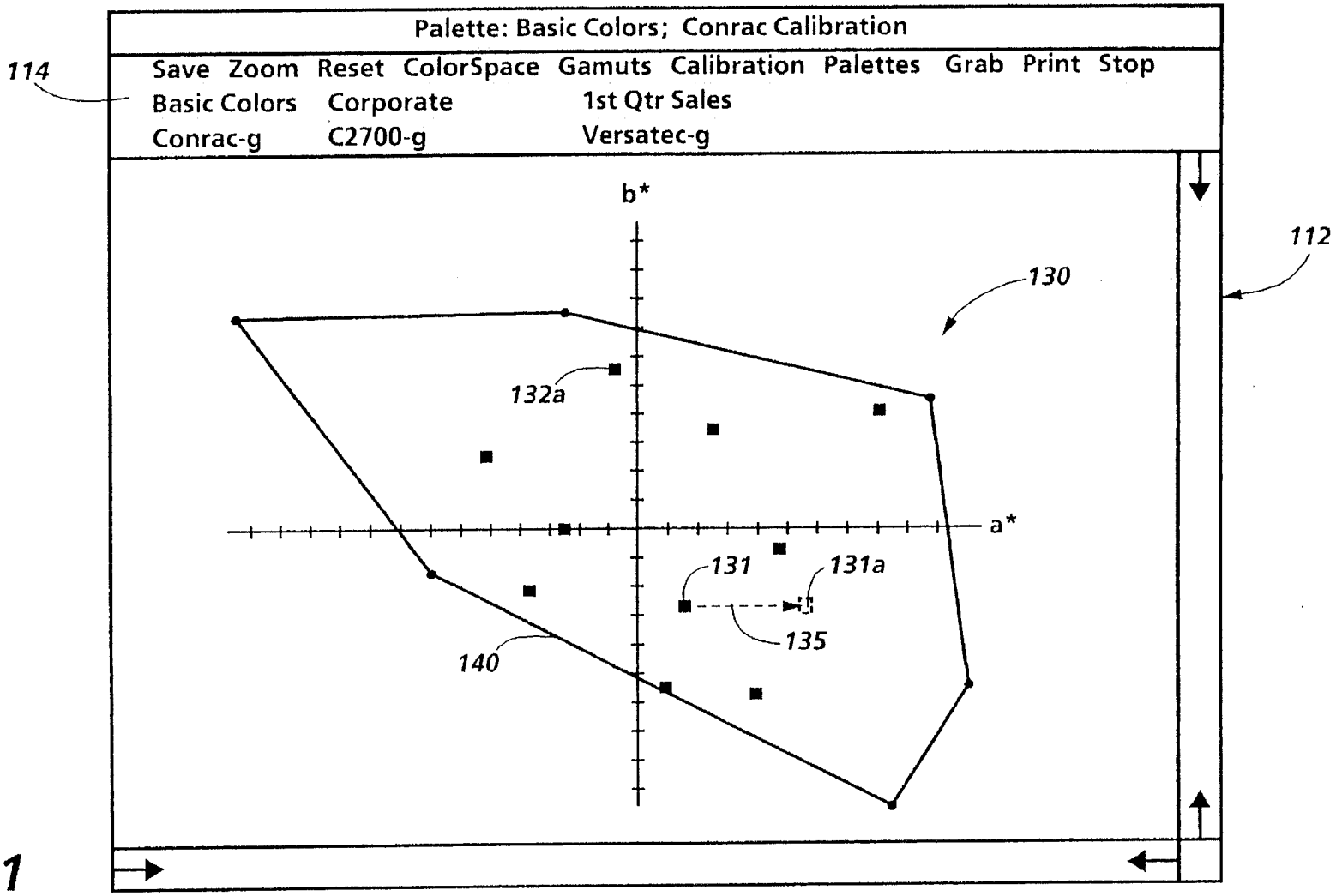
FIG. 11 is a pictorial representation of a display screen with the monitor gamut selected in FIG. 10A displayed in the color space window of FIG. 9.

When the user selects a device name, in this case, the monitor's name, menu item 121A, the monitor gamut boundary 140 is displayed in color space 130, as shown in FIG. 11. Menu item 121A acts as a toggle switch and therefore, the user may remove the displayed monitor gamut boundary 140 from color space 130 by highlighting and selecting menu item 121A again with mouse 32.

With continued reference to FIG. 11, the user may edit color 131 in the same manner as previously described, by selecting and dragging color square 131 to a destination location **131*a* along, for example, dotted line 135, but color 131 is constrained within the physical limits of the boundary of monitor gamut 140 and may not be moved beyond those boundaries. Monitor gamut boundary checking is performed regardless of whether the monitor gamut is actually displayed in color space 130. If the user attempts to move a color outside of the monitor's gamut, the destination location of the color is moved back, or "clipped", to the point on the gamut where a line from the original location and the destination location intersects the gamut boundary line. In addition, other gamut processing ensures that the modified color is at the maximum lightness for the selected chroma and hue. Details of this constraint processing may be found below in the discussion accompanying FIG. 33B** and Table 6 below.

Figure 10B:
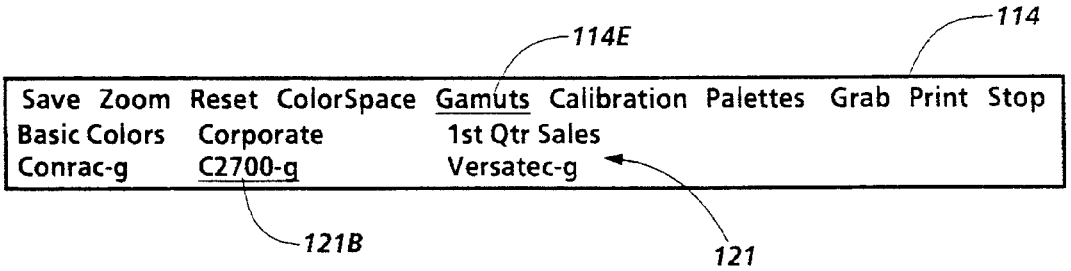
FIG. 10B illustrates the user's selection of a printer gamut boundary option for display in the color space window of FIG. 12.
Figure 12:
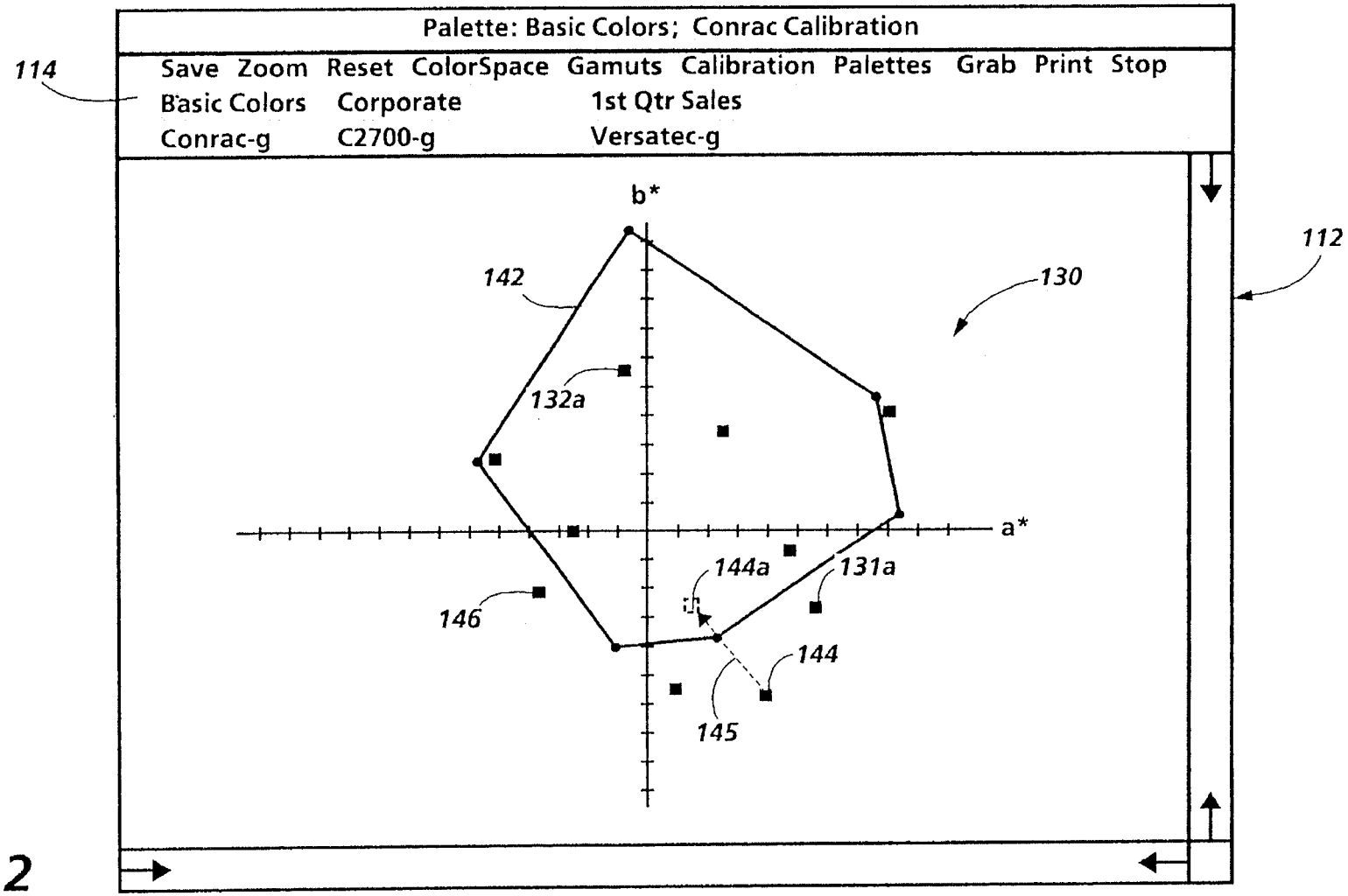
FIG. 12 is a pictorial representation of a display screen with the printer gamut selected in FIG. 10B displayed in the color space window of FIG. 11.

In color editing GUI 10, the concept of constraining the movement of the palette colors to within the physical limits of a device's color gamut boundary is equally applicable to hardcopy color rendering devices such as color printers. Thus, as shown in FIG. 10B, the user may also select for display in color space 130 the gamut of a color printer by selecting, according to one of the methods previously described, menu item 121B (a thermal transfer color printer) on menu line 121. Requesting display of a different device gamut will cause the monitor gamut to be removed from the display, and will cause printer device gamut boundary 142 to be displayed, as shown in FIG. 12. Comparing monitor gamut boundary 140 (FIG. 11) with printer gamut boundary 142 shown in FIG. 12, it can be seen that the gamuts are not coextensive and that there is no one-to-one linear correspondence between colors in the monitor gamut and those in the printer gamut.

In the implemented embodiment, the printer device gamut boundaries used for display in color space 130 are obtained from colorimetrically measuring a series of colors produced by each printer, preferably including at least the six colors, red, green, blue, cyan, magenta, and yellow, and the black point and the reference white illuminant. Table 2 provides the measured x, y, Y chromaticity data for the primary colors of the selected thermal transfer printer, along with corresponding XYZ tristimulus values, and CIELAB color space (a*, b*) values, computed from known conversion formulas. Additional information about these conversion formulas is provided below in Part C.

TABLE 2

Measured Thermal Transfer Printer Gamut Values

| Measured | Measured x,y,Y Chromaticities | | | X,Y,Z Tristimulus Values | | | CIELAB | |
|---|---|---|---|---|---|---|---|---|
| Color | x | y | Y | X | Y | Z | a* | b* |
| Red | .5490 | .3254 | .19 | .32 | .19 | .07 | 78 | 48 |
| Yellow | .4227 | .4770 | .79 | .70 | .79 | .17 | −3 | 100 |
| Green | .2181 | .4460 | .16 | .08 | .16 | .12 | −57 | 24 |
| Cyan | .1711 | .2074 | .23 | .19 | .23 | .68 | −11 | −41 |
| Blue | .1921 | .1581 | .05 | .06 | .05 | .21 | 21 | −39 |
| Magenta | .4353 | .2550 | .21 | .36 | .21 | .26 | 83 | 5 |

With continued reference to FIG. 12, some of the colors, for example, color squares **131*a*, 144, and 146, in the displayed palette are outside gamut boundary 142 of the selected printer device. From this display, the user knows that these colors will not be accurately reproduced on the selected printer. Generally, hardcopy output devices such as printers contain mappings between RGB color specifications and CMYK color specifications which, in effect, make decisions as to how the mapping of colors between devices with different gamuts is to be handled. In this embodiment of color editing GUI 10, the user has manual control over mapping each color in the monitor's gamut to an appropriate color in the gamut of the target device by using the available color editing methods of GUI 10 to bring colors within the confines of target device gamut boundary 142**.

The simplest editing method available is to bring out-of-gamut color 144 to the edge of printer gamut boundary 142 by clicking with middle mouse button 36 on color 144; color 144 will be brought to the edge of printer gamut boundary 142 using a known clipping routine, such as clipping the color's chroma value (chroma is described in more detail below in Part C.3), or any other suitable gamut clipping method.

Alternatively, using the identical method described above with respect to moving color square 131 (FIG. 11), the user may select and manually move color square 144 to a destination location **144*a* inside printer gamut boundary 142, along, for example, dotted line 145, where the resulting color is suitable for the user's purposes. Color 144*a* is now constrained within the physical limits of printer gamut boundary 142 and may not be moved beyond those boundaries. In addition, the software will not permit the user to select a destination location 144*a*** for which the current L* value for color 144 combined with the a* and b* values of destination location **144*a* produce a color that is not within the gamut solid for the selected printer device. Certain gamut clipping routines will automatically determine the closest available color to the one requested during the move process. Process flow details of the gamut clipping processing may be found below in the discussion accompanying FIGS. 36A and 36B**.

5. Modifying a Color's Lightness Signal

In color editing GUI 10 the user also has manual control over the perceived lightness (or darkness) of a color. As noted above, while the L* values are ignored for purposes of plotting the color palette in the a*, b* color space 130, the color's L* value is indirectly represented by the color shown in a color square, and correctly illustrates it's perceived lightness or darkness. During editing, a modified color may appear too light or too dark as a result of clipping the color's lightness to fit the color into the shape of the printer gamut solid. Also, by merely changing the color's lightness, an out of gamut color may be inside the gamut boundaries at a different lightness level because of the irregular shape of the gamut solid at different lightness (L*) or luminance levels.

As an additional editing feature, the user may also change a color's lightness signal and have the change reflected in the color's display in color space display window 112. With continued reference to FIG. 12, if, for example, color 144*a* is too dark or too light for the user's purposes as a result of moving it into the printer gamut, the user may modify the color's lightness signal only by selecting color 144*a* with right mouse button 38 to darken color 144*a* by a fixed increment, or with right mouse button 38 in conjunction with the SHIFT key on an input keyboard (not shown) to lighten color 144*a* by a fixed increment. In the illustrated embodiment, this color modification is made to the CIELAB L* coordinate of the color, regardless in which color space the palette colors are currently displayed. The lightness modification, if made to a color displayed in a color space other than CIELAB color space, is interpreted by the user as a luminance modification.

A fixed increment of +10 L* units is made to the L* value to lighten the color, to a maximum of 100, and a fixed decrement of −10 L* units is made to the L* value to darken the color, to a minimum of 5, but any suitable increment resulting in a discriminable change may be used. In the illustrated embodiment, if the color space currently displayed is one other than CIELAB color space 130 (e.g., UCS Diagram 150 (FIG. 6) or Chromaticity Diagram color space 160 (FIG. 7)), appropriate conversions to and from CIELAB coordinates are made before the selected color is lightened or darkened. The resulting changed color also undergoes a clipping process to ensure that it is a valid color in the monitor gamut solid. Process flow details of changing a color's lightness may be found below in the discussion accompanying FIGS. 33A and 33B.

The foregoing discussion illustrates that, in effect, the implemented embodiment of color editing GUI 10 described herein provides the user with a simple and intuitive, yet powerful and accurate tool for manipulating entire palettes of color to both enhance the user's aesthetic color selection abilities and to control color fidelity across different color display or reproduction devices. Because the entire palette of colors is always displayed in color space 130, the user is able to assess each edited color in relationship to all other colors in the palette simultaneously while performing a range of color editing functions. The user may perform individual color correction by manually controlling and modifying each individual color, in the context of other colors, to produce the color desired, on the same display device on which the color was created, or on a different color display or reproduction device, using the substantial perceptual uniformity of the CIELAB color space to assist in locating each color appropriately. Before turning to the detailed description of the process flow of color editing GUI 10, there is next presented a discussion of relevant mathematical and organizational principles of the color spaces available to the user for displaying and modifying palettes of color.

C. Color Spaces Utilized in the Color Editing Graphical User Interface

As already noted above, the implemented embodiment of color editing GUI 10 uses a CIE device independent color model based on colorimetric principles for internal color representation and manipulation. CIE color specification employs such a set of device independent X, Y, and Z tristimulus values to specify a color according to the color's appearance under a standard source of illumination as viewed by a standard observer.

1. The 1931 CIE Chromaticity Diagram

Figure 13:
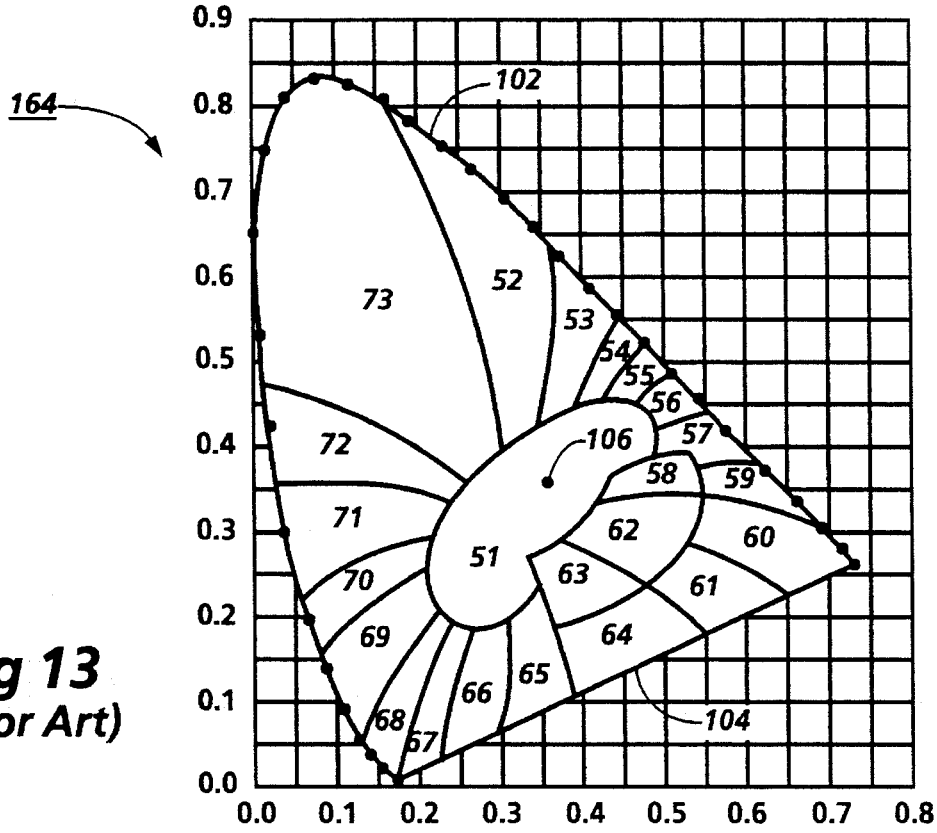
Fig 13 (Prior Art)
FIGS. 13 and 13A illustrate the 1931 CIE Chromaticity Diagram, one of the color spaces in which color editing according to the present invention is accomplished.
Figure 13A:
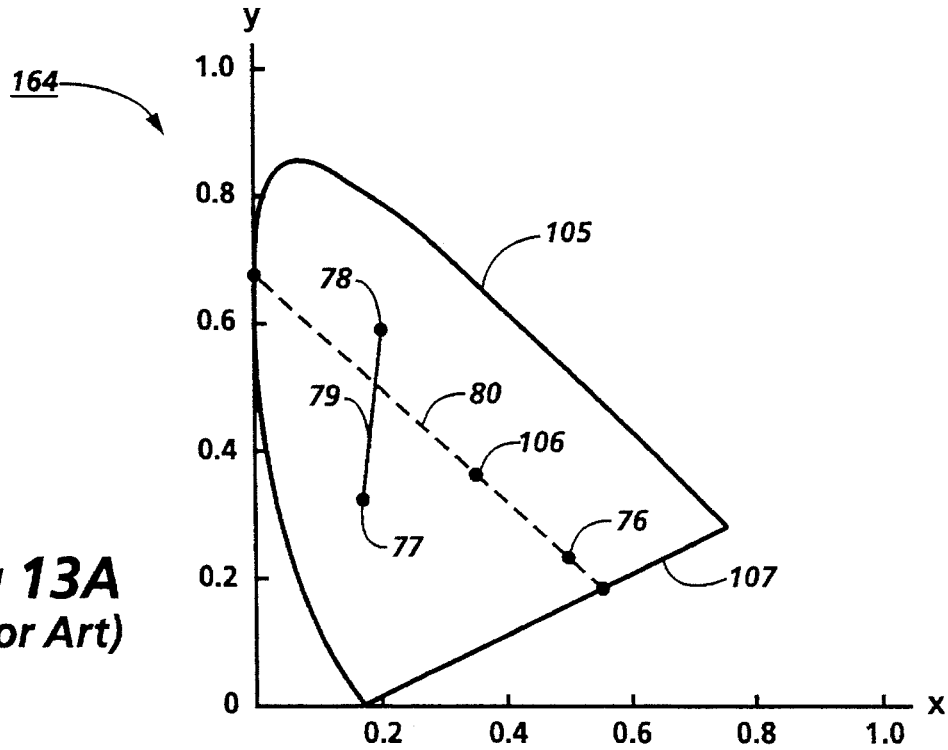
Fig 13A (Prior Art)
Figure 14:
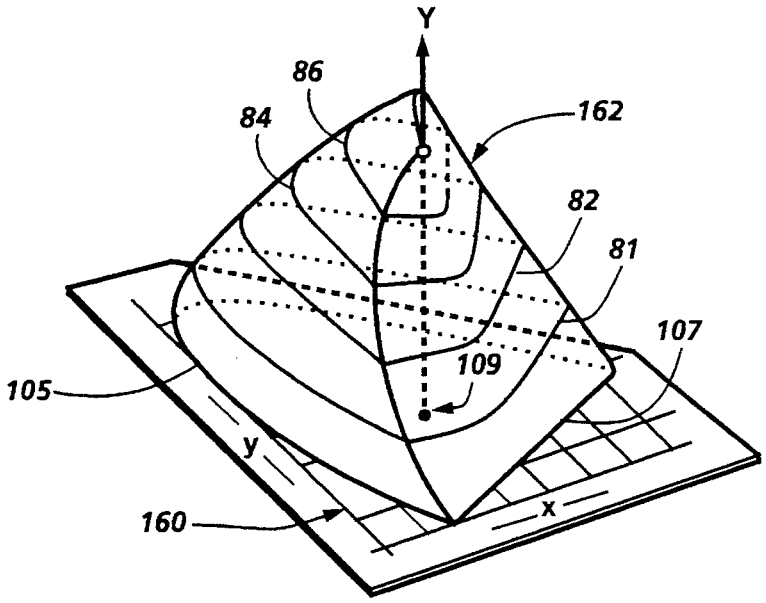
Fig 14 (Prior Art)
FIG. 14 illustrates a three-dimensional view of realizable object colors as displayed in the 1931 CIE Chromaticity Diagram.

Referring now to FIGS. 13, 13A, and 14, the 1931 Chromaticity Diagram color space 164 (hereafter referred to as the "chromaticity diagram") represents colors according to their "chromaticity" coordinates. Chromaticity coordinates x, y, and z, together sum to one, as shown in Equation (1), and are mathematically derived by taking the ratios of the respective X, Y and Z tristimulus values of a color to the sum of all three tristimulus values, as shown in Equations (2), (3), and (4) below:

$$x + y + z = 1 \tag{1}$$

$$x = \frac{X}{(X+Y+Z)} \tag{2}$$

$$y = \frac{Y}{(X+Y+Z)} \tag{3}$$

$$z = \frac{Z}{(X+Y+Z)} \tag{4}$$

The resulting x and y chromaticities are then plotted on the two dimensional chromaticity diagram 164 shown in prior art FIG. 13. The horseshoe-shaped "spectrum locus" 105 is a set of points representing the x, y chromaticities of the spectrum (monochromatic) colors, plotted according to their wavelengths. For example, in the illustrated embodiment of the color editing GUI 10 of the present invention shown in FIG. 7, wavelength designations ranging from 380 to 700 nanometers are plotted in chromaticity diagram 160 to form the outline of the spectrum locus 102. The x and y chromaticity coordinates for any naturally occurring color are located within the bounds of the spectrum locus 105 (FIG. 13) and the line 107 that joins the ends of the spectrum locus, referred to as the "purple line". The source of the x, y values used to plot the spectrum locus in the illustrated embodiment is identified in Table A.5 in Appendix A. Various illuminants are used for measuring colors and specifying tristimulus values and chromaticities, and the illuminant used to measure and compute a color's tristimulus values is generally specified when denoting colors on the chromaticity diagram. In FIG. 13, CIE standard illuminant $D_{50}$, with an approximate correlated color temperature of 5000 degrees Kelvin, is shown on chromaticity diagram 164 at point 106.

As noted earlier in the discussion accompany FIG. 7, the graphical representation 160 of chromaticity diagram 164 is presented in color space display window 112 on a display device by color editing GUI 10 of the present invention as one of the contexts the system user may use to edit colors. FIG. 13 illustrates the regions on the chromaticity diagram where colors in the same "hue" family will be found, denoting these regions with drawing reference numerals from 51 to 73. "Hue" is the attribute of visual sensation which has given rise to color names such as blue, green, yellow, purple, and so on. Table 3 provides a corresponding key of color names identifying the color regions represented on chromaticity diagram 164. The color naming conventions used in Table 3 follow the color naming conventions set forth by the U.S. Dept. of Commerce, National Bureau of Standards in Color: *Universal Language and Dictionary Names*, NBSS Special Publication 440 (Washington, D.C., 1976), at pages 1 through 14. The upper area of chromaticity diagram 164, generally in region 73, contains the various chromaticities that are in the green hue family. Blues and violets generally occur in regions 68, 69, 70, and 71, while reds are found generally in regions 59, 60, 61, 62, 63, and 64. Yellow colors in region 55, orange in region 57, and other related colors fall between the green region 73 and the red region 60.

TABLE 3

Figure 15:
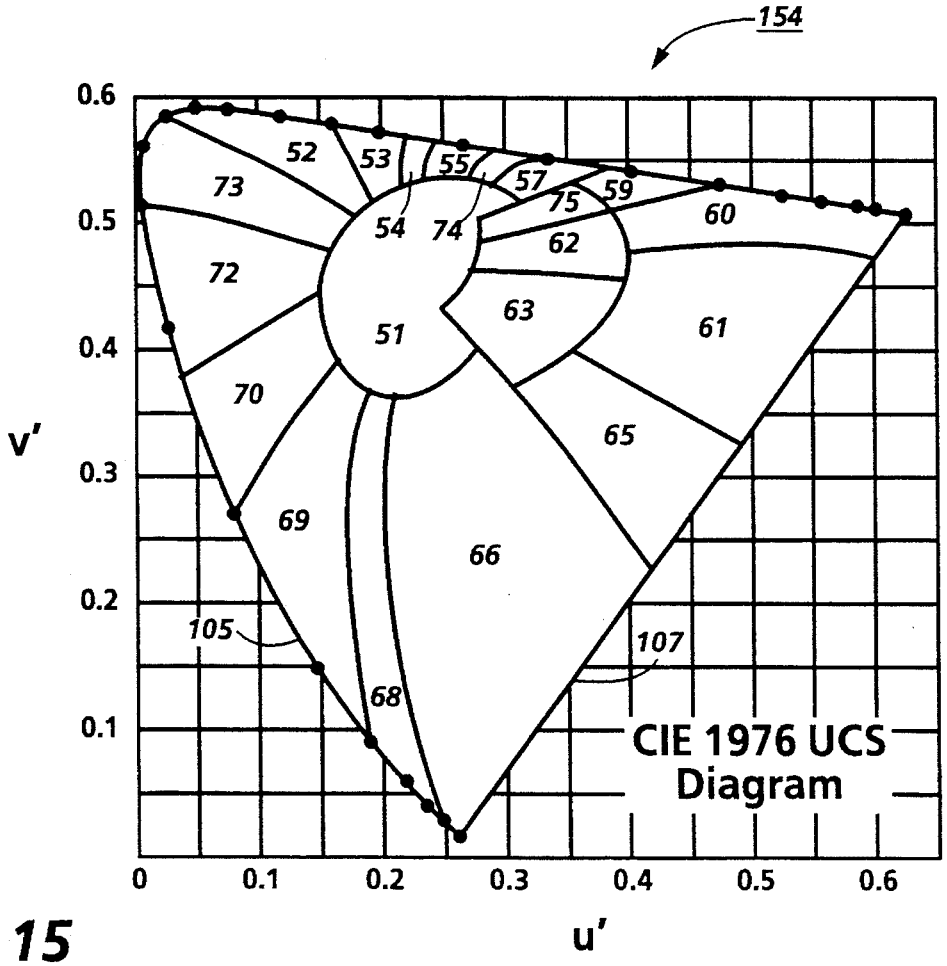
Fig 15 (Prior Art)
FIG. 15 illustrates the 1976 Uniform Chromaticity Scale Diagram, one of the uniform color spaces in which color editing according to the present invention is accomplished, and shows the regions of the diagram corresponding to naturally perceived colors.

Reference Numerals and Color Names
FIGS. 13 & 15

| Ref. No. | Color Name |
|---|---|
| 51 | ILLUMINANT AREA |
| 52 | YELLOWISH GREEEN |
| 53 | YELLOW GREEN |
| 54 | GREENISH YELLOW |
| 55 | YELLOW |
| 56 | YELLOWISH ORANGE |
| 57 | ORANGE |
| 58 | ORANGE PINK |
| 59 | REDDISH ORANGE |
| 60 | RED |
| 61 | PURPLISH RED |
| 62 | PINK |
| 63 | PURPLISH PINK |
| 64 | RED PURPLE |
| 65 | REDDISH PURPLE |
| 66 | PURPLE |
| 67 | BLUISH PURPLE |
| 68 | PURPLISH BLUE |
| 69 | BLUE |
| 70 | GREENISH BLUE |
| 71 | BLUE-GREEN |
| 72 | BLUISH GREEN |
| 73 | GREEN |
| 74 | ORANGE YELLOW |
| 75 | YELLOWISH PINK |

An important property of chromaticity diagram 164 is that all mixtures of two colors lie on a straight line segment connecting the two colors. For example, in FIG. 13A, straight line segment 79 connecting colors 77 and 78 plotted on chromaticity diagram 164 provides the context for mixing colors 77 and 78. Mixing colors 77 and 78 produces a mixture color having x, y chromaticity values which lie along line 79 and which is at a distance along the line from each of the component colors 77 and 78 inversely proportional to the amount of the component colors 77 and 78 in the mixture color. Also, as can be seen from FIG. 13 and Table 3 and how color names are mapped to labeled regions 52 through 63, color 77 in chromaticity diagram 164, which lies in color region 71 on FIG. 13, and color 78, which lies in color region 73, have different hues, since color region 72 lies between these two regions.

The center area 51 of chromaticity diagram 164 of FIG. 13 is an area of predominantly achromatic, neutral colors, including greys, whites, and blacks. Dotted line segment 80 in FIG. 13A, extending from spectrum locus 105 through .color 76 and through white point 106, illustrates the concept of the "saturation" of color 76. "Saturation" is the attribute of color perception that expresses the colorfulness of an area, judged in proportion to its brightness, or the color's degree of departure from an achromatic grey color, regardless of the color's brightness. Thus, the more saturated a color is, the farther away it is from the neutral and gray region 51 (FIG. 13) of chromaticity diagram 164. Similarly, the closer a color, such as color 76, is positioned on line 80 away from spectrum locus 105 and toward white point 106, the more disaturated the color is.

Chromaticity diagram color space 164 may also be represented as a three dimensional space (called the CIE x,y,Y space) where the Y dimension is the Y stimulus value for a color given by the chromaticities, x and y, and is proportional to the photometric quantity of "luminance ". For a black surround, the Y stimulus correlates with a color's "brightness", technically defined as the attribute of a visual sensation according to which the area in which the visual stimulus is presented appears to emit more or less light in proportion to that emitted by a similarly illuminated area perceived as a white stimulus. The term "lightness" may be referred to as relative "brightness", and variations in lightness range from "light" to dark".

FIG. 14 shows all realizable object (natural) colors, shown as object color solid 162, with respect to the standard observer and CIE standard illuminant $D_{65}$, shown at point 109. Planes 80, 82, 84, and 86, dividing object color solid 162, created at luminance (Y) values equal to 20, 40, 60, and 81, respectively, illustrate that chromaticity boundaries in the x and y dimension change shape and are progressively smaller at higher lightness levels, indicating that fewer realizable object colors in color regions 51 thru 73 (FIG. 13) exist at increasing luminance levels. In color editing GUI 10, when the user manually adjusts the color signal controlling the perceived lightness (or darkness) of a color (as described earlier in the discussion accompanying FIG. 12), it is helpful for the user to conceptualize the change as the color changing planes in object color solid 162. Control over the lightness dimension of a color is also readily conceptualized in the 1976 CIE 1976 (L*a*b*) color space described below.

2. The 1976 Uniform Chromaticity Scale Diagram

A disadvantage of the 1931 Chromaticity Diagram is the fact it does not uniformly express perceived differences between colors. That is, a given change in the chromaticity of a color will not necessarily result in a proportional change in the perceived color, and a very small change in a color's chromaticity may actually result in a disproportional perceived color difference. Consequently, other color spaces, in particular other CIE color spaces, more uniformly representing human color perception attributes and differences, may be more suitable to a user of color editing GUI 10 for editing purposes. While color editing GUI 10 of the present invention provides two additional CIE spaces in which colors may be edited, those skilled in the art will appreciate that any uniform color space with mathematical transformations between tristimulus values and the color space coordinates may be used as a context in which to edit, modify and display colors according to the GUI of the present invention.

Another CIE color space suitable for use in the present invention is the 1976 Uniform Chromaticity Scale Diagram 154, also known as the CIE 1976 UCS diagram, the "u', v' (u-prime, v-prime)" diagram, and the CIE metric diagram (hereafter referred to as the "UCS diagram"), illustrated in FIG. 15. UCS diagram 154 is a mathematical transform of the 1931 CIE space which better represents the discrimination of color attributes hue and saturation in such a manner as to represent equally spaced color differences as points separated by nearly equal distances. In a manner similar to that in FIG. 13, FIG. 15 illustrates numbered regions on the UCS diagram where colors in the same hue family are found, denoting these regions with reference numbers from 51 to 75. Table 3 provides a corresponding key of color names identifying the color regions represented on UCS diagram 154. UCS diagram 154 more directly supports the perceptual attribute of "saturation" than does chromaticity diagram color space 164. In addition, the UCS space more readily allows visualization of certain perceptual relations among colors, such as, for example, being able to identify when two colors will be equally saturated, or to identify when two colors will appear different in both hue and saturation.

3. The CIE 1976 (L*a*b*) Color Space

As already noted, modifying colors using the implemented embodiment of color editing GUI 10 may also be performed using graphical representation 130 of the 1976 CIE color space, as shown in FIGS. 4, 9, 11 and 12, where a numerically computed color difference bears a closer relationship to a color difference actually perceived by a human observer. CIELAB space is an opponent-type color space, based on the opponent-color theory used to describe or model human color vision, which maintains that all colors are coded by the eye and brain into light-dark, red-green, and yellow-blue signals. In a color model of this type, opposite colors are mutually exclusive, and a color a cannot be red and green at the same time, and a color cannot be yellow and blue at the same time, but a color can be described as red and blue, as in the case, for example, of purple.

Figure 16A:
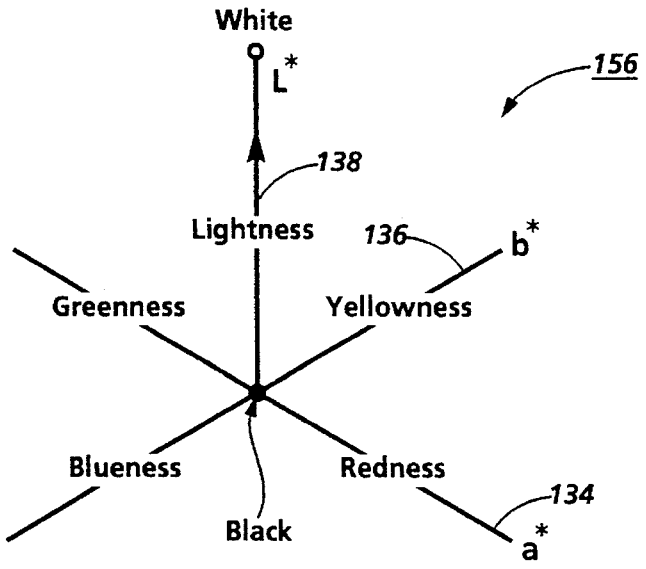
Fig.16A (Prior art)
FIGS. 16A and 16B illustrate the uniform CIE 1976 (L*a*b*) color space in which color editing according to the graphical user interface of the present invention may be performed, showing color representation in three-dimensional rectangular and cylindrical coordinate systems, respectively.

FIG. 16A illustrates a three-dimensional rectangular coordinate view of opponent-type CIELAB color space 156. Two opponent coordinate axes 134 and 136, represented by a* (a-star) and b* (b-star) respectively, describe the chromatic attributes of color. The a* axis 134 represents the red-green coordinate, where positive values of a* denote red colors, while negative values denote green colors. The b* axis 136 represents the yellow-blue coordinate, where positive values represent yellows and negative values signify blues. The a* and b* coordinates are roughly correlated to the postulated corresponding channels in the human visual system.

The L* (L star) coordinate defines a perceptual correlate of a color's "psychometric lightness". Lightness is defined as the attribute of a visual sensation according to which the area in which the visual stimulus is presented appears to emit more or less light in proportion to that emitted by a similarly illuminated area perceived as a "white" stimulus. Lightness is thus an attribute of visual sensation that has meaning only for related visual stimuli, and may be referred to as "relative brightness". L* is in the range of 0 to 100. The central L* axis 138 of the CIELAB color space lies perpendicular to the a*, b* plane and achromatic or neutral colors (black, gray, and white) lie on L* axis 138 at the point where a* and b* intersect (i.e., where a*= 0, b*= 0).

Colors specified as tristimulus values X, Y, and Z are located in rectangular CIELAB space according to the formulas in Equations (5) through (7):

$$L^* = 116\left(\frac{Y}{Y_n}\right)^{1/3} - 16 \tag{5}$$

$$a^* = 500\left[\left(\frac{X}{X_n}\right)^{1/3} - \left(\frac{Y}{Y_n}\right)^{1/3}\right] \tag{6}$$

$$b^* = 200\left[\left(\frac{Y}{Y_n}\right)^{1/3} - \left(\frac{Z}{Z_n}\right)^{1/3}\right] \tag{7}$$

with the constraint that $X/X_n$, $Y/Y_n$, $Z/_{Zn}>0.01$. The terms $X_n$, $Y_n$, $Z_n$ are the tristimulus values for the reference white for a selected standard illuminant and observer, with $Y_n$ equal to 100 for the perfect diffuser. Those skilled in the art will appreciate that the display reference white illuminant (maximum Y) may also be used for the $Y_n$ value in Equations (6), (7), and (8). Additional information on selecting the reference white may be found in Hunt, R. W. G., *Measuring Color,* Chapter 5, Section 5.9, pp. 114–116. Those skilled in the art will also appreciate that additional formulas are available for the case where $X/X_n$, $Y/Y_n$, $Z/Z_n<0.01$; these formulas may be found in the references included below.

As those skilled in the art are aware, mathematical manipulations of colors described in L*, a*, and b* rectangular coordinate CIELAB space may also be accomplished in cylindrical coordinates which permit identification and manipulation of the perceptual correlates of "hue" and "chroma". The formulas for computing the hue and chroma correlates are given in Equations (8) and (9), and the third coordinate, L*, is given above in Equation (5):

$$h_{ab} = \tan^{-1}\left(\frac{b^*}{a^*}\right) \tag{8}$$

$$C^*_{ab} = [(a^*)^2 + (b^*)^2]^{1/2} \tag{9}$$

In Equation (8), the quadrant of the resulting angle depends on the particular combination of positive or negative signs of a* and b*.

Figure 16B:
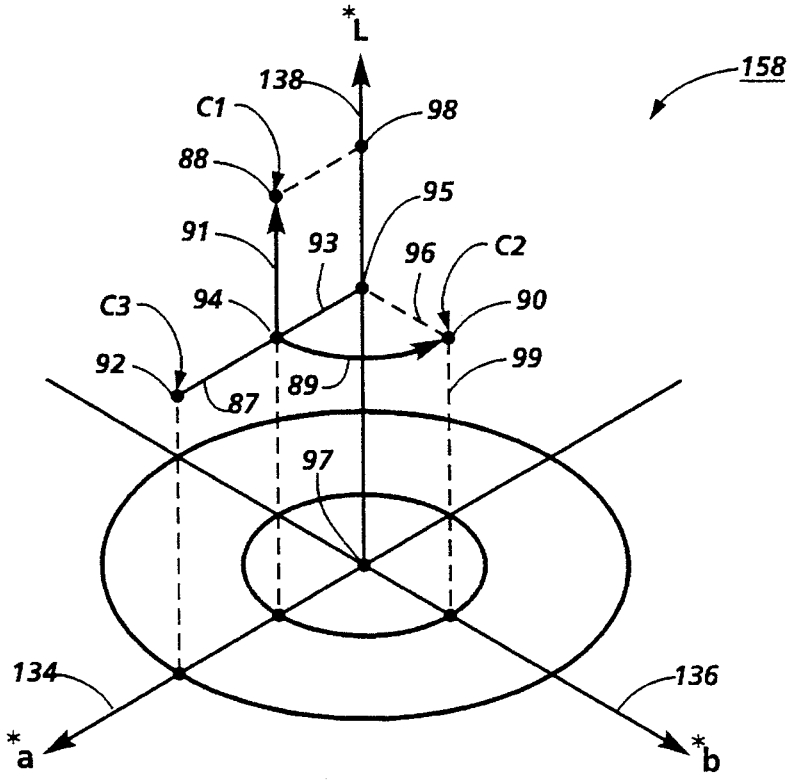
Fig.16B (Prior art)

Turning now to FIG. 16B, there is illustrated a three dimensional view of cylindrical coordinate CIELAB space 158. Colors C1 at point 88, C2 at point 90, and C3 at point 92 are each defined in this view of CIELAB space by their hue, lightness, and chroma coordinates. As already noted above, hue is defined as the attribute of visual sensation which has given rise to color names such as blue, green, yellow, purple, and so on. A hue correlate in cylindrical CIELAB space is the angle which correlates to a hue numerically by an angle ranging from 0.0 to 360.0 degrees, with values evenly distributed around the L* axis 138 from the positive a* axis 134, and with red corresponding to hue= 0.0 degrees. The hue angles of color C1 at point 88 and color C3 at point 92 are both equal to 0.0 degrees since colors C1 and C3 fall directly on a* axis 134. The hue angle of second color C2 at point 90 is defined by hue angle 89 from the positive a* axis 134. Note that it can also be determined from FIG. 16B that the change in hue-angle between colors C1 88 (or colorC3) and C2 90 is also equal to hue-angle 89.

The "colorfulness" or "chromaticness" of a color is the attribute of visual sensation according to which an area appears to exhibit more or less of its hue. Chroma is an object's colorfulness judged in proportion to a similarly illuminated achromatic area. A different range of chroma is available for various hue-angles as well as for various lightness (L*) levels. Thus, the chroma of a color has a correlate in cylindrical CIELAB space radiating out perpendicularly from central L* axis 138 and is the distance away from the achromatic, or gray, central L* axis 138 for a given lightness (L* level) and hue-angle. Chroma, then, is orthogonal to both the hue-angle and lightness, and is different from the perceptual correlate of saturation, since saturation contains both lightness and chroma. With continued reference to FIG. 16B, the chroma of color C1 is defined as the measure of the radial distance along line 93 from point 95 directed radially outward from L* axis 138 to point 94. Similarly, the chroma of second color C2 at point 90 is defined as the measure of the radial distance along line 96 from point 95 to C2 at point 90. It can also be seen from FIG. 16B that color C1 88 differs in chroma from color C3 92 by the change in chroma along line 87 from point 94 to point 92.

In color editing GUI 10, when the user manually adjusts the color signal controlling the perceived lightness (or darkness) of a color (as described earlier in the discussion accompanying FIG. 12), it is helpful for the user to conceptualize the change as the color changing slices in the cylindrical coordinate color space 158 shown in FIG. 16B. For example, the lightness of color C1 correlates to the distance along L* axis 138, in the range from 0 to 100, from point 97, where L*= 0, to an L* value defined at point 98. Thus, color C1 lies in a plane perpendicular to L* axis 138 that cuts through L* axis 138 at point 98. It can also be seen from FIG. 16B that color C3 92 lies in a plane perpendicular to L* axis 138 that cuts through L* axis 138 at point 95. Color C1 88 differs in lightness from color C3 92 by the difference in lightness along line 91 from point 94 to point 88.

4. Transformations Between Physical Device Color Specifications and Tristimulus Values It is preferable, in implementing the color editing GUI of the present invention, to utilize a device independent color specification to which all input palette colors and gamut measurements are referenced, or calibrated. Calibration establishes a correspondence between device coordinates and some universal metric such as CIE tristimulus values. The implemented embodiment of color editing GUI utilizes a standard, or "universal" calibrated device called the Xerox RGB Linear model, from the Xerox Color Encoding Standard (CES). Thus, the assumption is made that the color specifications for the input palette colors and the measured device gamuts are created using phosphor and illuminant attributes of a standard "universal" device, where the reference illuminant is, for instance, $D_{50}$, such that the unit tristimulus values of the calibrated device's red, green, and blue primaries are defined so that their additive mixture has the same chromaticity as illuminant $D_{50}$ and a normalized luminance value of 1. This means that the RGB specification for a color specified according to this model is an RGB tristimulus specification of exactly the phosphor gun voltage levels, normalized between 0 and 1, needed to create a metamerically matching color on the standard calibrated device. Preferably, these calibrated RGB values are transformed using the RGB-to-XYZ matrix transformation for the XCES RGB Linear model to the device independent color specification of X, Y, Z tristimulus values. Further information regarding the Xerox Color Encoding Standard and its implementation may be found in the publication, *Color Encoding Standard,* published by Xerox Corporation, Xerox Systems Institute, Palo Alto, Calif. (XNSS 289005, May 1990) (hereafter, *Color Encoding Standard*). Information relevant to the calibrated color model and transformations between illuminants may be found in Chapters 2, 3, and 6, Section 6-3, incorporated by reference herein.

It is preferable that color editing GUI 10 manipulate colors internally in a uniform color space. The implemented embodiment uses the CIELAB color space as the uniform color space because of its substantial perceptual uniformity and because colors are defined in the context of a reference illuminant, but it is to be understood that any other suitable substantially perceptually uniform color space may be used for internal color specification manipulation. In order to maintain consistency and color accuracy, it is preferable to use the standard illuminant $D_{50}$ for the reference white for color conversions to CIELAB space using Equations (5), (6), and (7) above.

If the display device on which the user is performing color editing according to the invention is not necessarily a standard calibrated device, it might be necessary to create a calibration model for transforming the device independent XYZ tristimulus values for a standard input color and for modified colors to device dependent signals for displaying colors on the user's monitor. Creation of such a model is known in the art. Briefly, the red, green, and blue primaries and the reference white of the color monitor on which editing is to be performed are colorimetrically measured and a calibration model, in the form of a matrix which transforms input RGB signals into XYZ values, is created from these measurements. The calibration also takes into account the reference white of the user's monitor, the point where R=G=B= the maximum voltage. The inverse of the matrix transformation is applied to each palette color's tristimulus values to generate the RGB signals needed to display the color on the user's monitor. A calibrated RGB to XYZ transformation must be created for each monitor on which color editing GUI 10 is to be used.

To achieve optimal effectiveness with color editing GUI 10, it is preferable to use reference white illuminant $D_{50}$ for all internal color specifications. For input palette colors specified according to a reference white illuminant other than $D_{50}$, an additional white point transformation may also be needed to adjust the input palette color specification. Those skilled in the art will recognize that it is preferable to adjust the nonstandard color specifications of input palette colors and measured device gamuts to the standard calibration model using reference illuminant $D_{50}$ and the standard phosphor chromaticities.

Additional information relevant to defining color in the CIE system, for utilizing CIE color spaces for displaying and modifying colors in graphics applications, and for defining additional standard mathematical transformations between tristimulus values and coordinates in CIE color spaces, may be found in several well-known colorimetry and color science texts and publications. Specific attention is directed to the following references: Hunt, R. W. G., *Measuring Color,* Chapter 6, pp. 131–139 (hereafter, "Hunt"); Meyer, G. W., and D. P. Greenberg, "Perceptual Color Spaces for Computer Graphics", in *Color and the Computer,* H. J. Durrett, ed. Academic Press, 1987, pgs. 83–100; Thorell, L. G., and Smith, W. J., *Using Computer Color Effectively,* Prentice-Hall, 1990, Chapter 9, pp. 159–184; *Raster Graphics Handbook,* Conrac Corp., Covina Calif. (1980), pg. A3–15; and Hunter, R. S., and Harold, R. W., eds., *The Measurement of Appearance,* John Wiley & Sons, 2nd. Ed., 1987, Chapters 7–9, pp. 95–165.

We turn now to an overview description of the overall process flow of color editing GUI 10 and detailed descriptions of particular process flows.

D. Overview of Process Flow of Color Editing Graphical User Interface

The description following references a palette data structure, "StateRec", which defines all current processing data for implementing the color editing functions of color editing GUI 10 described in conjunction with FIGS. 4 through 12 above. StateRec also provides for data necessary to interaction handler 14 and I/O interface 16 (FIG. 3) for formatting and displaying the windows shown in FIGS. 4 through 12. Tables A.2, A.3, and A.4 in Appendix A (following this description of color editing GUI 10) contain field name, organizational, and content information about the StateRec data structure used during processing in the implemented embodiment described herein.

The detailed description following also references certain data values needed during color editing and processing for such functions as drawing the color spaces and displaying device gamuts. In particular, colorimetrically measured Cyan, Blue, Magenta, Red, Yellow, and Green primary colors are needed to display a device's gamut, x,y chromaticities of the spectrum (monochromatic) colors in nanometers are needed to display spectrum locus 102 (FIG. 6) (described in more detail below), and program instructions and descriptive information are needed to draw the coordinate systems of the color spaces available for display in color space window 112. Table A.5 in Appendix A summarizes this data, their sources, and structure.

Figure 17:
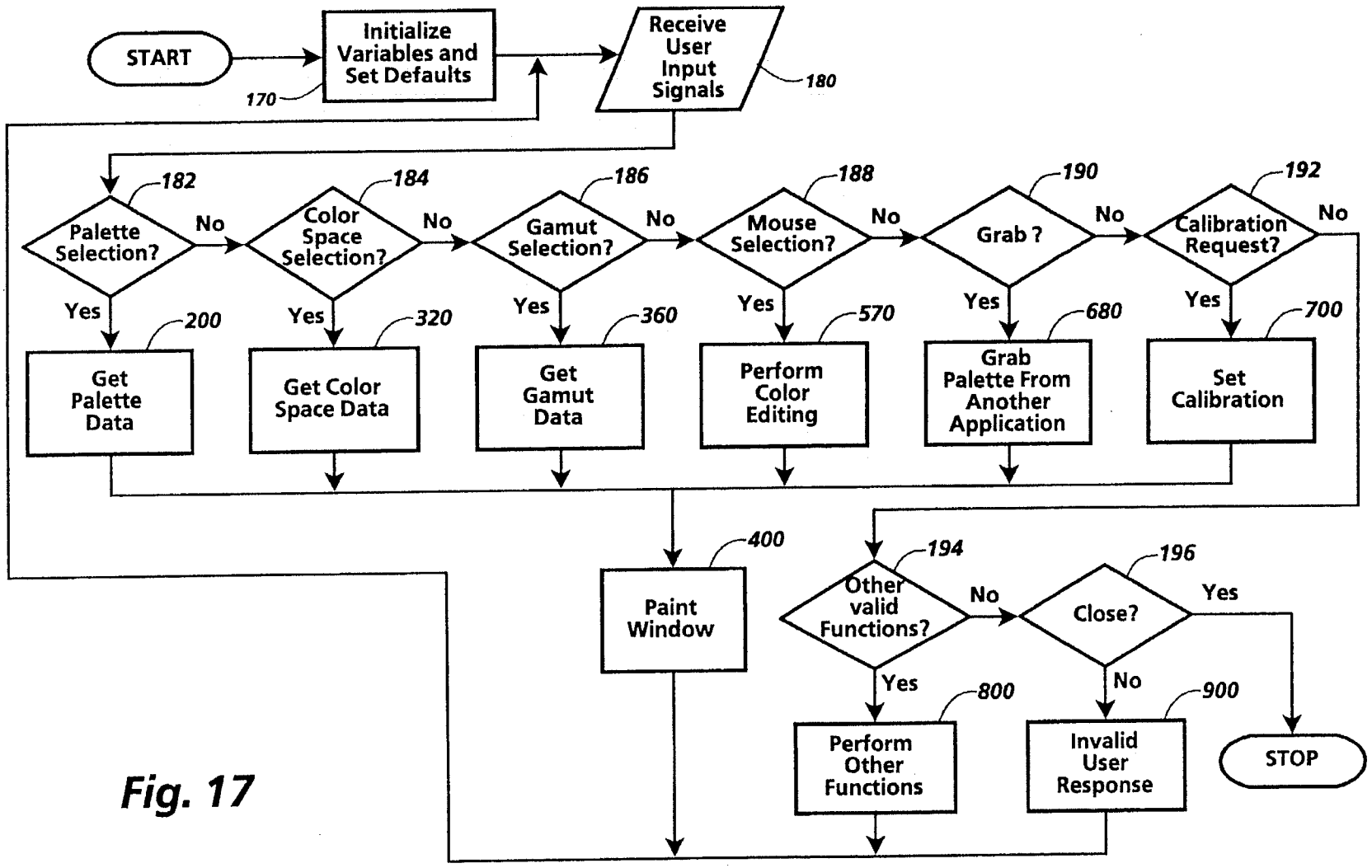
FIG. 17 is a flow chart illustrating the overall process flow for receiving and analyzing user input requests and executing color editing functions for the color editing graphical user interface of the present invention.

FIG. 17 illustrates the overall process flow resulting in the sequence of screen displays and color editing described in FIGS. 4 through 12. When color editing GUI 10 is invoked by the user, initialization procedures are performed in box 170, including several data retrieval and window processing routines which are specified in detail in FIG. 18.

1. Initialization Procedures a. Defining Windows and Menu Procedures

Figure 18:
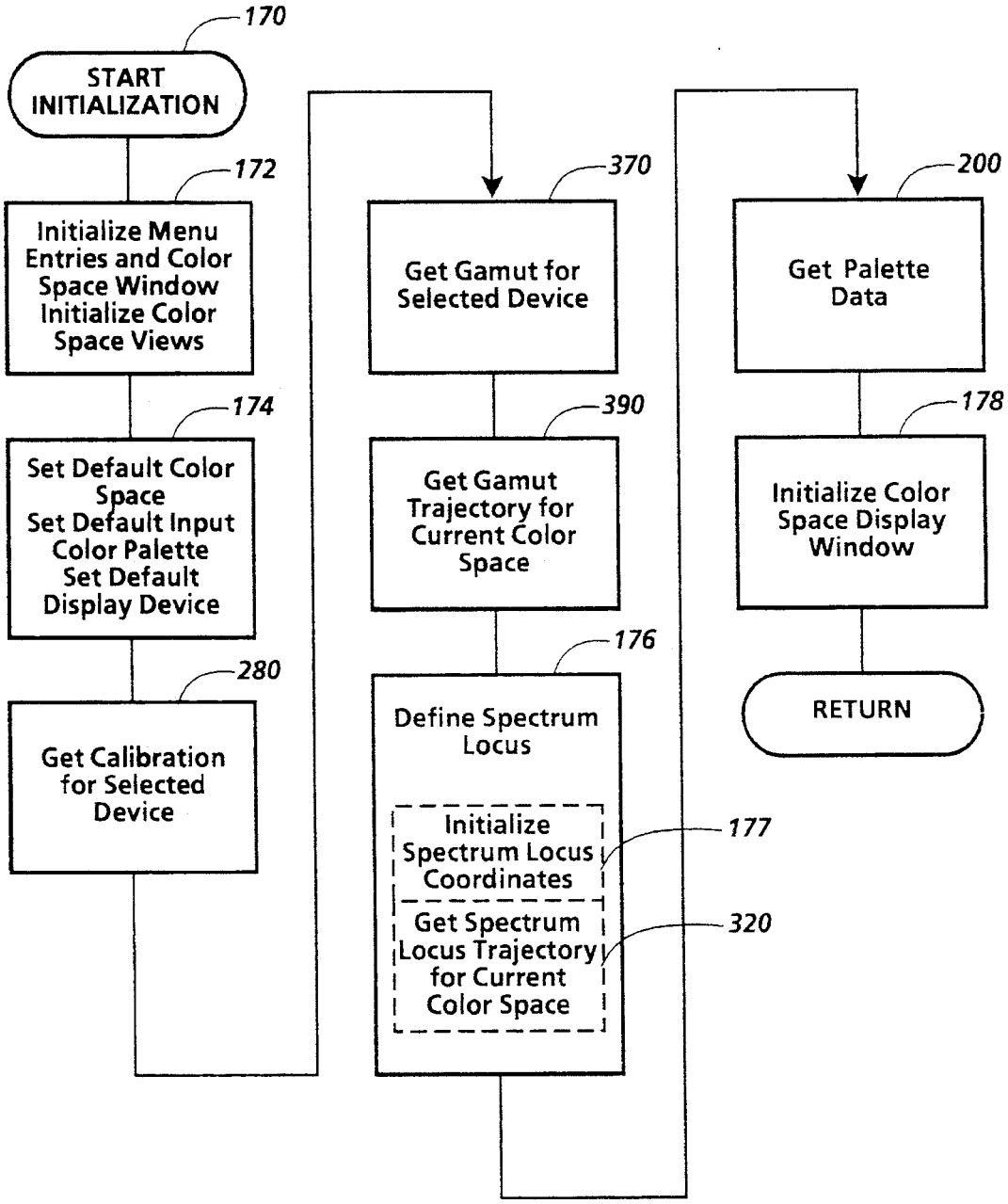
FIG. 18 is a flow chart showing in greater detail the operation of the initialization procedures illustrated in FIG. 17.

With reference to FIG. 18, in box 172, two window data structures are activated for defining menu area 114 and color space window 112 respectively. Menu entries in menu area 114 are defined and each entry is associated with the application procedure to be executed when the entry is selected by the user. The initialization procedures in box 172 also associate application routines for execution of window functions such as scrolling, painting the window, and saving the contents of the window. Next, also in box 172, an array data structure containing the data needed to physically graph the four color spaces (listed above in Table 1) available for display in color space window 112 is initialized with data for each color space, specifying the size of the color space rectangle, the orientation and spacing of the coordinate axis, and the font style of any identifying information appearing on the graph of the color space. During the initialization process, and later when the user selects a color space for display, information for the selected color space is moved into fields in StateRec, designated as "Window Manager Data Areas" in Table A.4.

Then, the initial data needed to process and display a default color space window 112 is collected in fields in the StateRec data structure (described in Tables A.2, A.3, and A.4 in Appendix A). First, in box 174, certain data variables in StateRec are initialized to default settings. The user's display device is established as the default monitor gamut to display in the color space, and this default is used in processing box 280, below. In addition, in the implemented embodiment of color editing GUI 10, the CIE 1976 UCS Diagram is established as the default color space to display, and appropriate color space drawing data is moved into the Window Manager Data Area fields in StateRec. A palette of colors is also assigned as the default palette for the software to initially retrieve and store. In an alternative implementation, these defaults may, of course, be changed to other selections or left for initial selection by the user. FIG. 4 shows CIELAB color space 130 displayed as the default color space.

b. Computing Display Device Calibration Matrices

Figure 19:
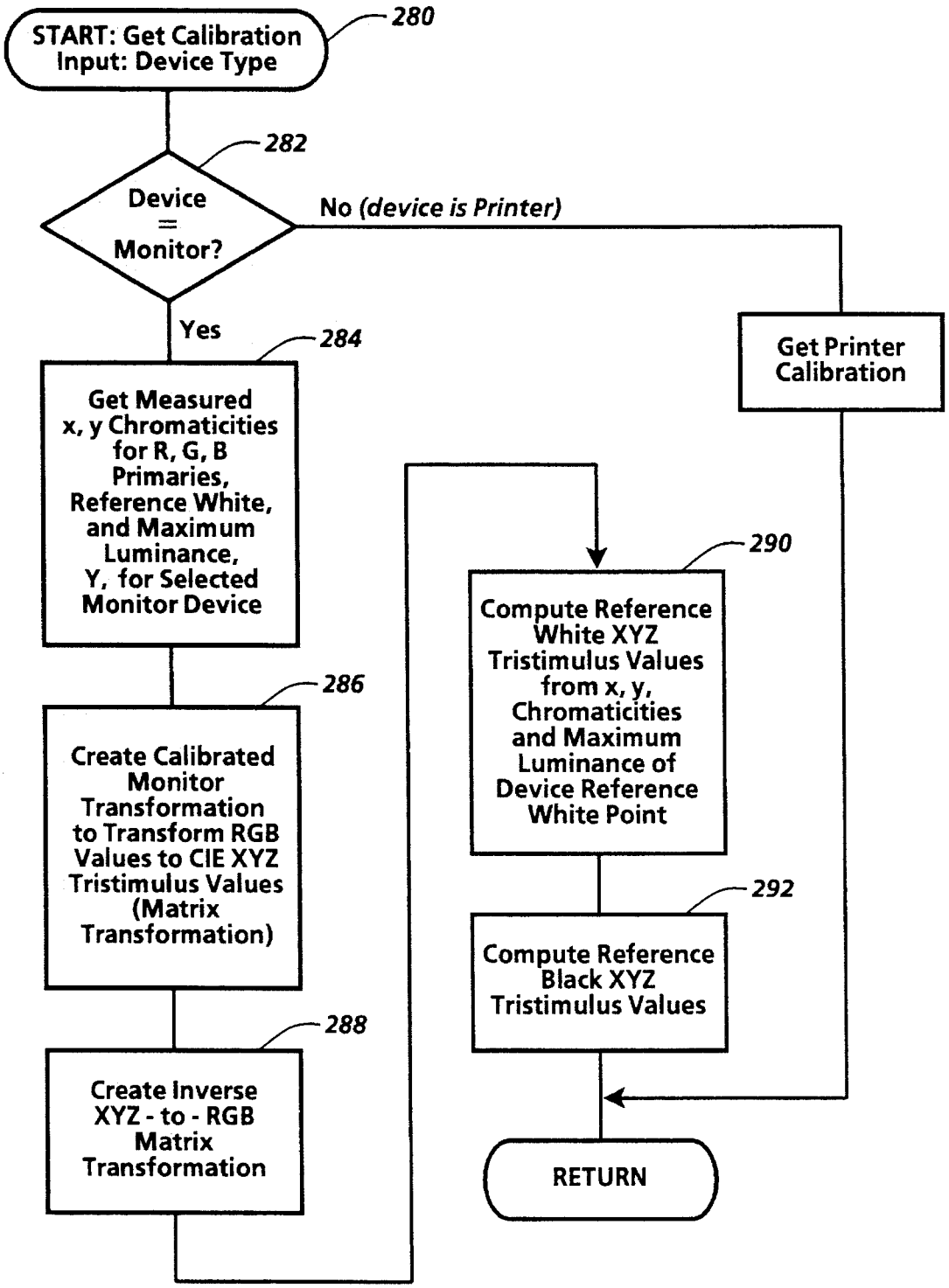
FIG. 19 is a flow chart illustrating the procedure for creating calibrated color device transformations for implementing the Get Calibration function illustrated in FIG. 18.

In procedure 280 (FIG. 18), monitor calibration data is computed for the user's monitor and stored in the "calData" data structure in StateRec. FIG. 19 illustrates the processing steps. After determining in box 282 that the selected device type is one of those identified as a monitor type, the measured x, y chromaticities for the R, G, B primaries and for the monitor's reference white point, and the maximum luminance, Y, of the reference white, are read, in box 284, from a program-resident table (Monitor Measurement Data, Table A.5) for the selected monitor device, into the appropriate fields in calData.calibration.data in StateRec. In box 286, this measured data is used to create, by known methods, the monitor calibration transformation that will be used to perform color transformations needed to display input and modified color palette data on the user's monitor. One such method for creating this matrix transformation is described in Hunt, Ch. 6, at pp. 131–139. The RGB-to-XYZ matrix is stored in the calData.calibration. RGBtoXYZ array in StateRec. Next, the inverse of this matrix is computed in box 288 and stored in the calData.calibration.XYZtoRGB array in StateRec. This transformation converts the internal XYZ color specification to an RGB color specification for display of the color on the user's monitor. Next the monitor's white and black points are computed from the measured data, in boxes 290 and 292 respectively, and stored in StateRec fields calData.white and calData.black.

Preferably, the Xerox RGB Linear RGB-to-XYZ transformation matrix, described in Color Encoding Standard, Ch. 3, is also stored in a data area in StateRec for converting input and modified palette colors between the device independent and standard monitor formats for internal color manipulation. This transformation may be read from a program-resident storage area or an external memory data structure, or computed in the same manner as the monitor calibration described above, using the standard illuminant and phosphor chromaticities.

c. Initializing Gamut and Spectrum Locus Data

Returning now to FIG. 18, the initialization procedure 170 continues with initialization processing for color gamut boundary data for the monitor gamut in box 370. As discussed more fully below in the detailed process flow description accompanying FIG. 25, RGB triplet values for measured monitor primaries red, green, blue, cyan, magenta and yellow are each transformed into device independent XYZ tristimulus values, preferably using the XCES standard monitor calibration, to produce a set of XYZ values for each primary of the monitor gamut boundary. These coordinates are stored in the array "gamutData" in StateRec. Gamut graphics data for plotting, in the default color space, the trajectory of the monitor gamut when requested by the user are processed next, in procedure 390, described below in the discussion accompanying FIG. 26. This gamut trajectory data is stored in the "gamut" field of StateRec. Next, in box 176, processing is executed for defining spectrum locus data. In box 177, the program resident data values representing the chromaticities of the points of the spectrum locus 102, shown in color spaces 150 and 160 in FIGS. 6 and 7, are read into the spectrum locus coordinates array (Table A.5). This initialization processing need occur only once during the user's color editing session. Graphics drawing instructions for plotting, in the default color space, the trajectory of the spectrum locus from the spectrum locus coordinates array are collected in the data structure "spectrumLocus" of StateRec for use by interaction handler 14 during the painting of color space window 112. The trajectory processing in box 390 is repeated whenever the user selects a new color space requiring display of the spectrum locus, and is discussed in more detail in the discussion accompanying FIG. 23 below.

With continued reference to FIG. 18, a default color palette is retrieved next, in box 200 and is stored in the "ColourCoords" record of the appropriate Palette array entry in StateRec. The processing details of box 200 is described below in the discussion accompanying FIG. 20. Finally, in box 178, the physical location on display 100, the number of menu lines to display, and other characteristics of color space display window 112, needed by interaction handler 14 (FIG. 3), are established. In the implemented embodiment of color editing GUI 10, color space window 112 is not actually painted on display 100 until a user request signal is received. The initialization processes encompassed in box 170 of FIG. 17 are now completed, and processing transfers to box 182 in FIG. 17 for receipt of a user input signal.

2. User Input Signal Processing and Basic Process Flow

Returning now to FIG. 17, user input signals are received in box 180 primarily from mouse buttons 34, 36, and 38 on mouse 32 (FIG. 2), when the cursor is positioned over menu entries on any of the menu lines of menu 114 (FIG. 6), or when the cursor is positioned over color space window 112. Boxes 182 through 196 analyze the received signals for subsequent processing. When the user requests the display of a color palette from menu 114 by selecting a palette name from menu line 114B (FIG. 8A) the inquiry in box 182 is satisfied, and processing transfers to box 200, where the color palette data is retrieved and prepared for subsequent display. Processing in box 200 is described below in conjunction with the discussion of the flowchart of FIG. 20.

Several user input signals result in window 112 being "repainted" with new information. "Paint Window" process, in box 400, is commonly accessed by the functions requiring the currently displayed window to be repainted, and is described in more detail below, beginning with the discussion accompanying the flowchart of FIG. 27. Selection by the user of a color palette to be displayed causes processing to proceed from box 200 to box 400, where window 112 is repainted with the new palette colors plotted in the currently displayed color space. If a color space has not been previously selected by the user, the default color space established during initialization procedure 170 (in box 174 of FIG. 18) is painted. The sequence of screens shown in FIGS. 4, 8A, and 9 illustrate the results of selecting a palette of colors for editing in CIELAB color space 130.

With continued reference to FIG. 17, when the user requests from menu 114, in the manner shown in FIG. 5, the display of a different color space in window 112, the inquiry in box 184 is satisfied, and processing transfers to box 320, where appropriate color space display data is retrieved and subsequently displayed by Paint Window process 400. Processing details of Get Color Space Data procedure 320 are described below accompanying FIG. 22. Similarly, when the the user requests the display or removal of a monitor or printer gamut outline from menu 114, as previously illustrated in the sequence of screens shown in FIGS. 9, 10A, and 11, the inquiry in box 186 is satisfied, and processing transfers to box 360, where appropriate gamut boundary data is retrieved and subsequently displayed by Paint Window process 400. The details of this processing are described in the discussion accompanying FIG. 24.

Some color editing features are initiated by the user through selection using the mouse. When the user clicks mouse 32 anywhere in color space window 112, either to select a color, to move a color, or to lighten or darken the color, the inquiry in box 188 is satisfied and processing transfers to box 570 where a procedure examines the mouse screen position to determine whether a color marker has been selected, and to determine which editing function has been selected, based on the sequence of mouse events received by the procedure. The details of this processing are described below beginning with the discussion accompanying FIG. 33A. After editing processing has been completed, the color space window 112 is repainted by the Paint Window process in box 400.

With continued reference to FIG. 17, using the "Grab" selection from menu 114, the user may request the display in color space display window 112 of a palette of colors from a concurrently executing illustrator or graphics software application program, or similar software program. The image or illustration itself may be displayed concurrently with color space display window 112, in a separate image display window. When the user makes this selection, the inquiry in box 190 is satisfied, and processing transfers to box 680 where the input palette colors are retrieved and subsequently displayed by Paint Window process 400. When a color is modified using one of the available editing techniques, the resulting modified color is immediately seen in the image or illustration shown in the image display window, in addition to being repainted in color space display window 112. This processing is described in more detail below at Part E.2.

An additional function provided by the implemented embodiment of color editing GUI 10 is a calibration request which results in the current palette of colors being automatically moved into a displayed printer gamut as a prediction of how the palette would be reproduced on the selected printer device. When color editing GUI 10 receives this request, the inquiry in box 192 is satisfied and processing transfers to box 700, where a matrix transformation is applied to the current palette colors to accomplish the prediction, and the resulting colors are plotted in the modified gamut of the printer device. This method is described in detail in a publication by the named inventor herein entitled "Method for Estimating Color Gamut Mapping on a Display Device," published in the Xerox Disclosure Journal, May/June 1992, pg. 171.

As discussed earlier, certain window display functions such as scrolling are also provided for via mouse selection in color editing GUI 10. In addition, Zoom, Save, Print, Reset, and Stop requests are also provided in menu area 114. The flowchart of the basic process flow in FIG. 17 has combined the processing for these functions. Requesting any of these other valid functions satisfies the inquiry in box 194 and initiates the appropriate processing in box 800. Vertical and horizontal scrolling and the "Zoom" function are handled using conventional windowing techniques which track which portion of the screen is currently in view in "translation" data fields in the Window Manager Data Areas (Table A.4) of StateRec. This ensures that the proper x and y window coordinates are used to identify a color selected for editing, as described below in the discussion accompanying FIG. 34. The "Reset" function causes color space display window 112 to be reset to its original position after a scrolling or zoom function has been executed. The "Reset" function also functions as an "undo" process, restoring the original input palette of colors from external memory 24 (FIG. 1) if a palette color has been edited. Selection of the "Save" request causes the current color information signals for the colors of all color palettes to be saved to external memory 24. Initiation of the "Print" process in the implemented embodiment results in a selection of printed outputs, including a printed copy of the graphical display currently shown in color space window 112, and a print file containing color data values in tabular form for the currently displayed palette. The "Stop" function provides a method for interrupting a color editing function in progress.

Invalid user requests are handled in a conventional error routine in box 900. Processing in color editing GUI 10 is terminated upon satisfying the user's request to terminate processing in box 196.

E. Detailed Process Flow: Retrieving Input Color Palettes

1. Retrieving and Displaying a Stored Input Color Palette

Figure 20:
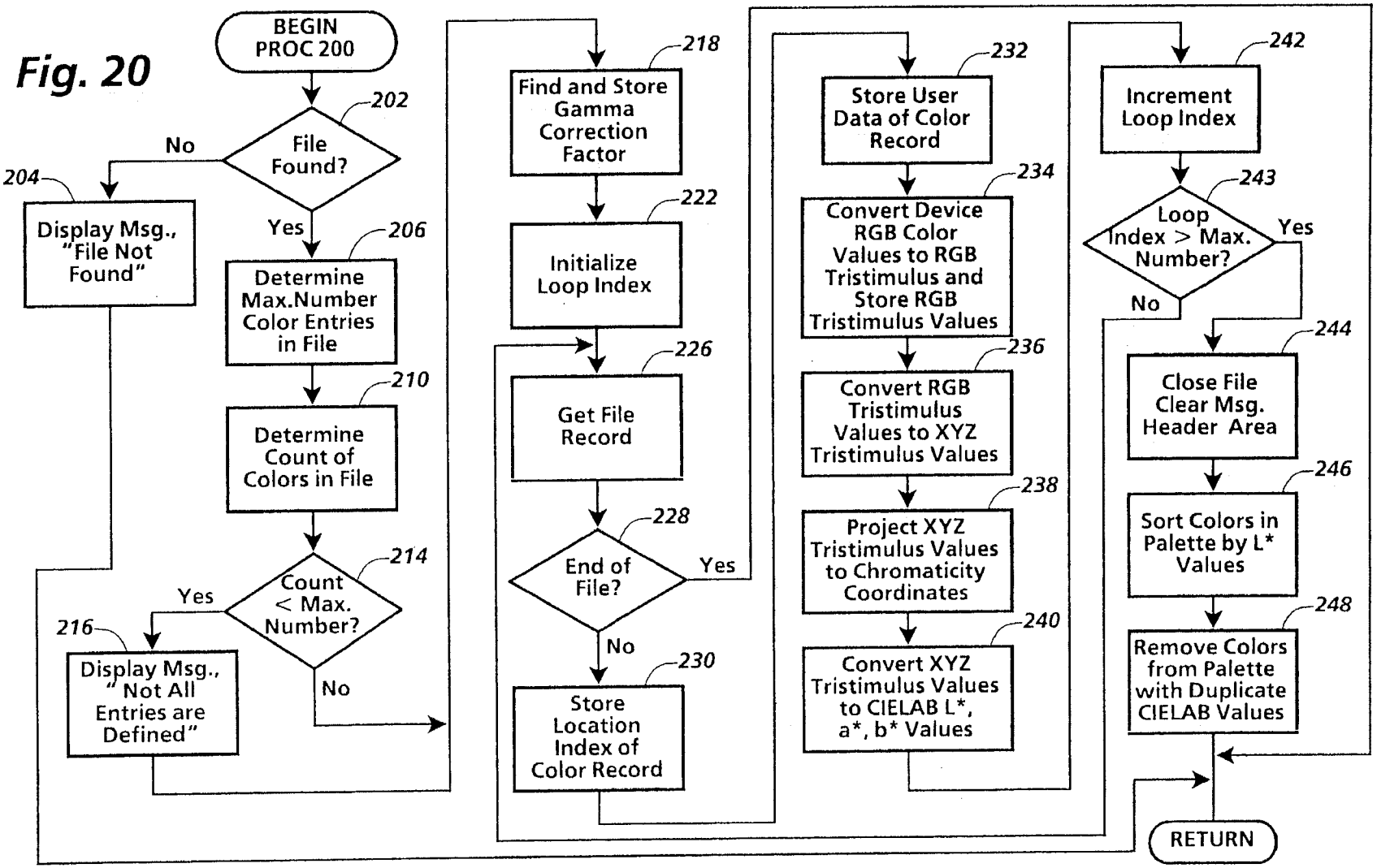
FIG. 20 is a flow chart illustrating the Get Palette Data procedure shown in FIG. 17, for the input of a palette of colors for editing according to the present invention.

Turning now to FIG. 20, there is illustrated the detail processing for procedure 200 illustrated in FIG. 17 for retrieving and preparing userrequested color palette data for display. Processing transfers to procedure 200 when the inquiry in box 182 (FIG. 17) is satisfied. Data for a color palette to be edited is derived from a data structure stored in memory 24. Typically the color palette data is part of a data structure that has been created by another software application, such as an illustrator, painting, design, or graphics program. The color palette data may also be retrieved directly from a color map data structure. The data fields of each external data structure available for color editing must be defined to color editing GUI 10.

In the illustrated embodiment, selected data structures containing color palette data were defined in color editing GUI 10 to appear on second menu line 114B (FIG. 8A) when the user selects menu item "Palettes",114A, with mouse 32. In a program-resident table, color editing GUI 10 associates each of the color palette names in the list of color palette names appearing on second menu line 114B with an actual data structure name for the data structure located in memory 24. When the user selects a list item from second menu line 114B, for example, item 114C (FIG. 4A), "Basic Colors", a table lookup is performed (not shown) to find the actual input data structure name of the selected data structure and the name is made available to procedure 200. At the same time, the value in the index variable "s", which is the location in the table where the data structure name was found, is made available to procedure 200 to use as an index into the state.palettes array (described in Table A.2 in Appendix A) where the color palette data for the selected data structure will be stored. In this manner, data for several externally- (memory-) resident data structures on which color editing is to be performed may be stored once for access one or more times by color editing GUI 10 during the user's color editing session.

With continued reference to FIG. 20, procedure 200 begins by testing whether the data structure to be retrieved is found in memory 24, in box 202. If the data structure name cannot be found, a message stating this result is displayed in message header area 110 of display screen 100 (FIG. 4) by box 204, and processing in box 200 is terminated. If the data structure is available in memory 24, processing continues in box 206, where the data structure is opened and the records are searched for a record or field identifying the number of bits per pixel used for color representation in the selected data structure. Color editing GUI 10 accommodates editing of color palettes created on systems with different color representation schemes. As noted above in the discussion of the color map in Part A. 1., an 8-bit color representation allows the definition of a total of 256 different colors. Similarly, a 4-bit color representation would permit a maximum of 16 colors to be specified. The maximum number of colors that could be specified in the selected palette is determined from the bits-per-pixel information. Next, in boxes 210 thru 216, the records containing color data in the selected data structure are counted and compared to the maximum possible number of colors to determine if all colors have been defined, and an informational message is displayed for the user in message header area 110 if all possible colors have not been defined.

Processing then continues to box 218, where the selected data structure is read to find an identified gamma correction factor for the RGB voltage values, and if this factor is found, it is retrieved and stored in the StateRec record field called "state.palettes[s].gamma". As noted above, the index "s" into the state.palettes array identifies one set of many color palette data sets that may be stored in StateRec.

With continuing reference to FIG. 20, in boxes 226 through 243, in a loop process, procedure 200 then examines each data field in the data structure and extracts and builds an array of color palette information known as "state.palettes [s].col", part of the StateRec record described in Table A.2. State.palettes[s].col is itself a variably-sized array structure, each entry of which contains processing data for one color in the palette. The array data structure in the implemented embodiment provides for defining a "size" parameter to contain the number of entries in the array after processing of all colors has been completed. In box 222, the loop index, i, is initialized. The first data area or record in the selected data structure is retrieved from memory 24 in box 226, and after testing for end-of-file in box 230, the integer value for the location or index of the retrieved record in the selected data structure is stored in state.palettes[s].col[i].tag. This enables later identification and updating of the data structure contents with modified color values when color editing is completed. The record is then examined in box 232 for record-specific identifying character data about the color, and, if present, this data is stored in state.palettes[s].col[i] .userData. Examples of such information may be the use of the color in the application which created the data structure, a color name, or any other identifying information.

The record is then examined in box 234 for the RGB triplet of phosphor gun voltage levels. Each voltage level is divided by 255 to compute a set of RGB tristimulus values representing the color. These values are stored in state.palettes[s].col[i].tris. Preferably, as noted above in Part C.4, the RGB tristimulus values represent color information signals according to the XCES standard monitor calibration. For nonstandard RGB values, appropriate transformations are needed to convert the RGB signals to XCES monitor calibration standard. Next, the RGB tristimulus values are converted to XYZ tristimulus values in box 236, preferably using the RGB-to-XYZ matrix transformation for the XCES RGB Linear standard monitor calibration, retrieved during initialization processing (FIG. 19). In the illustrated embodiment, the resulting XYZ tristimulus values are not themselves stored in the state.palettes[s].col record, but are then used, in box 238, to compute the x and y chromaticity values for the color.

Figure 21:
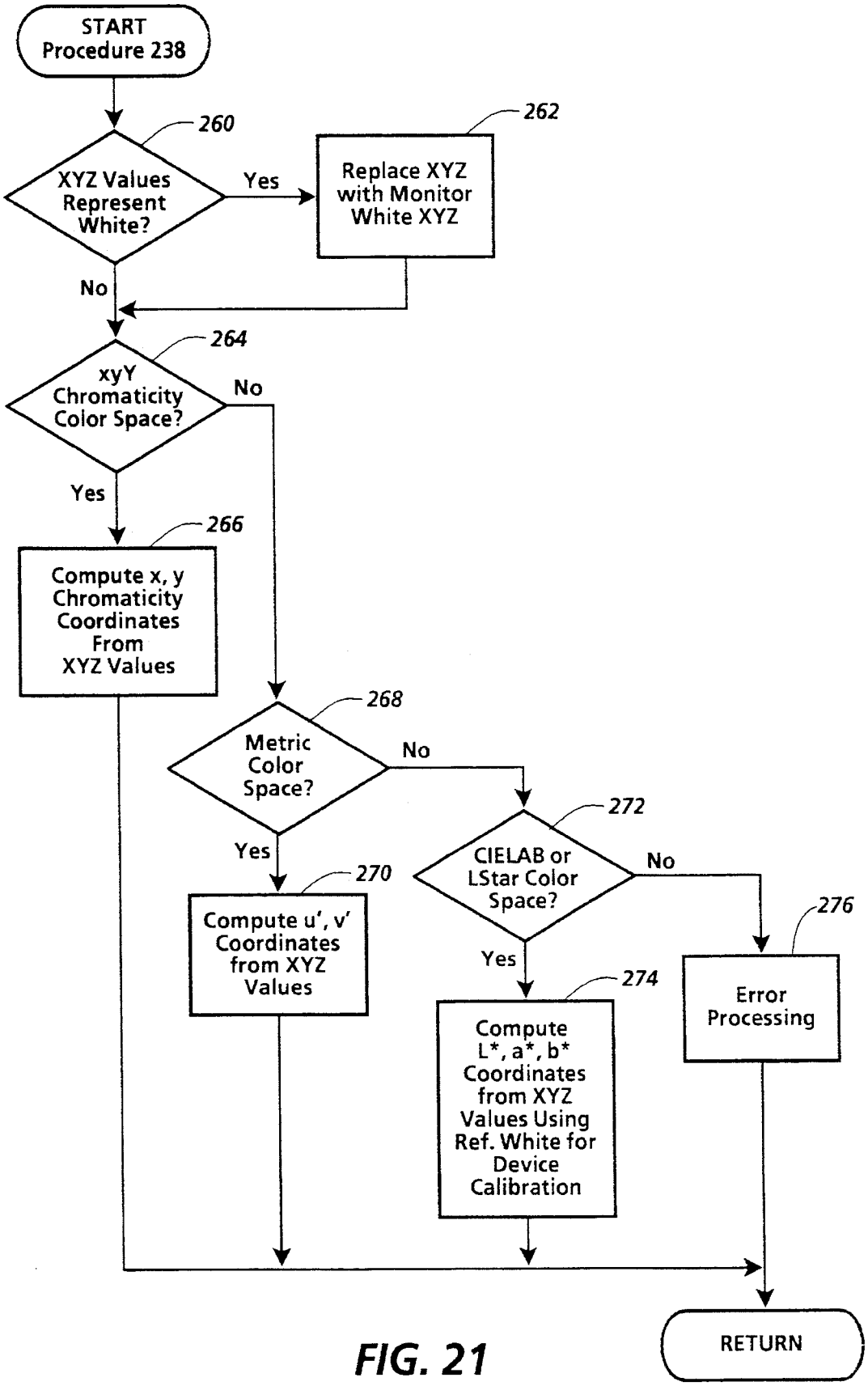
FIG. 21 is a flow chart illustrating the process for converting a color representation from one color space to another.

Processing in box 238 is actually transferred to Procedure 238 shown in FIG. 21, which provides a general conversion routine for converting a color's XYZ tristimulus values to a color specification in a selected color space. Procedure 238 returns the color specification as vector coordinates for use by a graphics procedure to draw lines or curves to the point (see e.g., discussion accompanying FIG. 23 below), but these vector coordinates are also equivalent to the actual color specification in a selected color space.

With continued reference to FIG. 21, procedure 238 receives as input the XYZ tristimulus values (determined in box 236 of FIG. 20), a parameter specifying the value of the current color space displayed in color space display window 112, and StateRec. The color space parameter is set to value "xYZ" (the Chromaticity Diagram) in box 238 (FIG. 20) prior to the call to the procedure. Procedure 238 tests the XYZ tristimulus values, in box 260, to determine if they represent a white color. If so, the XYZ tristimulus values for, preferably, the standard illuminant of the calibrated monitor, previously determined during initialization (FIG. 19) are copied, in box 262, to replace the XYZ tristimulus values for this color palette's white color. Processing then continues with tests in boxes 264, 268, and 272, where the color space parameter is evaluated, and processing transfers to the appropriate point. When called from Procedure 200, evaluation of the color space parameter in Procedure 238 results in satisfying the inquiry in box 264 and transfering processing to box 266, where the x,y chromaticities are computed from the XYZ tristimulus values, using Equations (2), (3), and (4) in Part C.1 above. Exiting from Procedure 238 returns the x,y chromaticities to Procedure 200.

Returning now to FIG. 20, in box 240, the computed chromaticity values are then stored in state.palettes[s].col[i].chr. CIELAB L*,a*, b* values are computed next from the color's XYZ tristimulus values using Equations (5), (6), and (7) above, and stored in state.palettes[s].col[i].lab.lstar, state.palettes[s].col[i].lab.astar, and state.palettes[s].col[i].lab.bstar, respectively.

It can be seen, then, that in the illustrated embodiment of color editing GUI 10, the StateRec data structure stores the RGB tristimulus, chromaticities, and L*,a*,b* values for each input color in the palette. These values are computed once and stored for performance optimization. Those skilled in the art will recognize that in an alternative implementation of Procedure 200 only the XYZ tristimulus values for each input palette color need be stored, and color values for different color spaces could be computed on an as-needed basis.

All color palette data have now been obtained from the current input record. The loop index is incremented in box 242, and compared to the maximum number of color entries in box 243, and processing continues in box 226 with the next available record in the data structure until the maximum number of entries has been reached. The loop then terminates, and, in box 244, the data structure is closed and the message header area 118 is cleared of messages. The color palette constructed in StateRec in state.palettes[s].col is now sorted, in box 246, in ascending order by L* value. Then, in box 248, color entries in the palette having duplicate CIELAB color values are removed. These duplicates are saved in an internal memory area, in order to ensure that the duplicate color entries are updated with modified color values when the external data structure is updated during the processing of a "Save" request. Procedure 200 now returns processing control to the next executable procedure, as shown on the overall processing flowchart of FIG. 17.

2. Editing a Color Palette Directly From Another Application

Color editing GUI 10 provides the user with the capability to edit a palette of colors from a concurrently executing illustrator or graphics software application program, or similar software program (hereafter, the application). When the user selects the "Grab" function from menu 114, the inquiry in box 190 (FIG. 17) is satisfied, and processing transfers to box 680 where the input palette colors are retrieved from an intermediate data structure which has been previously created by an interface procedure (the interface). The image or illustration itself may be displayed concurrently with color space display window 112, in a separate image display window.

The interface communicates among the data structure containing color information used by the application, procedures in the application, and procedures in color editing GUI 10. The interface intercepts the application's initialization procedure and traverses or enumerates the data structure in which the application stores the image or illustration before the application attempts to display for the first time the image or illustration. A color map is generated for the image display window containing the signals representing the colors currently used by the application for the image or illustration shown in the image display window concurrently displayed with color space display window 112 on display screen 100. The interface builds an intermediate data structure with these color information signals and a data field which represents the index entry into the color map. The interface simultaneously substitutes the appropriate color map index entry for each set of color information signals in the application's data structure. The interface permits color editing GUI 10 to directly access the color map controlling the window in which the application is executing without permanently altering the application's data structure until the end of the editing session, and only then upon a specific request to make the editing changes permanent in the application's data structure. The color information signals and color map index entries for colors used by the application are then retrieved for editing by color editing GUI 10 in Procedure 680 from the intermediate data structure and stored in a specific PaletteRec array record in StateRec, in a manner similar to the processing for Procedure 200, described above in the discussion accompanying FIG. 20. Those skilled in the art of implementing color software applications recognize that known techniques exist for creating the interface between the color editing GUI of the present invention and other application software to directly access, in the manner described above, the application software's color data structure both for input to and output from color editing GUI 10.

When the user modifies a color in the application's color palette using the editing features according to the present invention (described below in Parts G. and H.), processing included in Post-Clipping Procedure 650 (FIG. 37), tests whether the edited palette of colors has been "grabbed" from another illustration, and, if so, puts the modified color information signals into the color map used in the image window, using the stored color map index entry. The modified color information from the updated color map is immediately displayed in the illustration or image shown in the image window in the next display cycle, in effect "animating" the color map of the application software. The color space window 112 is also repainted with the new color palette when processing transfers, either after palette retrieval or after color editing, to the Paint Window process in box 400.

F. Detailed Process Flow: Painting the Color Space Window

As can be seen from the sequence of screen displays in FIGS. 4, 6, 7, 9, 11, and 12, color space window 112 contains a selected color space and a palette of colors, and may contain a displayed gamut boundary outline. The detailed process flows for selecting and formatting a color space for display, and for selecting and formatting a device gamut boundary for display are illustrated in FIGS. 22 thru 26.

1. Selecting a Color Space For Editing

Figure 22:
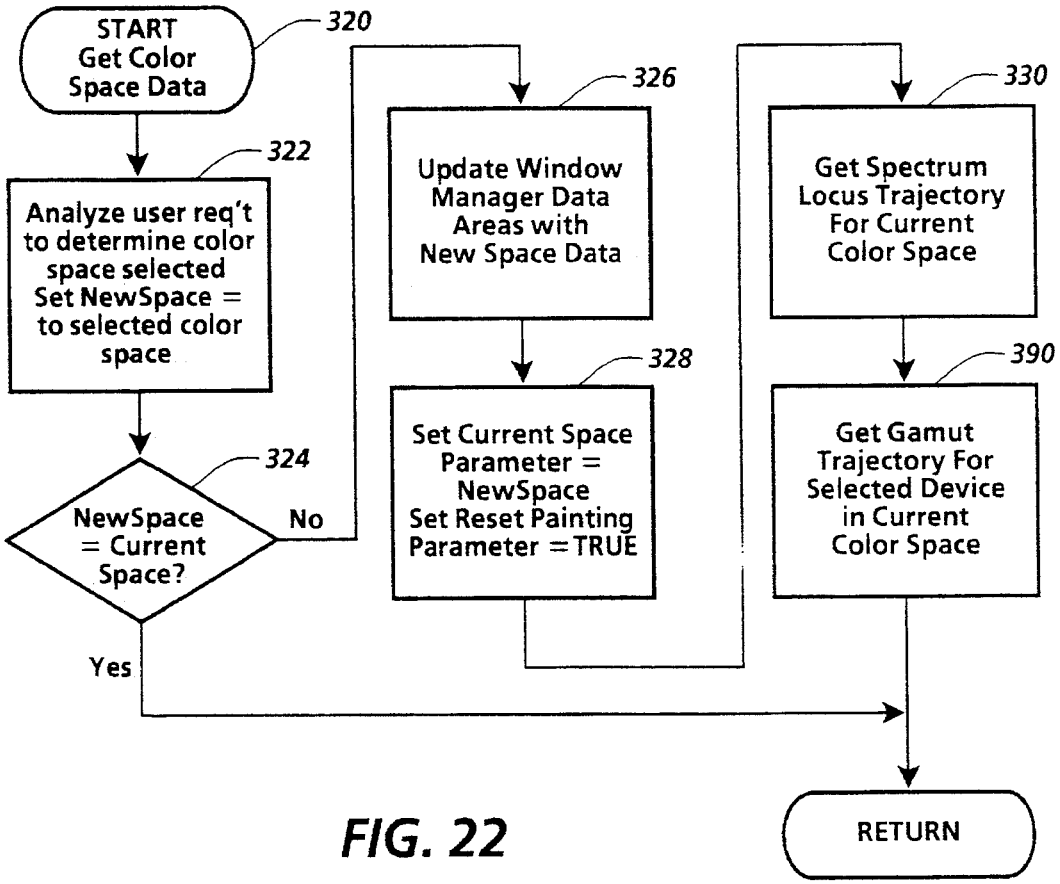
FIG. 22 is a flow chart showing the Get Color Space Data procedure shown in FIG. 17, for selecting a new color space for display.
Figure 23:
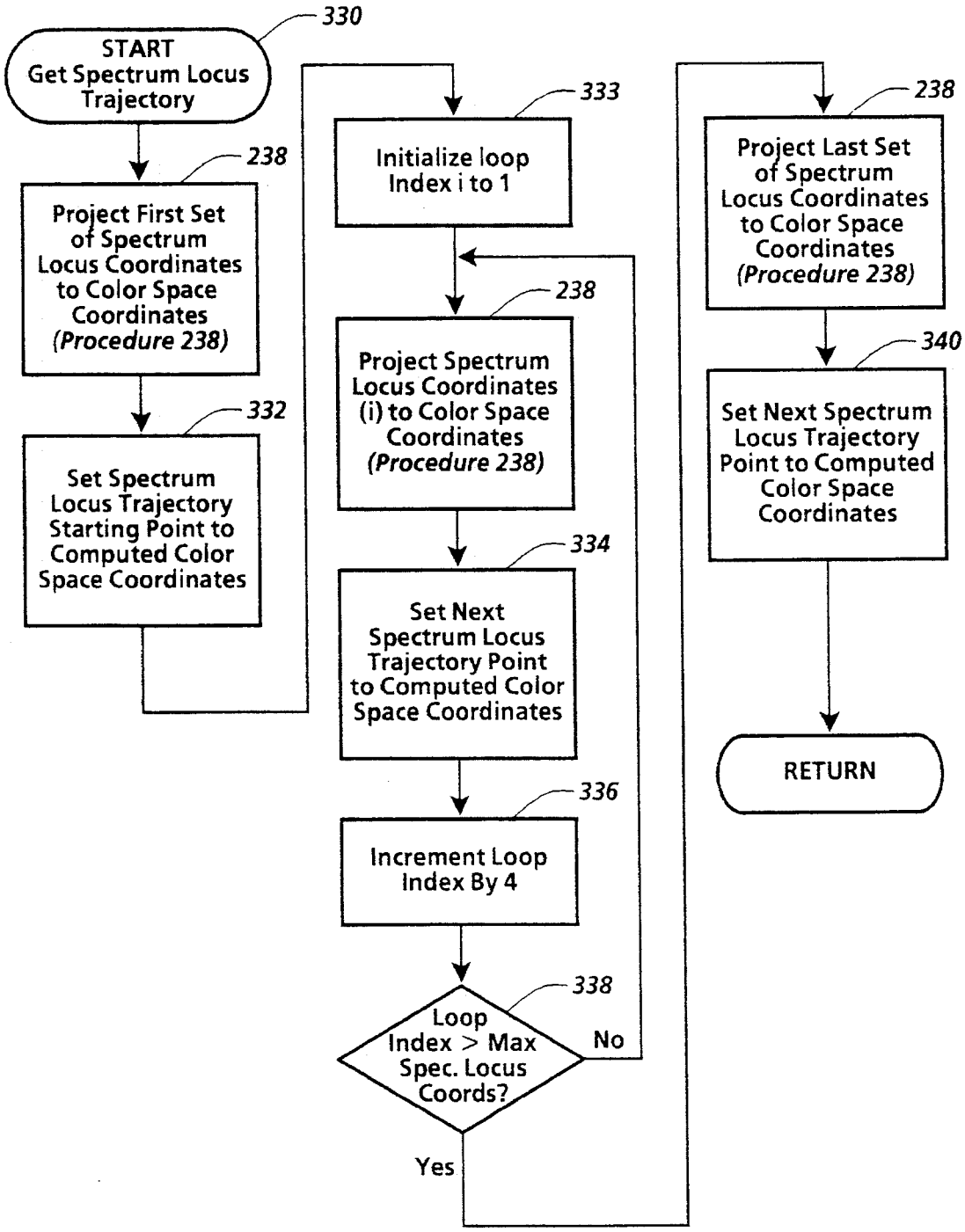
FIG. 23 is a flow chart illustrating the processing steps referenced in FIG. 22 for computing the data needed to draw the spectrum locus shown in FIGS. 6 and 7.

When the user requests the display of the color palette in a color space different from that currently displayed, the inquiry in box 184 (FIG. 17) is satisfied, and control transfers to a procedure for retrieving and formatting display and processing data for the selected color space, in box 320. Turning now to FIG. 22, procedure 320 analyzes, in box 322, the user's color space request for one of the valid color spaces listed in Table 1 above. A parameter called NewSpace is set to hold the value of the color space selected. If NewSpace is the same as the currently selected color space, the inquiry in box 324 is satisfied and processing control returns from procedure 320 without updating color space data. For a different color space, processing proceeds to box 326 where the Window Manager Data Areas in StateRec (Table A.4) are updated with necessary graphics information from the color space array structure initialized earlier in box 172 of FIG. 18. In box 328, the space variable in StateRec (state.palette[s].space) is updated to contain the new current color space, and state.palette[s].resetPainting, a boolean parameter in StateRec used for determining subsequent processing in Paint Window procedure 400, is set equal to a value of "True". Next, in box 330, the spectrum locus trajectory is recomputed for the new current color space. FIG. 23 illustrates this processing. Then, in box 390, the gamut trajectory is recomputed for the new current color space. Processing control then returns and proceeds to box 400 to paint color space display window 112 (see FIG. 17).

2. Formatting the Spectrum Locus Trajectory

With reference now to FIG. 23, the procedure 330, for recomputing the graphics data needed to display the spectrum locus in the new current color space, takes as input StateRec which contains the value of the current color space, and it returns, in the StateRec field, state.spectrumLocus, the graphics trajectory data needed by the I/O Interface 16 (FIG. 3) to draw the spectrum locus in the currently selected color space. The trajectory data consists of a series of coordinate points and instructions to draw lines from a prior position to the next coordinate position. Procedure 330 also has available to it the spectrum locus coordinate data structure initialized during initialization procedure 170, in box 177 (FIG. 18 and Table A.5). Procedure 330 uses procedure 238 (FIG. 21) to compute, from the first set of spectrum locus coordinates, the vector coordinates of that point in the selected current color space, and puts these coordinates in the state.spectrumLocus data structure, in box 332,for use as the starting point for drawing the spectrum locus trajectory. Then, in boxes 33 through 338, procedure 330 executes a loop for computing a selected number of spectrum locus trajectory points for the array of spectrum locus coordinates, also using procedure 238 (FIG. 21) to compute the coordinates. For every coordinate set computed, a function for drawing a line to that point in the color space is executed and the result put in the state.spectrumLocus data structure, in box 334. In the implemented embodiment, an array of 89 coordinates define the spectrum locus, and every fourth point is used to compute the next trajectory point by incrementing the loop index in box 336 by four in every loop iteration. This reduces the number of computations to be made which speeds up the display of the window contents, while still producing a smoothly drawn spectrum locus using graphics software 18 (FIG. 3) in the implemented system. However, any suitable number of points, or all of the points, may be computed for plotting in the selected color space. After the loop has been completed by satisfying the inquiry in box 338, the last set of spectrum locus coordinates is computed and the resulting trajectory line to those coordinates are put in the state.spectrumLocus data structure to complete the spectrum locus curve. Procedure 330 is not executed if the newly selected color space is the CIELAB or the CIELAB histogram color space.

3. Selecting and Formatting a Gamut For Display

Figure 24:
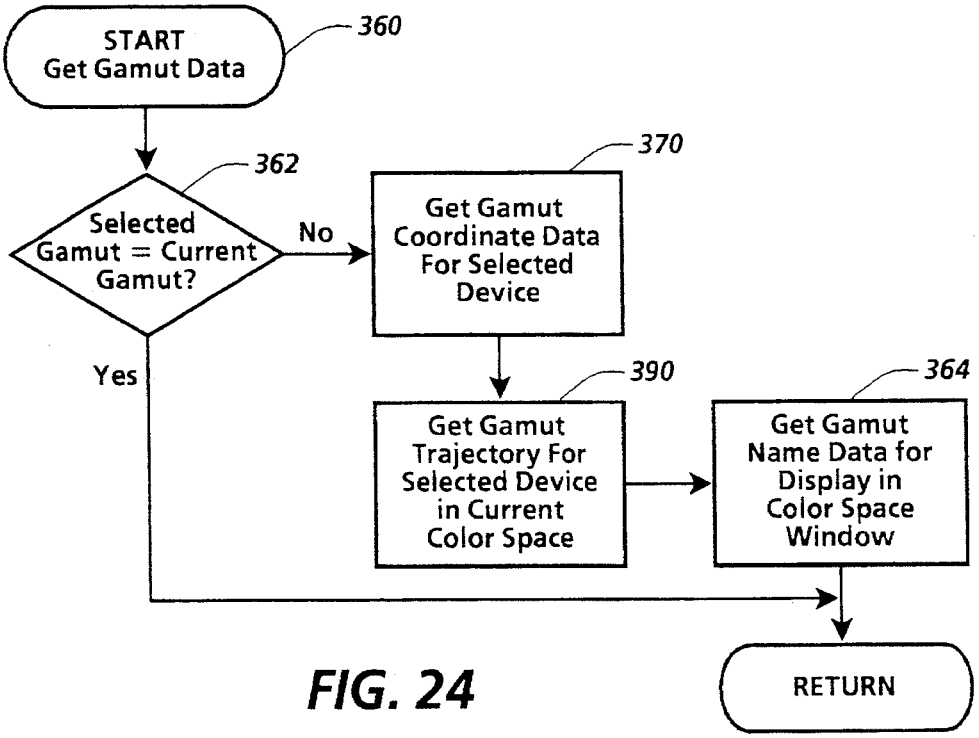
FIG. 24 is a flow chart showing the Get Gamut Data procedure shown in FIG. 17, for selecting a new device gamut for display.

When the user requests the display of a device gamut boundary, the inquiry in box 186 (FIG. 17) is satisfied, and control transfers to a procedure for retrieving and formatting display and processing data for the selected gamut, in box 360. Turning now to FIG. 24, the device gamut nameselected by the user is available to procedure 360 and is compared to the current device type (stored in the field, "state.gamutCoords.type", in StateRec) in box 362. If there has been no gamut change, processing returns to the next executable procedure (FIG. 17). If there has been a gamut change, procedure 360 then calls procedure 370 to get gamut coordinate data for the selected device. Upon return from procedure 370, procedure 360 next calls procedure 390 to get gamut trajectory data for the selected gamut, for drawing the gamut in color space window 112. Next, routine 364 is executed to put the device name in a field in the window data structure, for display in caption area 118 of color space window 112. Processing control then returns and proceeds to box 400 to paint color space display window 112 (see FIG. 17).

Figure 25:
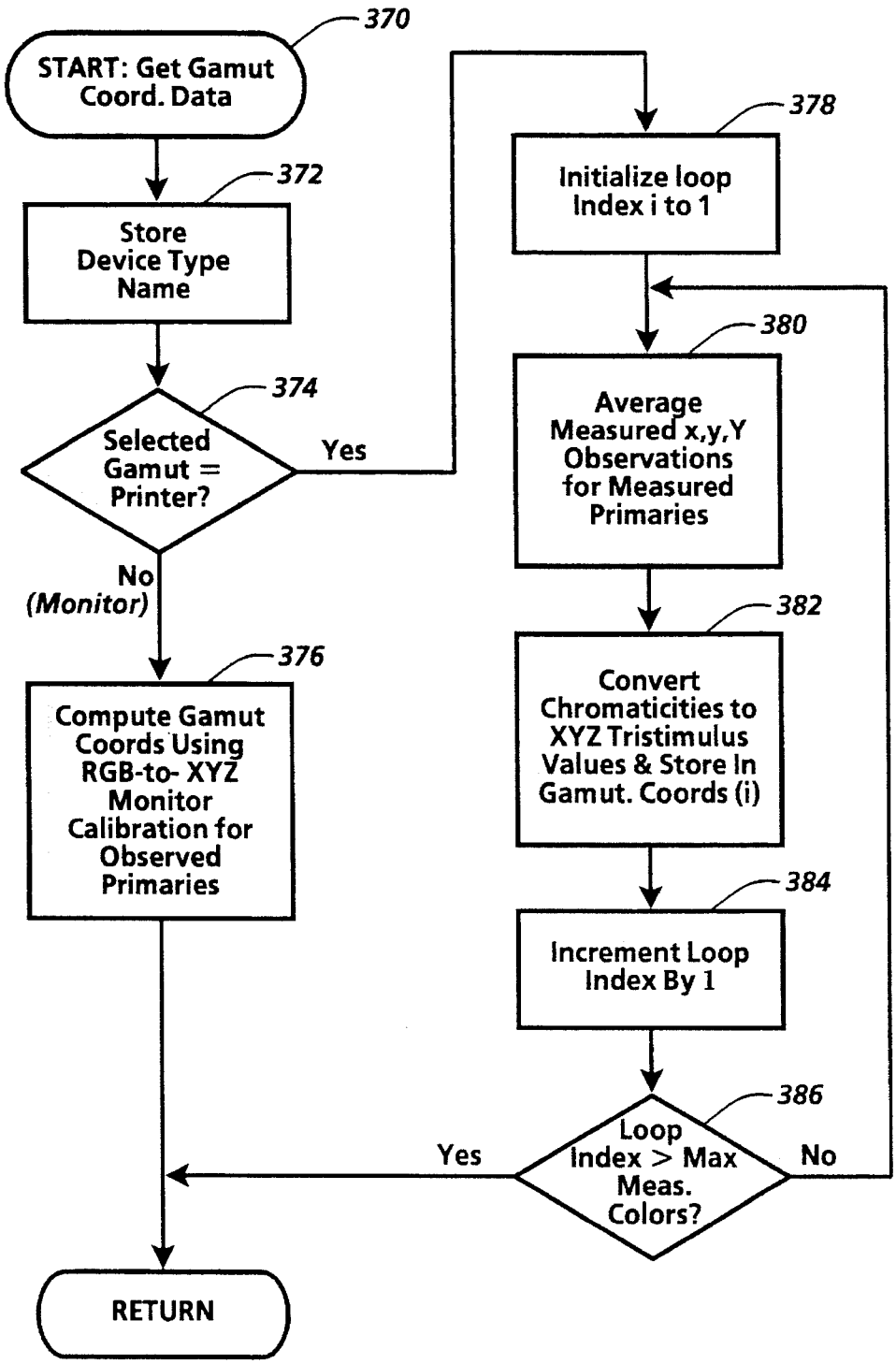
FIG. 25 illustrates in greater detail the operation of block 370 in FIG. 24.

Turning now to FIG. 25, procedure 370 gets gamut coordinate data for the selected device. This data is stored in StateRec in the data structure "state.gamutData". First, the device gamut name selected by the user is available to procedure 370 and is stored in state.gamutData.type in box 372 Procedure 370 then analyzes, in box 374, the user's gamut request for one of the valid measured gamuts. If the device is a monitor, control passes to box 376, where monitor gamut coordinate data is computed. RGB triplet values for red, green, blue, cyan, magenta and yellow are each transformed into XYZ tristimulus values using the standard calibrated monitor RGB-to-XYZ matrix transform created during initialization (see FIG. 19) to produce a set of XYZ values for each primary of the monitor gamut boundary. These coordinates are stored in the individual elements of array, state.gamutData.coords in StateRec. Processing control then returns to procedure 370.

If the device is a printer, control passes to box 378, where printer gamut coordinate data is computed and stored in the individual elements of array, state.gamutData.coords in StateRec., in the loop processing shown in boxes 378 thru 386. Printer gamut data include three sets of measured chromaticity data for each color, stored in program-resident memory (see Table A.5, field "Device Gamuts"). Preferably, the measured gamut data was measured using standard illuminant $D_{50}$. In box 380, the three observations are averaged, and in box 382, the x, y chromaticity and Y value data is converted to XYZ tristimulus values for the measured primary colors, using equations derived from Equations (1) thru (4). These tristimulus values are then stored in state-.gamutData.coords(i). When gamut coordinate data for all measured colors have been processed, processing control then returns to procedure 370.

Figure 26:
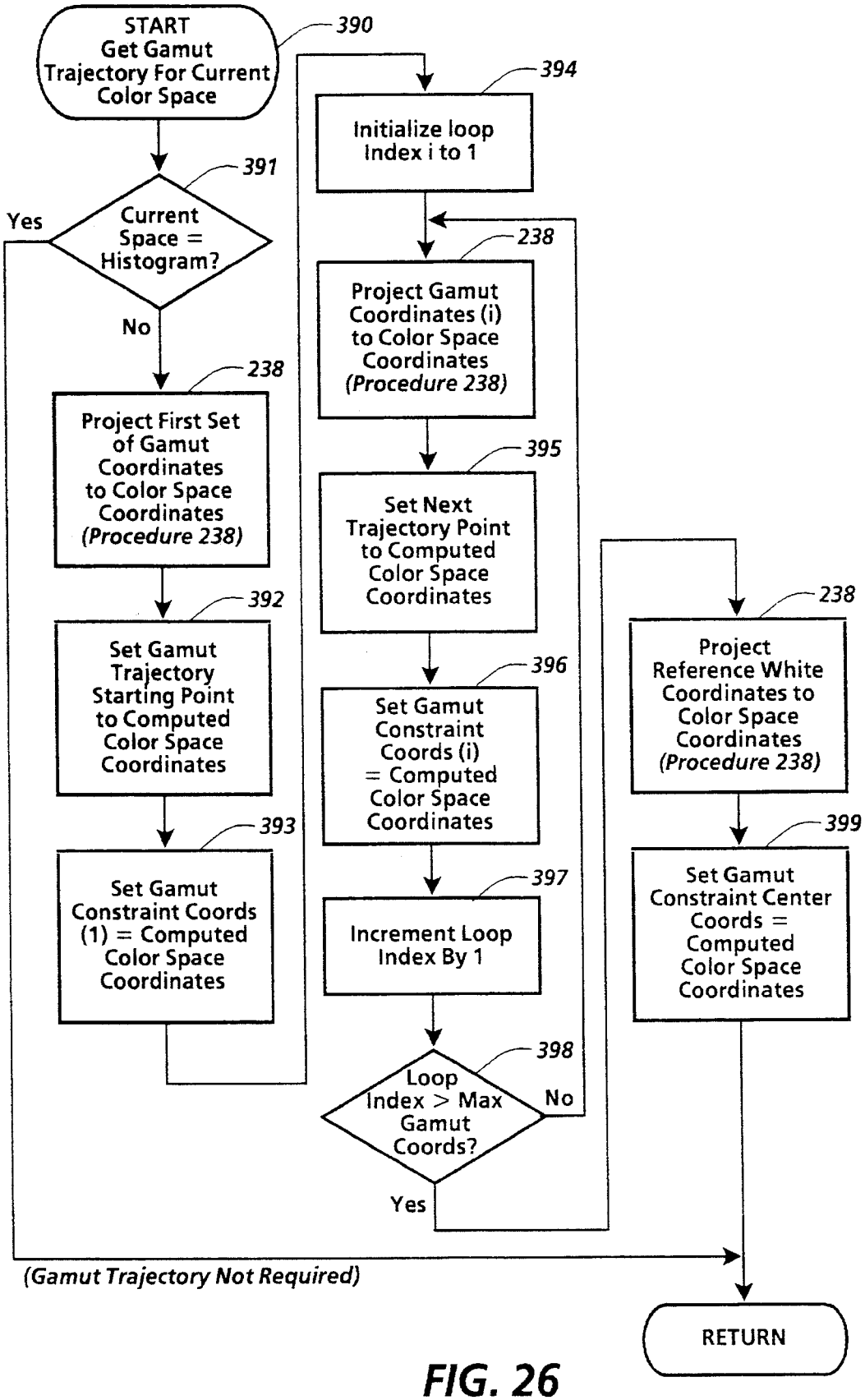
FIG. 26 is a flow chart illustrating in greater detail the operation of block 390 in FIGS. 22 and 24, for computing the data needed to draw the device gamuts shown in FIGS. 11 and 12.

With reference now to FIG. 26, gamut graphics data for plotting the trajectory of the selected gamut are computed next, in procedure 390. This gamut trajectory data is stored in the "gamut" field of StateRec, which contains fields for the trajectory path of the gamut, the actual color space coordinates for each vertex of the gamut, and the coordinates of the reference white of the measured gamut. The procedure 390 for computing the graphics data needed to display the gamut in the new current color space takes as input the value of the current color space and the gamut coordinates just computed in procedure 370 (in StateRec), and it returns, in the StateRec field, "state.gamut", the graphics trajectory data needed by the I/O Interface 16 (FIG. 3) to draw the gamut in the currently selected color space. Procedure 390 first tests, in box 391, whether the histogram color space is the color space currently selected for display, and if so, processing returns to Procedure 360. For all other color spaces, procedure 390 continues. Procedure 390 uses procedure 238 (FIG. 21) to compute, from the first set of gamut coordinates, the vector coordinates of that point in the selected current color space, and puts these coordinates in the state.gamut.imager data structure, in box 392, for use as the starting point for drawing the gamut trajectory. The actual values of the color in the selected color space are then stored, in box 393, in the state.gamut.constraint.coords array. Then, in boxes 394 through 397, procedure 390 executes a loop for computing the gamut trajectory points for the array of gamut coordinates, also using procedure 238 (FIG. 21) to compute the color space coordinates from the XYZ tristimulus values for each set of gamut coordinates. For every coordinate set computed, a function for drawing a line to that point in the color space is executed and the result is put in the state.gamut.imager data structure used by GUI 10, in box 395. In addition, each set of coordinates is stored in the state.gamut.constraint.coords array, in box 396. After the loop has been completed by satisfying the inquiry in box 397, the color space coordinates for reference illuminant are computed in box 399 and stored in the field, state.gamut.constraint.center.

4. Painting the Color Space Window

As shown in FIG. 17, Paint Window procedure 400 receives processing control from several color editing functions. An overview process flow for Paint Window procedure 400 is illustrated in FIG. 27, which in turn references the detailed process 440 for plotting the palette of colors in the selected color space, illustrated in the flowcharts shown in FIGS. 28 and 30 through 31.

a. Sizing the Window, and Drawing the Gamut and Spectrum Locus

Figure 27:
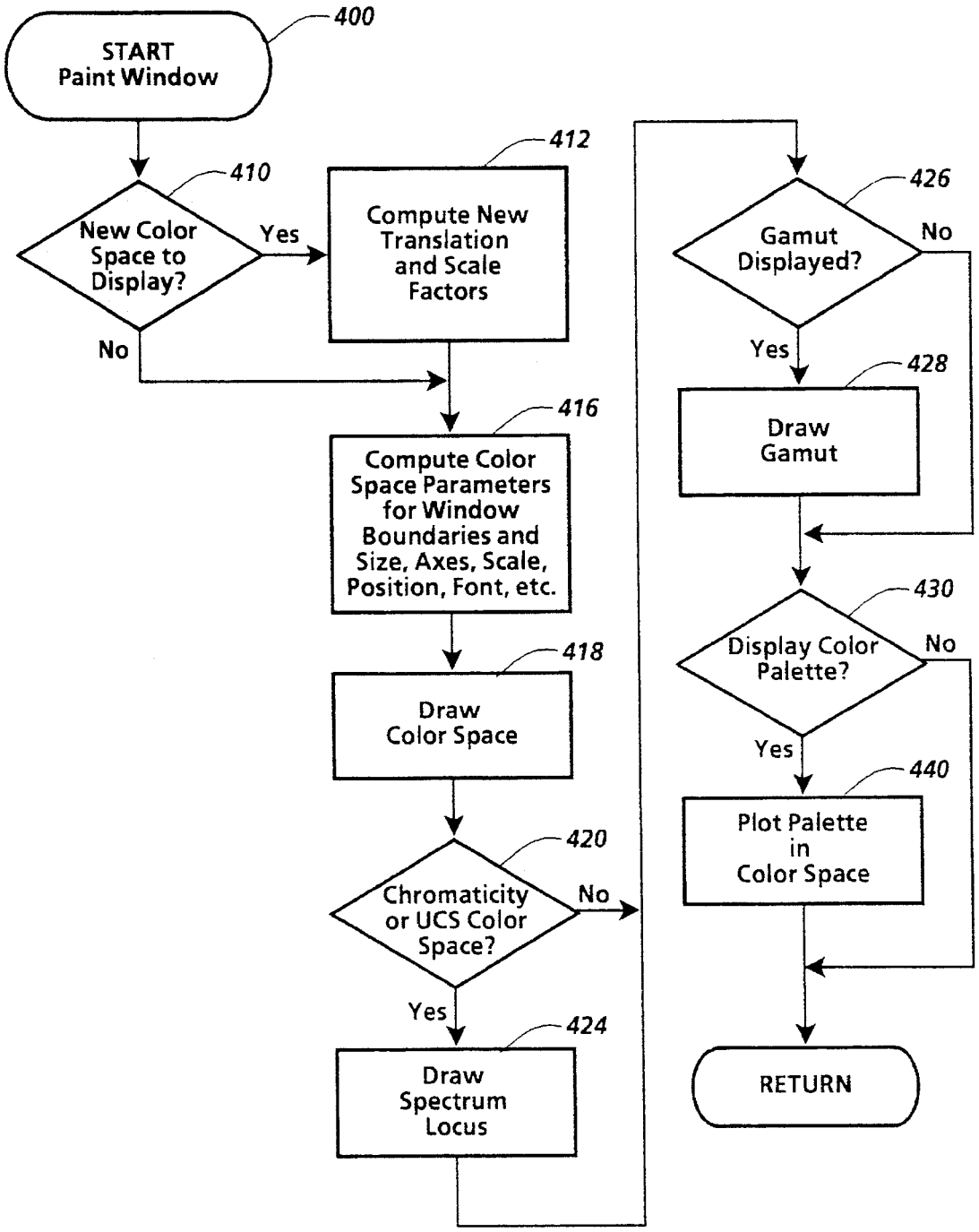
FIG. 27 is a flow chart illustrating the Paint Window procedure shown in FIG. 17, for displaying a palette of colors in a selected color space window according to the present invention.

Turning now to FIG. 27, paint window procedure 400 first tests, in box 410, the boolean state.resetPainting field to determine if a new color space has been selected for display since the last time color space window 112 has been painted. If not, control proceeds to box 416. If a new color space has been selected for display, control transfers to box 412 where translation and scale parameters in the Window Manager Data Areas of StateRec are updated from window boundary and size information about the current color space, previously stored in the Window Manager Data Areas in StateRec during processing in procedure 320 (FIG. 22). The translation and scale parameters are used for tracking the current window size, the portion of the window displayed, and the size of the information displayed in the window, all of which are altered during execution of the window display functions for vertical and horizontal scrolling and enlarging or shrinking the window (zooming in or out). The state.resetPainting flag is then reset to FALSE. Then, in box 416, parameters used to draw the window boundaries, to size the window, and to draw and label the axes of the color space are computed or retrieved from the Window Manager Data Areas of StateRec, for formatting and executing instructions to draw the color space, in box 418, according to color spaces 130, 150, 160 and 540, shown in FIGS. 4, 6, 7, and 29 (L* histogram) respectively. These drawing instructions must be in a format suitable for execution by I/O Interface 16 (FIG. 3) or optional graphics interface software 18 (FIG. 3), or otherwise must be in a format understandable to processor 22 (FIG. 1).

With continued reference to FIG. 27, next, in box 420, the current color space value is tested to see if the color space has a chromaticity diagram and therefore requires display of the spectrum locus 102, and, if so, procedure 400, in box 424, formats and executes instructions, suitable for I/O Interface 16, graphics interface software 18, or processor 22, for drawing spectrum locus 102 using graphics trajectory data in the state.spectrumLocus data structure processed in procedure 330 (FIG. 3). Then, in box 426, the state.gamut field is tested to see if a gamut has been selected for display, and, if so, procedure 400, in box 428, formats and executes instructions, suitable for I/O Interface 16, graphics interface software 18, or processor 22, for drawing the selected gamut using graphics trajectory data in the state.gamut field processed in procedure 390 (FIG. 6). If no gamut is to be displayed or the gamut display processing in box 428 is completed, processing continues with the inquiry in box 430, where a test is made to determine whether there is a current color palette to display in color space display window 112. If the inquiry is satisfied, processing continues in box 440, where the current palette of colors is plotted and displayed in the current color space.

b. Plotting the Colors in the Palette

Figure 28:
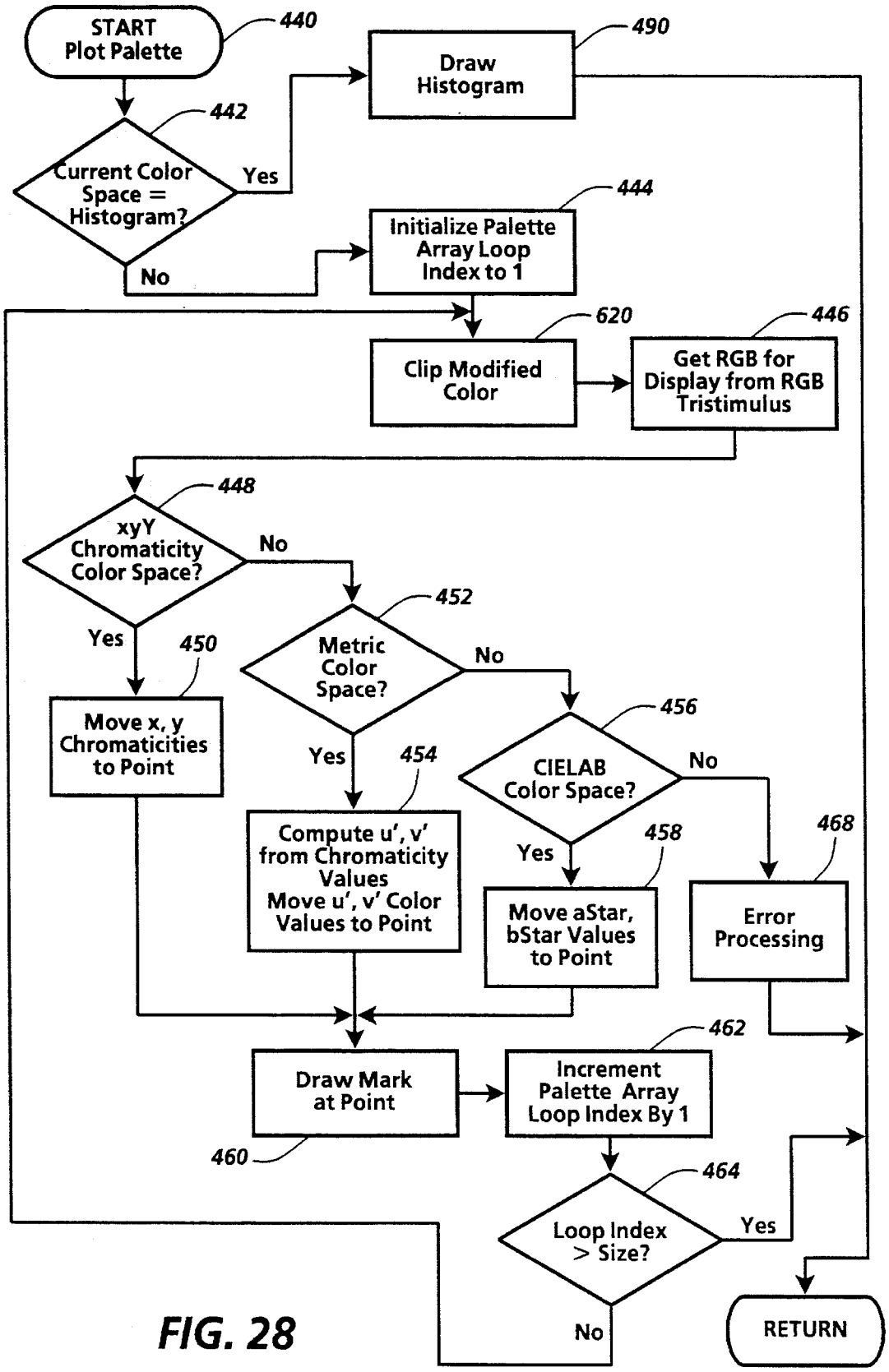
FIG. 28 illustrates in greater detail the operation of block 440 in FIG. 27, for plotting the color palette in the color space window.

With reference now to FIG. 28, procedure 440 for plotting and displaying the current palette of colors in the current color space begins with a test in box 442 to determine whether the histogram is the current color space selected for display. If so, processing control transfers to procedure 490 for drawing the histogram, described in more detail below in the discussion accompanying FIG. 30. If the selected color space is one other than the histogram, processing continues with box 444 where a palette array loop index is initialized to 1 for controlling iteration of the loop, in boxes 620 thru 464, which plots and displays each color in the color palette currently being edited by the user.

As described above in the discussion of procedure 200 (FIG. 20), data about each individual color is kept in StateRec in a variably-sized array structure of color palette information known as state.palettes[s].col. The array data structure in the implemented embodiment provides for defining a "size" parameter to contain the number of entries in the array which controls the loop iteration of procedure 440. Each entry in the state.palettes[s].col array contains, for a single color in the palette, the current values of RGB tristimulus values (col[i].tris), chromaticity values computed from XYZ tristimulus values of the color (col[i].chr), and CIELAB L*, a*, b* values (col[i].lab.lstar, col[i].lab.astar, and col[i].lab.bstar). As each color is edited by the user, these fields are updated, by procedures described in more detail below, so that these fields always contain current information about the palette color.

When the user of color editing GUI 10 is using a color monitor, each color is displayed in the color space as a square mark in the color represented by the color information signals. If color editing GUI 10 is being used on a monochrome monitor, instructions in procedure 440, not shown in the flowchart, provide for displaying each color in the color space as a square mark in solid black on a white background, or solid white on a blackground. Processing for the plotting and display of a color in the color space begins in box 620 where the palette color is clipped to the current color space. Details of this processing may be found below in the discussion of FIGS. 36A and 36B. If a palette color has been modified by the user, it will already have been clipped, and execution of this procedure again will not affect the prior clipping process. Clip Modified Color procedure 620 produces a set of modified RGB tristimulus values if the color is clipped.

Then, in box 446, the electron gun voltages needed by display means 30 to display .the color are computed. Preferably, the RGB tristimulus color specification represents a color in the standard calibrated (XCES RGB Linear) monitor. If the user's monitor is a nonstandard monitor, the matrix transformation computed during initialization processing (FIG. 19) must be applied to the XYZ tristimulus values for each palette color to produce the set of RGB color values adjusted for the user's nonstandard monitor. The phosphor gun voltages are then computed from the RGB values in a conventional manner. If the RGB tristimulus values are not in a range between zero (0) and one (1), they are "clamped" to that range using a conventional "min/max clamping" technique. This is necessary for displaying colors properly in the monitor's gamut. This necessarily means that the user will not be able to view properly those colors outside the monitor's gamut but valid within a selected target gamut.

Next, in boxes 448 through 458, the coordinates of the color in the current color space are computed or retrieved and moved to a vector data field for use by the graphics interface software for plotting the color in the drawn color space. As noted above in the discussion of procedure 238, in the implemented embodiment of color editing GUI 10, the color values in CIE color spaces, converted from the color's device independent XYZ tristimulus values, also represent explicit positions when plotted in the respective color space by the graphics interface software, since the graphics interface software makes the conversion between the color space positions and positions needed on display screen 100. When the appropriate coordinates have been determined, control transfers to box 460 where instructions for locating and drawing the colored mark are formatted and executed. Then, in box 462, the loop index is incremented, and loop processing continues until all palette colors in the state.palette [s].col array have been plotted and displayed (determined in box 464), at which time control returns to the Paint Window procedure 400 (FIG. 27), which in turn is now completed. If none of the inquiries in boxes 448, 452, or 456 of FIG. 28 are satisfied, an invalid color space has been specified, and control transfers to appropriate error processing in box 468 prior to returning to Paint Window procedure 400.

c. Painting the Histogram Color Space

A histogram for an image or set of colors in a palette maps lightness to frequency of use. For reference, or pictorial, images, the histogram provides a profile for the image that defines whether it is high or low contrast, and provides information about tone reproduction and where in the lightness range the information lies. Tone (grayscale) reproduction affects the contrast and the overall brightness of the image. How well the gray tones in an original image ultimately map to the gray tones in the reproduction will determine if the information content of the image is proportionally preserved across the available gray levels of the gamut of the output color device. Because maintaining the contrast of an image across color reproduction devices is considered a very important factor in the reproduction process, the distribution of the lightness values can be informative. The way the lightness profile of an image is reproduced is very important to the quality of a reproduction. High overall contrast is often considered a mark of quality, and the user of color editing GUI 10 may find it appropriate to maximize contrast by adjusting the lightness distribution of the palette colors in some situations.

For symbolic or functional images, where the colors in the palette are used to encode information or convey semantic meaning, it is important to preserve the semantic information conveyed by the colors when the colors are mapped to a different device gamut. The user of color editing GUI 10 may find it necessary to adjust the lightness distribution of the palette colors in order to preserve or enhance the semantic information conveyed by the colors.

Figure 29:
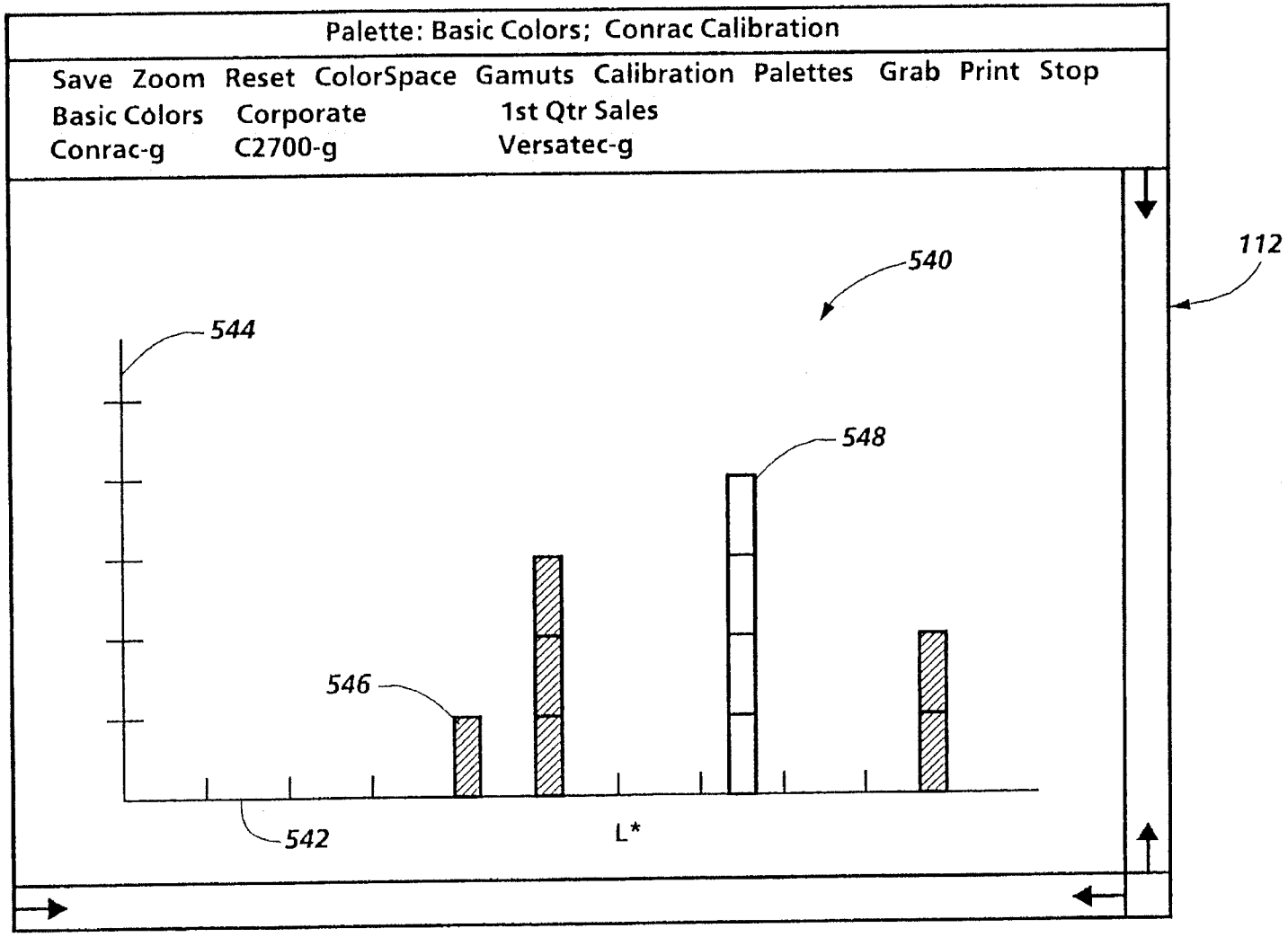
FIG. 29 is a pictorial representation of a display screen with the histogram color space displayed in the color space window.

Turning now to FIG. 29, there is illustrated the histogram color space 540 of color editing GUI 10. Histogram 540 consists of an L* versus frequency distribution graph of the colors in the palette of colors displayed in FIG. 9 above. The independent variable along x axis 542 represents the L* value for a color, computed as discussed above with reference to FIGS. 20 and 21. The dependent value along the y-axis 544 is the number of colors in the palette at that L* value, each color being represented by a rectangular-shaped bar 546, displayed in the color the bar represents. For example, bar 548 represents four colors in the displayed input palette with an L* value between 70 and 80, and specifically between L*= 75 and L*= 76.

Figure 30:
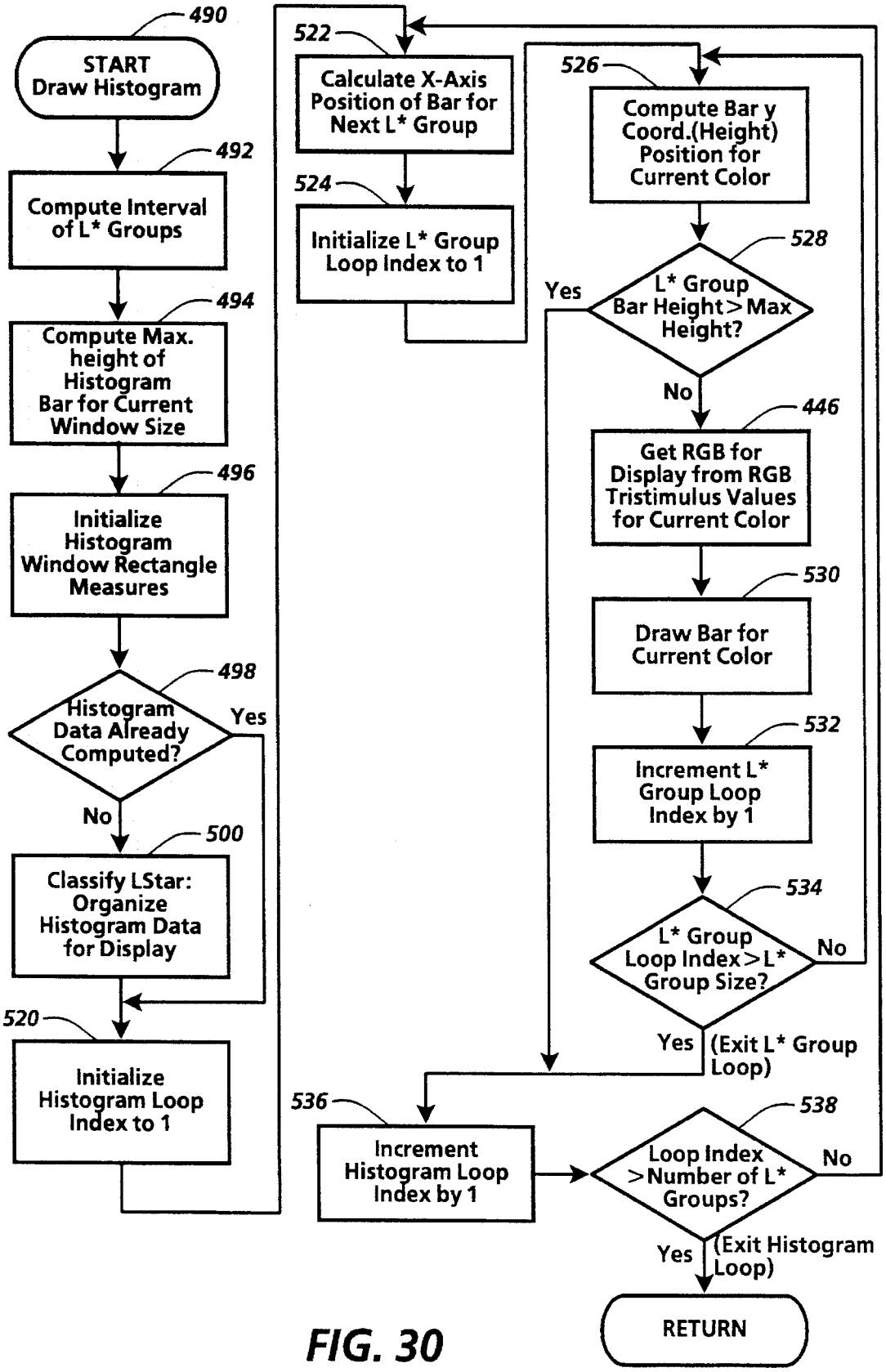
FIGS. 30 and 31 illustrate in greater detail the operation of block 490 in FIG. 28, for drawing the histogram color space of FIG. 29.

With reference now to FIG. 30 there is shown the detailed process flow for producing L* histogram color space 540 of FIG. 29. In box 492, the interval of the L* groupings to be displayed on the histogram is computed from the maximum number of L* values possible, divided by the number of L* groupings desired on the histogram. In CIELAB space, L* values range for 0 to 100, and the L* value for each color in the palette is shown along x axis 542, thus making it possible, if L* values are arbitrarily restricted to integer values, to represent up to 100 color bars along x axis 542, if each possible L* value were represented. In the implemented embodiment, the colors are grouped into a fixed number of L* groups or classifications, controlled by a parameter initialized to 50 in memory. Thus, histogram 540 of FIG. 29 could show up to 50 bars representing the L* values from 0 to 100. The L* grouping parameter may, of course, be established at a different number, depending on how finely the user wishes to view the lightness distribution of the colors in the palette, or the L* grouping parameter may be left to user control in an alternative implementation of color editing GUI 10.

Next, the maximum bar height for any one bar to be displayed on the histogram is computed from information about the current size of the window displayed, so that, for example, if the user has enlarged a portion of (zoomed in on) a histogram color space window 540, only those colors in a particular distribution that will fit in the vertical window space will be displayed. Next, the current window size measurements are initialized, in box 496.

Figure 31:
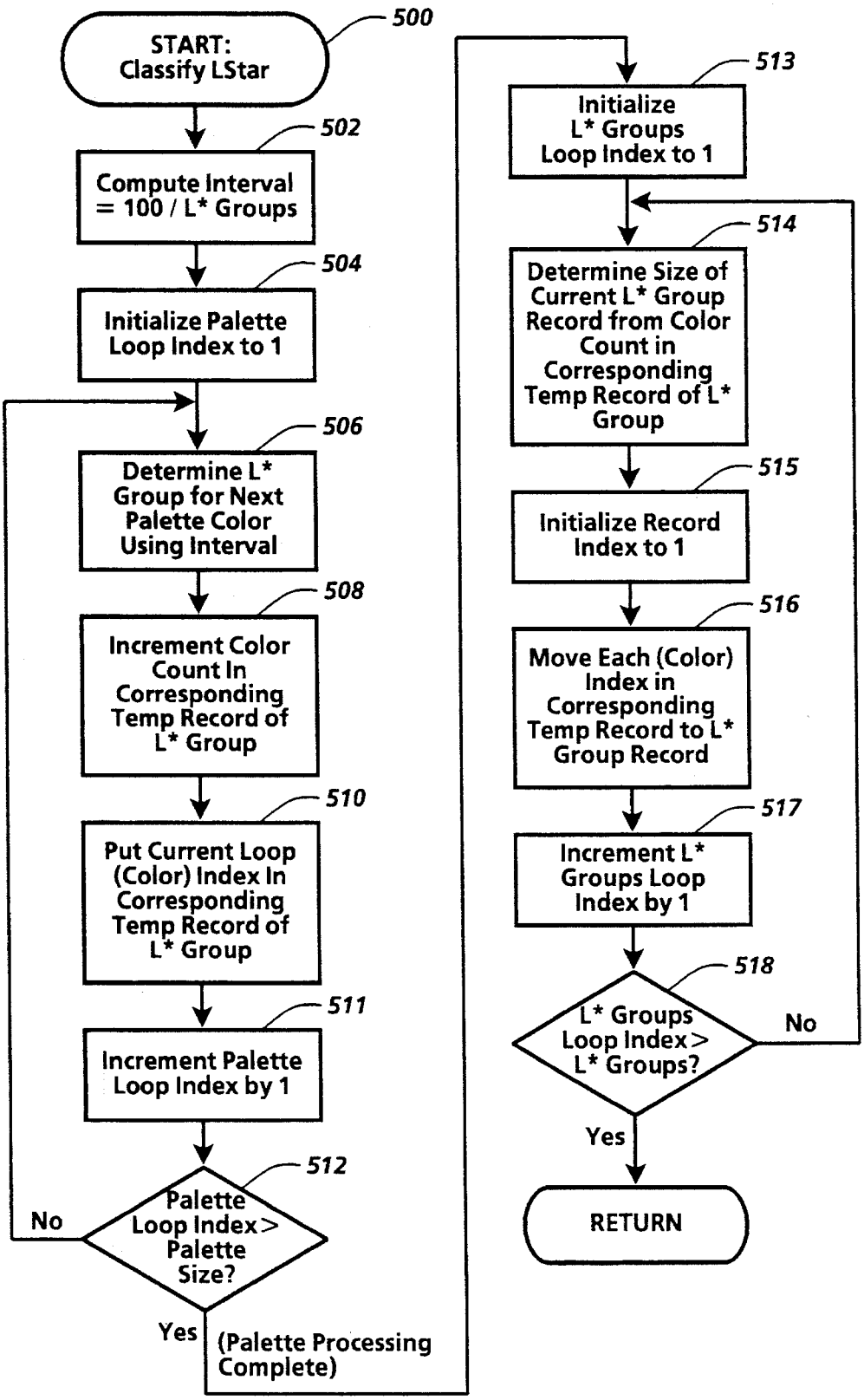

The colors in the currently displayed palette must be organized into sequence by L* value for display in histogram color space 540. This is done only once for any palette, and the inquiry in box 498 tests to see whether the color palette data for the currently displayed palette has been organized in prior processing. If not, control transfers to box 500 where the colors in the currently displayed palette are organized by L* value in data structure "palette[s].h" in StateRec (Table A.2). This processing is shown in FIG. 31, and described below in more detail. If the histogram data has already been organized, processing continues with box 520, where the loop index controlling the loop in boxes 522 through 538 for displaying the histogram is initialized to 1.

Turning now to FIG. 31, Classify LStar procedure 500 organizes the colors in the currently displayed palette by L* value in data structure "palette[s].h" in StateRec in two stages for efficiency and performance purposes. Classify LStar procedure 500 first builds an easily accessed, temporary list data structure consisting of a fixed array of list records, one list record for each L* grouping to be displayed on the histogram, with each list record containing a field holding the number of colors in the palette in the respective L* grouping, followed by the required number of fields containing the indices of the color in the palette which fall into that L* grouping. The interval, or L* grouping, is first computed in box 502. Then, in the loop in boxes 506 through 512, the palette colors, stored in ascending order by L* value (see procedure 200 above) in the array palette[s].col in StateRec, are examined one by one, classified into the appropriate L* group, in box 506, by dividing the color's L* value by the computed interval from box 502, and then incrementing the color count in the appropriate temporary record for that L* group, in box 508. The index of the color is then put in the next available index field in that L* group record, in box 510. The next palette color is then examined in a similar manner until all palette colors have been processed, by satisfying the comparison in box 512 of the current loop index to the size of the current palette of colors (stored in palette[s].col.size).

With continued reference to FIG. 31, upon completion of the palette processing, the data stored in the temporary list data structure is moved to the array data structure palette[s].h in StateRec, in the loop shown in boxes 514 through 518, for more efficient data access during the procedure described in FIG. 30 which constructs the histogram color space 540 for display. In the implemented embodiment, palette.h is an array of 50 variable length records, each record representing one L* grouping to be displayed on histogram 540 as a vertical bar, and containing the indices of the colors of the palette that belong in that L* grouping. The color count of each L* grouping, computed as a result of the loop processing in box 508, is used to determine the size of each variably-sized record in array palette[s].h. Those skilled in the art will appreciate that this two-stage process could be implemented as a single step process which would organize the L* data in a functionally equivalent manner.

Returning now to FIG. 30, two loops are executed in boxes 522 through 538 for controlling the display of histogram color space 540 (FIG. 29). The first, or outer, loop, composed of boxes 522, 524, 536, and 538, controls the positioning and display along x-axis 542 of each successive L* grouping of colors. The second, or inner, loop, in boxes 526 through 534, controls the process for building the vertical bar in the y-axis direction, showing the individual colors in the particular L* grouping. Each colored rectangular portion of the bar represents a different color in the palette in the same L * group as the other colors displayed as part of the bar, and each color is displayed on top of the previous color, up to the maximum permitted height of the bar (computed in box 494). Note that, in box 446, the RGB phosphor value for display is computed in the same manner as described above in the discussion of plotting palette colors accompanying FIG. 28, and RGB values for a non-standard monitor must be converted from the RGB tristimulus specification of the preferred standard monitor calibration model. If the user of color editing GUI 10 is using a monochrome monitor, code (not shown in the flowchart) bypasses the computation for the RGB color phosphor values and tests whether the background is white or black for display of the appropriate black or white color marker.

When the maximum bar height is reached before all colors in the L* group have been processed, the inquiry in box 528 is satisfied, the remaining colors in the group are not displayed, and control transfers to box 536 for incrementing the histogram loop index and processing the next L* group. When all L* groups have been processed, the inquiry in box 538 is satisfied, the display of histogram color space 540 is completed, and control returns to Plot Palette procedure 440 (FIG. 28).

G. Detailed Process Flow: Editing a Color in the Monitor's Gamut

When the user of color editing GUI 10 performs color editing functions (generally encompassed by box 570 (FIG. 17)) on colors displayed in color space window 112, the software minimally ensures that edited colors are reproducible in the monitor's gamut. In the implemented embodiment, the gamut clipping processing described below is carried out in CIELAB color space internally, using CIELAB cylindrical coordinates described above in Part C.3.b, but it is understood that the gamut clipping processing may be carried out in other suitable color spaces. In one embodiment, color editing GUI clips the modified chroma to the maximum chroma for the modified hue and original lightness level, if necessary. In another embodiment, color editing GUI 10 confines color editing to within the device gamut the user has selected for display, and provides chroma and lightness mapping within that gamut. In order to describe these processes in more detail, the discussion first turns to the procedures for building the data structures which hold the data representing a device's color gamut.

1. Initializing a Gamut Data Structure

Figure 32A:
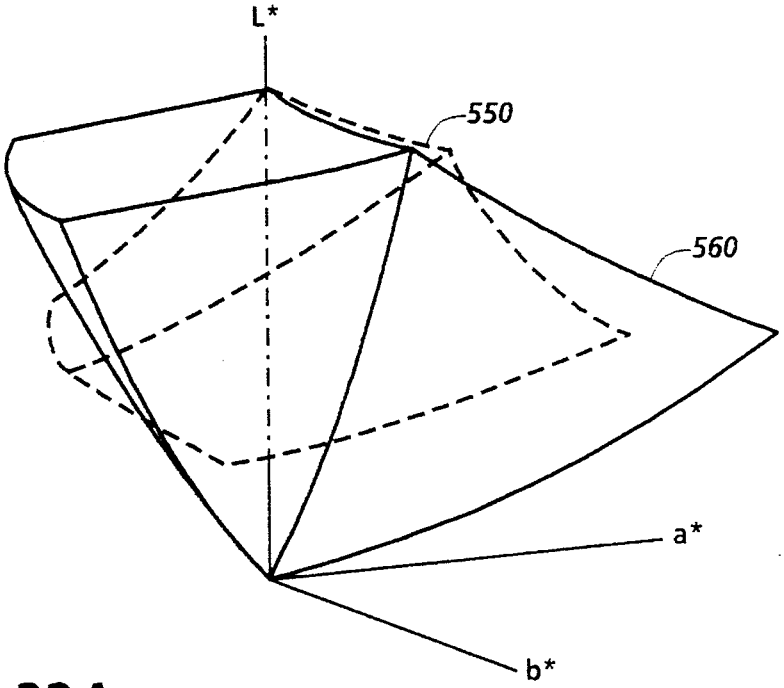
FIGS. 32A and 32B illustrate three dimensional view of device color gamut solids in CIELAB space.
Figure 32B:
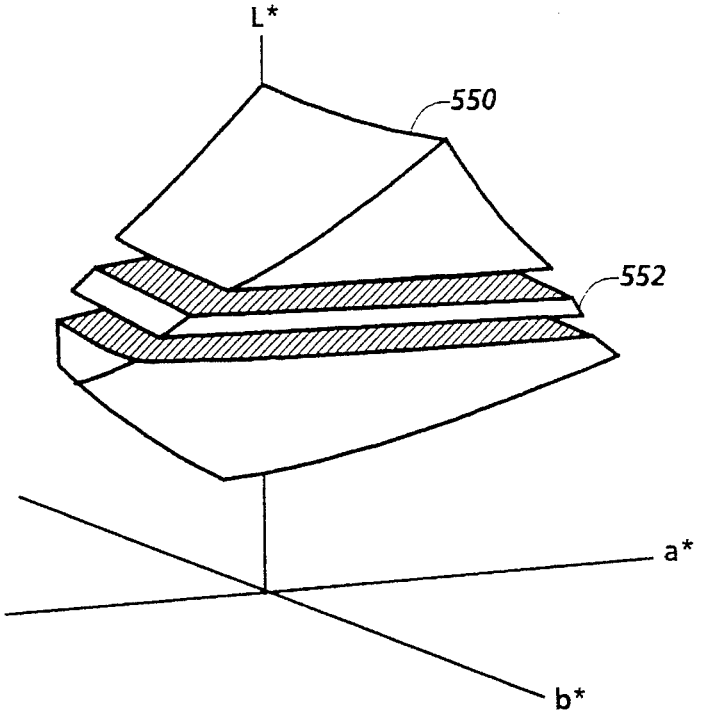

A color device gamut comprises all of the physically reproducible colors of the device. These colors, when measured using a colorimeter or similar instrument, may be plotted as an irregularly shaped, three-dimensional solid in any of the available color spaces, the surfaces of the solid providing the outermost boundaries defining the reproducible colors of the device. With reference now to FIG. 32A, there is illustrated a gamut solid 550 for a representative color printer and a gamut solid 560 for a representative color monitor in the CIE L*a*b* color space. In order to construct the gamut data structure, it is necessary to print (or display, in the case of a monitor) and measure a suitable range of colors. In the implemented embodiment of GUI 10, the gamut of a device is described in CIELAB color space as a*, b* "slices" of the device gamut solid at equal L* intervals. FIG. 32B illustrates one slice 552 of the printer gamut solid 550 at L* level approximately equal to 50.

The gamut of a device may also be measured and stored in coordinates of each of the color spaces available for color palette display and editing. In this embodiment, the gamut clipping processing described below would be implemented to account for the color space currently selected for display, and clipping would be performed with the gamut data structure corresponding to the selected color space.

For gamuts defined in CIELAB coordinates, for each of the L* slices, the outer surfaces of the device gamut are determined from a measured sampling of colors around the perimeter of the slice. A sample of forty measured colors around the perimeter of the a*, b* slice provides an approximation of the device gamut at the selected L* level sufficiently accurate to provide meaningful editing feedback to the user when editing colors within a gamut. In cylindrical CIELAB coordinates, such a sampling provides the maximum chroma value for a hue value every nine (9) degrees. A sampling of slices every 5 L* units results in measuring 19 slices of forty colors each. This measured device gamut data is stored in a two-dimensional 19×40 array structure, hereafter referred to as "fineGamut". In another embodiment of color editing GUI 10, a sample of sixty measured colors around the perimeter of the a*, b* was taken. In cylindrical CIELAB coordinates, such a sampling provides the maximum chroma value for a hue value every six (6) degrees. A sampling of slices every 5 L* units results in measuring 19 slices of sixty colors each. This larger measured device gamut data is stored in a two-dimensional 19×60 array structure. Those skilled in the art will recognize that the device gamut may be defined by fewer or more color points, and the methods described below for referencing the gamut data structure would apply equally as well to gamuts defined by smaller or larger data structures.

Color editing GUI may also perform monitor gamut clipping or chroma clipping using a standard Xerox Color Encoding Standard (CES) calibration model, such as the Xerox RGB Linear model, as the device gamut. When the user's display uses as its reference white an illuminant other than the standard $D_{50}$ illuminant, a white point transformation matrix is applied to the tristimulus values of the palette colors to adjust them for purposes of display and gamut clipping in the calibrated monitor using illuminant $D_{50}$. Similarly, a white point transformation is applied to the tristimulus values of edited colors to adjust them back to the monitor's illuminant prior to display. Information relevant to transformations between illuminants may be found in Chapter 6 of *Color Encoding Standard,* Xerox Corporation.

Those skilled in the art will recognize that colorimetric measurement, or characterization, of the display or printer device gamut is generally a one-time procedure for each device to be included as available for selection by the user in color editing GUI 10. Further, if measured gamut data is located in external memory 24 (FIG. 24), the gamut data structure must be initialized with gamut data for the selected device gamut when a device gamut is selected for display (see FIG. 24). Initialization may also be part of initialization routine 170 shown in FIG. 18 for a default gamut selection.

2. Selecting and Identifying a Color

When the user selects a point or makes some other gesture in color space window 112 with mouse 32, the window manager's application interface 16 (FIG. 3) receives the mouse gesture, and, in the implemented embodiment, a table correlates a mouse gesture with a request. The request is then passed to color editing GUI 10 for analysis and processing, and the inquiry in box 188 (FIG. 17) is satisfied. Processing control then transfers to a procedure, generally referenced herein as Perform Color Editing Procedure 570 in FIG. 17, to analyze and process the user's request. Valid gestures, or requests, are those listed in Table 4 below, which associates the available color function options with the buttons on mouse 32 and with the "SHIFT" key on an input keyboard device (not shown).

TABLE 4

| | Requesting Color Editing Functions | |
|---|---|---|
| Mouse Button (FIG. 4C) | Keyboard "SHIFT" | Color Function Request and Command(s) Generated |
| Left (34) | NO | Select & Query Color ("Query") |
| Middle (36) | NO | "Clip" Out-of-Gamut Color to Gamut Boundary ("From", "To") |
| Middle (36) & Drag Color | NO | Edit Color to Value of New Location in Color Space ("From", "To") |
| Right (38) | NO | Make Color Darker ("From", "Darker") |
| Right (38) | YES | Make Color Lighter ("From", "Lighter") |

Figure 33A:
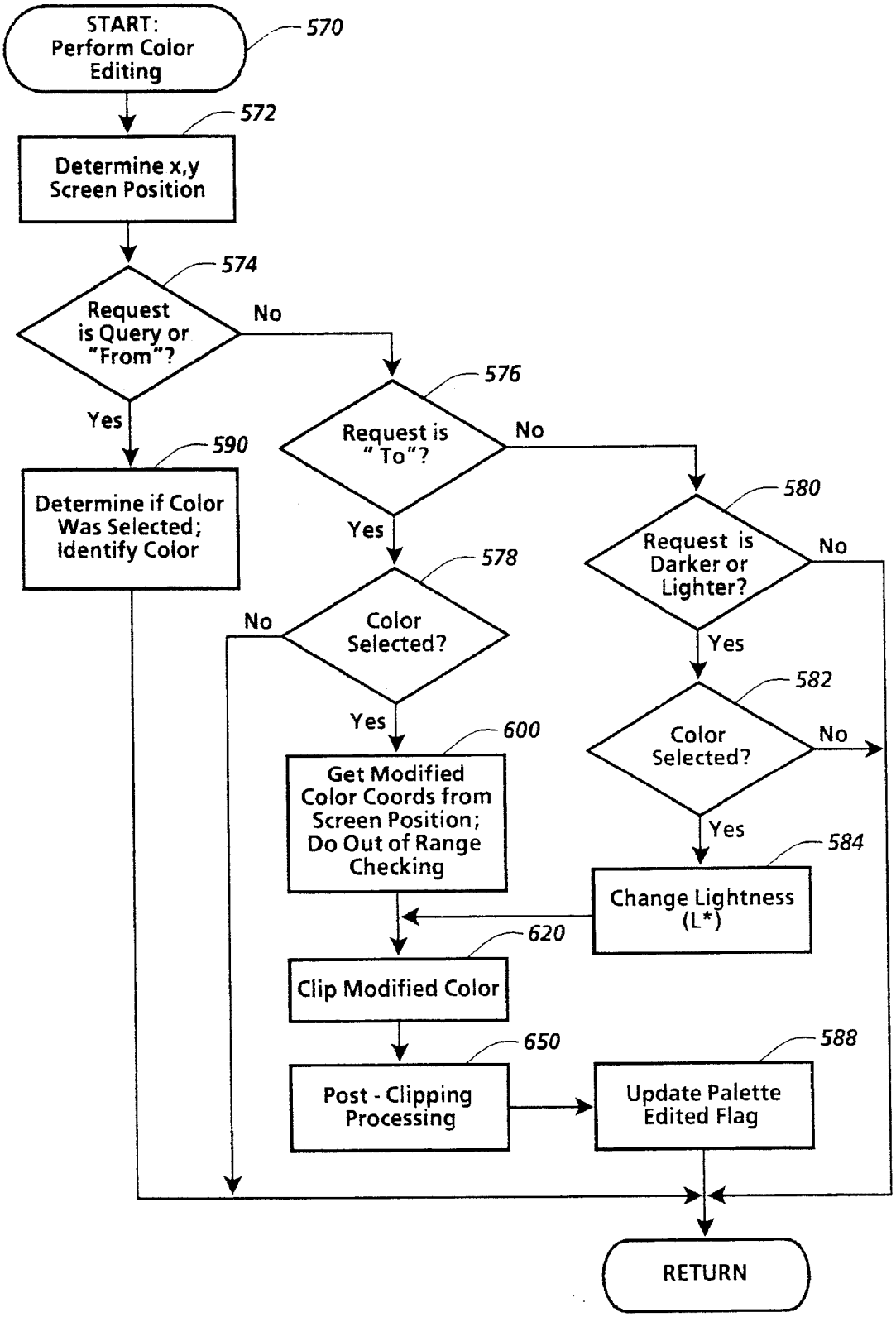
FIGS. 33A and 33B illustrate two embodiments of the overall processing flow for modifying a color according to the present invention, shown in the Perform Color Editing procedure of FIG. 17.

Turning now to FIG. 33A, upon receipt of a mouse-originated user request, the Perform Color Editing procedure 570 first determines, in box 572, the current x and y screen coordinate position of the mouse pointer for the currently displayed color space, taking into account the present window size and position. Next, in boxes 574, 576, and 580, tests are made to determine which request has been received. For all mouse gestures not corresponding to a valid request in Table 4, processing returns to the next executable procedure.

When the user selects a color in order to display information about the color, a "Query" request is generated and the inquiry in box 574 is satisfied. In addition, as shown in Table 4, some of the valid color editing functions generate two processing requests; when the user selects a color for any of the valid available color editing functions other than to display color information, the first request generated is a "From" command. The "From" command also satisfies the inquiry in box 574, and processing control then transfers to box 590 which determines whether a valid color in the palette has been selected, and, if so, which color in the palette has been selected.

Figure 34:
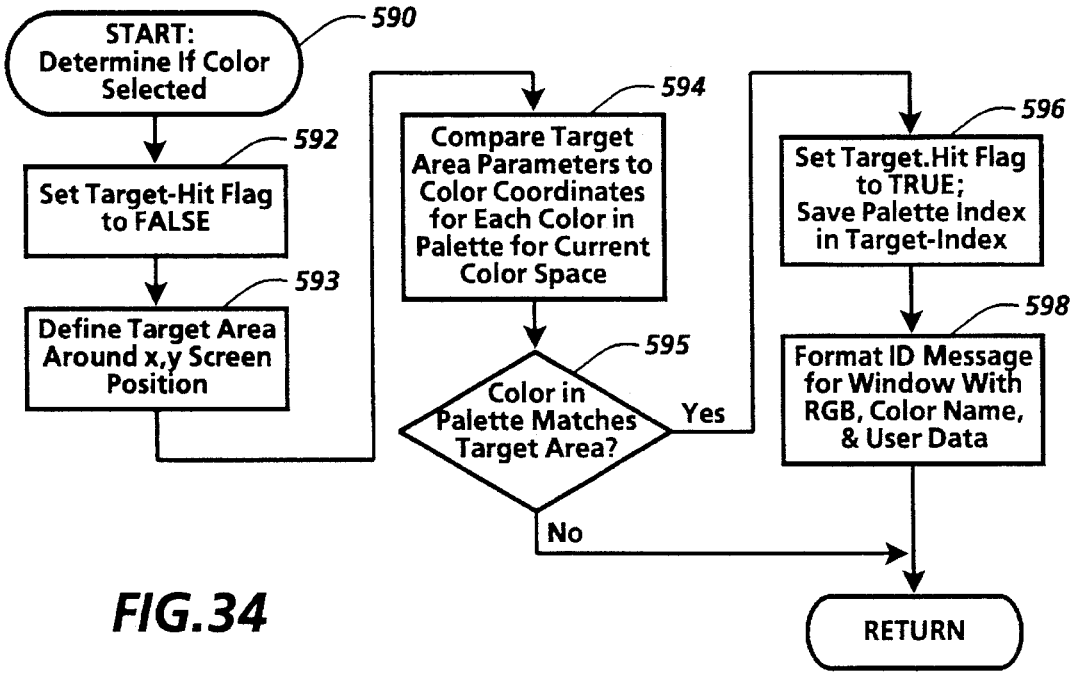
FIG. 34 illustrates in greater detail the operation of block 590 in FIGS. 33A and 33B to determine whether the user has selected a color for editing according to the present invention.

With reference now to FIG. 34, a flag in StateRec tracks whether a palette color has been selected by mouse 32, and this flag is initialized to FALSE upon entry into procedure 590. The x and y cursor position of the mouse request is expanded from a single color space coordinate point to a square or rectangular target area, and coordinates for the target area are computed for the selected color space in box 593. Then, a loop is executed in box 594 for comparing each color in the currently selected palette, stored in StateRec, with the target area, for the appropriate color space coordinates. If a color matches the target area, the target-hit flag is set to TRUE and the index of the selected color is stored in StateRec in box 596. A message containing information about the selected color, for display in caption area 118 in color space window 112, is formatted in box 598. The informational message may contain any of the available data about the color; in the implemented embodiment, the RGB tristimulus values of the color, and any data in the UserData field associated with the color is formatted for display. In addition, a routine for translating the RGB tristimulus values to a standard color name, such as the standard described in *NBS Color Names,* is executed, and the color name is also displayed. If none of the palette colors matches the target area, the user's mouse selection gesture has not successfully selected a palette color, and processing returns to procedure 570 with the target-hit flag set to FALSE.

After return to procedure 570, if a color has successfully been selected, control then passes to Paint Window procedure 400 (see FIG. 17), where requested color information about the selected color is displayed in caption area 118 when the color space is repainted in color space window 112.

3. Moving a Color in the Monitor's Gamut

As described above in conjunction with FIG. 9, to edit a palette color the user selects a color square 132 (FIG. 9) with cursor 116 and middle mouse button 36, and, while keeping button 36 depressed, the user moves, or drags, color square 132 from its current location in color space 130 to a destination location 132a which will represent the desired modified color in color space 130. With reference now to FIG. 33A, the selection of color square 132 first generates a "From" command for processing by procedure 570, to determine which color in the palette has been selected for editing, and to set the target-hit flag to TRUE.

When the user releases middle mouse button 36 at the desired destination location, a "To" command is generated from the user's mouse gesture, and processing control again enters procedure 570, where, first, the x and y screen position of destination location of the color is determined, in box 572. Next, the inquiry in box 576 is satisfied and control transfers to box 578, where the target-hit flag is tested to ensure that a color in the palette has been selected with the mouse. If a color has not been selected, the user's mouse gesture is meaningless in the selected color space and causes no processing response; control then returns to the next executable procedure.

Figure 35:
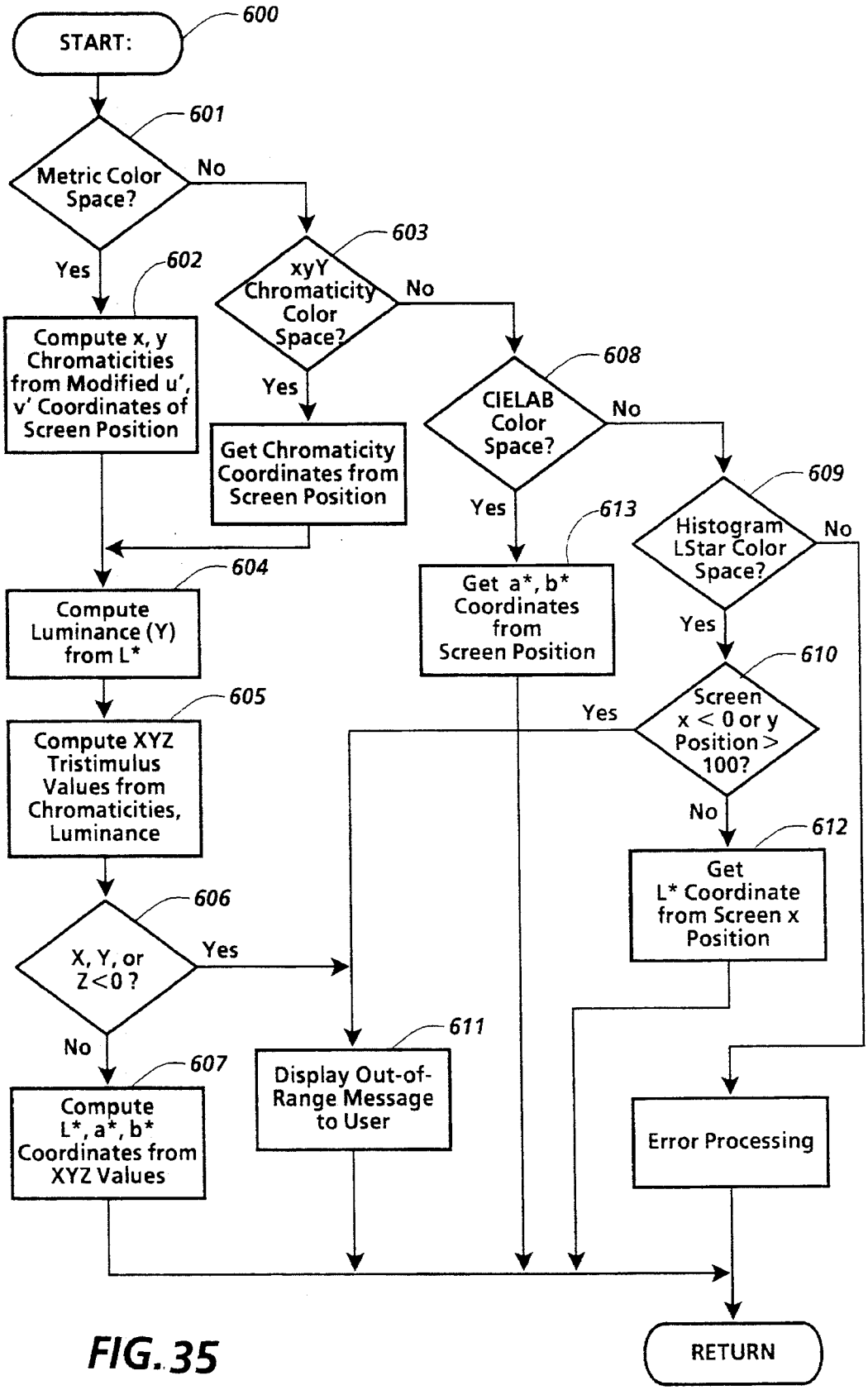
FIG. 35 illustrates in greater detail the operation of block 600 in FIGS. 33A and 33B.

If a color has been selected, processing next transfers to an out-of-range checking procedure in box 600 where the modified color values are retrieved from the screen coordinates, and the XYZ tristimulus values of the color are computed and evaluated to determine if the modified color edited by the user represent a physically possible color. Turning now to FIG. 35, the out-of-range pre-clipping processing of box 600 is illustrated in more detail. If the color has been edited in other than CIELAB color space 130, the modified color values are checked to see that they represent a natural, or physically reproducible, color. Boxes 601, 603 and 609 make the necessary color space tests. Color coordinates derived from the x and y screen positions of the mouse are used to compute the XYZ tristimulus values of the modified color, in box 605, the calculations used depending on the color space used for editing. In box 606, the XYZ tristimulus values are tested, and if any of the X,Y, or Z values is negative, the color is not physically possible, and the user receives a message of the out-of-range color in box 611. In the case of the histogram color space, the x and y screen positions, rather than the XYZ tristimulus values, are tested for the proper range, in box 610. CIELAB values are computed from the XYZ tristimulus values for an in-range modified color, in boxes 607, or 613, or 612, depending on the currently selected color space.

Figure 36A:
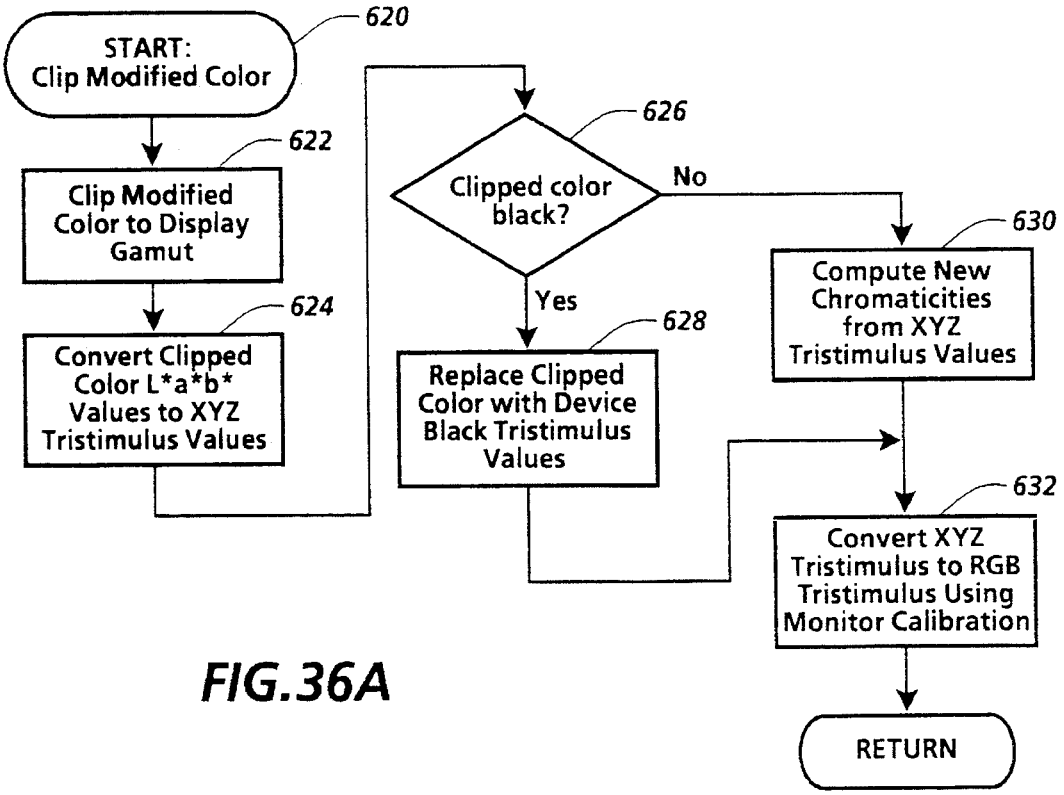
FIGS. 36A and 36B illustrate two embodiments of the operation of block 620, the color clipping procedure, of FIGS. 33A and 33B, according to the present invention.

Upon completion of the range checking and computation of the modified color's CIELAB values, processing continues with box 620. As noted above, color editing GUI 10 may be implemented in its simplest form with editing in the context of the monitor's gamut, without the gamut clipping or gamut constraining features. This embodiment is illustrated in FIGS. 33A and 36A. With reference now to FIG. 36A, in box 622, the software ensures that the modified color is reproducible in the monitor's gamut by simply clipping, if necessary, the modified color's chroma to the maximum chroma reproducible in the monitor gamut for the modified hue and original lightness values. This clipping procedure includes converting the LAB coordinates to cylindrical hue and chroma coordinates. If color editing occurred in the chromaticity or UCS color spaces, then the color coordinates in those spaces are converted to L*a*b* coordinates first. In addition, if the hue angle value is a negative number, it is incremented by 360 degrees. Processing may also include a test to see whether the chroma of the modified color is already a small value, in order to bypass the clipping procedure and return control directly to procedure 570.

The clipping procedure in box 622 involves accessing the 19 by 40 fineGamut array containing the monitor gamut a*, b* values to find the maximum chroma for the modified color's L* value. If the maximum chroma is greater than the modified color's chroma, the modified color's chroma is replaced by the maximum chroma, and the cylindrical coordinates of the color are converted back to LAB color space a*, b* coordinates. The Cedar language code in Table 10 below illustrates this processing. Those skilled in the art will recognize that, while color editing GUI 10 takes advantage of the perceptual uniformity of CIELAB color space to perform color editing functions, another suitable clipping algorithm may be used to change the user's color modifications to place the modified color in the monitor's color gamut.

With continued reference to FIG. 36A, after clipping the color's chroma in CIELAB space in box 622, boxes 624 through 628 compute the modified color's XYZ tristimulus values. Process 620 also checks to see if the modified color's tristimulus values are within a small enough range to represent the color black. If they are, the modified color's tristimulus values are replaced by the tristimulus values for the black color of the monitor display. The modified color's chromaticities are computed in box 630. In box 632, the modified and clipped color's XYZ tristimulus values are converted to RGB tristimulus values, preferably using the standard RGB Linear calibration matrix, and control returns to Procedure 570 for post-clipping processing in box 650.

Figure 37:
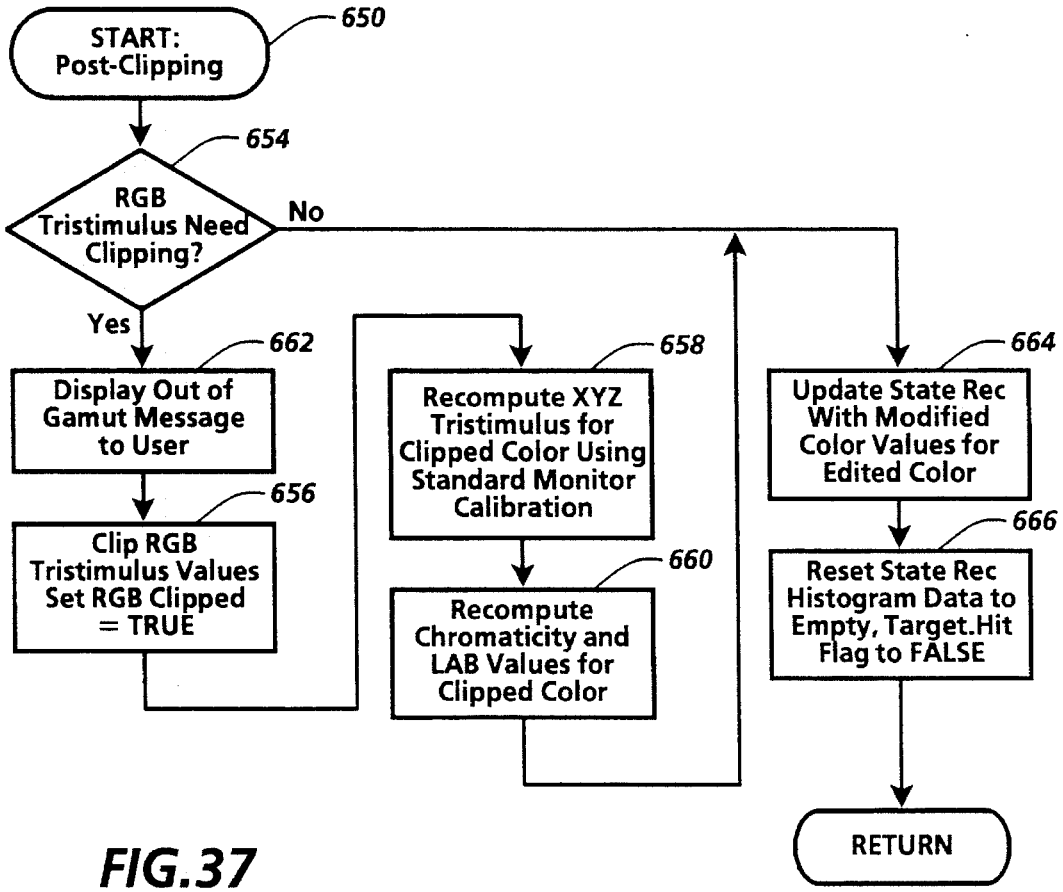
FIG. 37 illustrates in greater detail the operation of block 650 in FIGS. 33A and 33B for performing post-color-clipping operations on a modified color.

Turning now to FIG. 37, in box 654 the R, G, and B tristimulus values are each tested for a value between zero and one. Any one of the R, G, or B tristimulus values for a modified color may either be negative or greater than 1 if the original RGB signals for the color were not properly converted from a nonstandard format to the RGB Linear model or as a result of the editing or clipping procedures. In particular, because of inaccuracies in the definition of the defined gamut to which the colors are being clipped, the R, G, and B values for a resulting clipped and modified color may not be reproducible. Procedure 656 uses a conventional clipping method for clipping the RGB values to the RGB color space, if necessary, prior to obtaining the physical (phosphor gun voltage) specifications for the color. In particular in the implemented embodiment in box 656, if any R, G, or B value is negative, the minimum of the RGB values is brought to zero, and the other values are decreased by the same amount. For an R, G, or B value greater than 1, the RGB values are converted to values in the HSV (Hue, Saturation, and Value) color space using known conversions, the Saturation value is divided by the largest RGB value over 1, and the HSV values are converted back to RGB tristimulus specifications. A flag which tracks whether the RGB tristimulus values have been clipped is set to the TRUE value. If the RGB values have been clipped, the monitor calibration which converts the RGB values to the device independent XYZ tristimulus values must be applied again to the clipped RGB values, in box 658, and then, in box 660, new chromaticity and LAB color values must be computed from the XYZ tristimulus values.

In box 664, the StateRec palette record entry for the current palette of colors is updated with color values for the modified color. In box 666, other StateRec fields are reset to reflect the change in the palette and to track the completion of processing for a modified color. Control then returns to procedure 570 (FIG. 33A) where, in box 588, a flag in StateRec which tracks whether a color in the current palette has been edited, is updated to show that editing has taken place. Control is then transferred to Paint Window procedure 400 (see FIG. 17), for displaying in color space window 112 the newly edited color, together with the rest of the currently selected palette.

4. Making a Color Lighter or Darker

The lightness signal of a palette color may be adjusted separately from hue and chroma information, to make the color lighter or darker. Conceptually, in the three-dimensional color space view of FIG. 32B, this, in effect, "moves" the color from it's current lightness level, or "slice", in the gamut to another lightness level. In the illustrated embodiment, this adjustment may be made in two ways. The method which gives the user most control over the lightness is editing lightness using histogram color space 540 (FIG. 29). The user may move colors displayed in one lightness location in the histogram to another lightness location in the histogram in the same manner as described above (Part G.3.) for moving colors displayed in the other color spaces. In this manner, the relationship and grouping of the various lightness levels of palette colors can be appreciated and modified under careful user control.

The user may also adjust the lightness of a color using a second method when CIELAB color space 130 is displayed by requesting that a color be made lighter using right mouse button 38, as shown in Table 5. This method may be considered an "accelerator" method for making a quick adjustment when the user does not wish to change color spaces and display histogram color space 540. When the user requests that a color be made lighter when CIELAB color space 130 is displayed, the L* value for the selected color is incremented by 10 L* units, to a maximum of 100 L* units. When the user requests that a color be made darker, the L* value for the selected color is decremented by 10 L* units, to a minimum of 5 L* units. Color editing GUI 10, of course, also may be implemented using a different fixed lightness increment and decrement to accomplish the same purpose of changing a color's lightness signal.

Returning now to FIG. 33A, if the user's mouse request has been translated to a "Lighter" or "Darker" command, the inquiry in box 580 is satisfied and control transfers to box 582, where the target-hit flag is tested to ensure that a color in the palette has been selected with the mouse. If a color has been selected for changing lightness, the color's L* value is incremented or decremented accordingly, in box 584, and processing proceeds to boxes 586, 600, and 620 where the chroma clipping and post-clipping procedures, described above in conjunction with moving a color in the monitor gamut, are executed. Upon completion of this processing, the palette-edited flag is updated in box 588 to show that editing has taken place, and processing control transfers (via FIG. 17) to Paint Window procedure 400, where the color, with its changed lightness signal, together with the rest of the palette, will be displayed in color space window 112.

When the color space displayed is one other than CIELAB color space 130, then, when a "Lighter" or "Darker" request is received, the L* coordinate of the color converted from the displayed color space may be modified and the LAB color coordinates converted back to those of the displayed color space.

H, Detailed Process Flow: Constraining a Color Within a Gamut and Gamut Clipping As shown in FIG. 12, in the implemented embodiment of color editing GUI 10, the user may display the gamut boundaries of a color reproduction device such as a printer and manually control how each of the palette colors will reproduce on the printer by manually editing each palette color to within the boundaries of the printer device gamut. Then, gamut adjusting procedures, in cooperation with the Perform Color Editing procedure 570 described in FIGS. 33B through 37, will adjust the manually edited and modified palette color so that it is the reproducible color in the target device gamut closest to the desired modified color. These gamut adjusting procedures will not permit the user to move a color already within the target device gamut to a destination location outside the target device gamut, and will perform chroma and lightness clipping procedures to find the reproducible modified color in the target device gamut closest in lightness and chroma to the desired modified color. In the illustrated embodiment, the user may also select a colorimetrically measured monitor (display) gamut for display in color space 130 (see FIG. 11), and access the same gamut constraining and gamut clipping features of color editing GUI 10 described below in the context of printer device gamuts.

1. Constraining a Color Within a Gamut

Figure 33B:
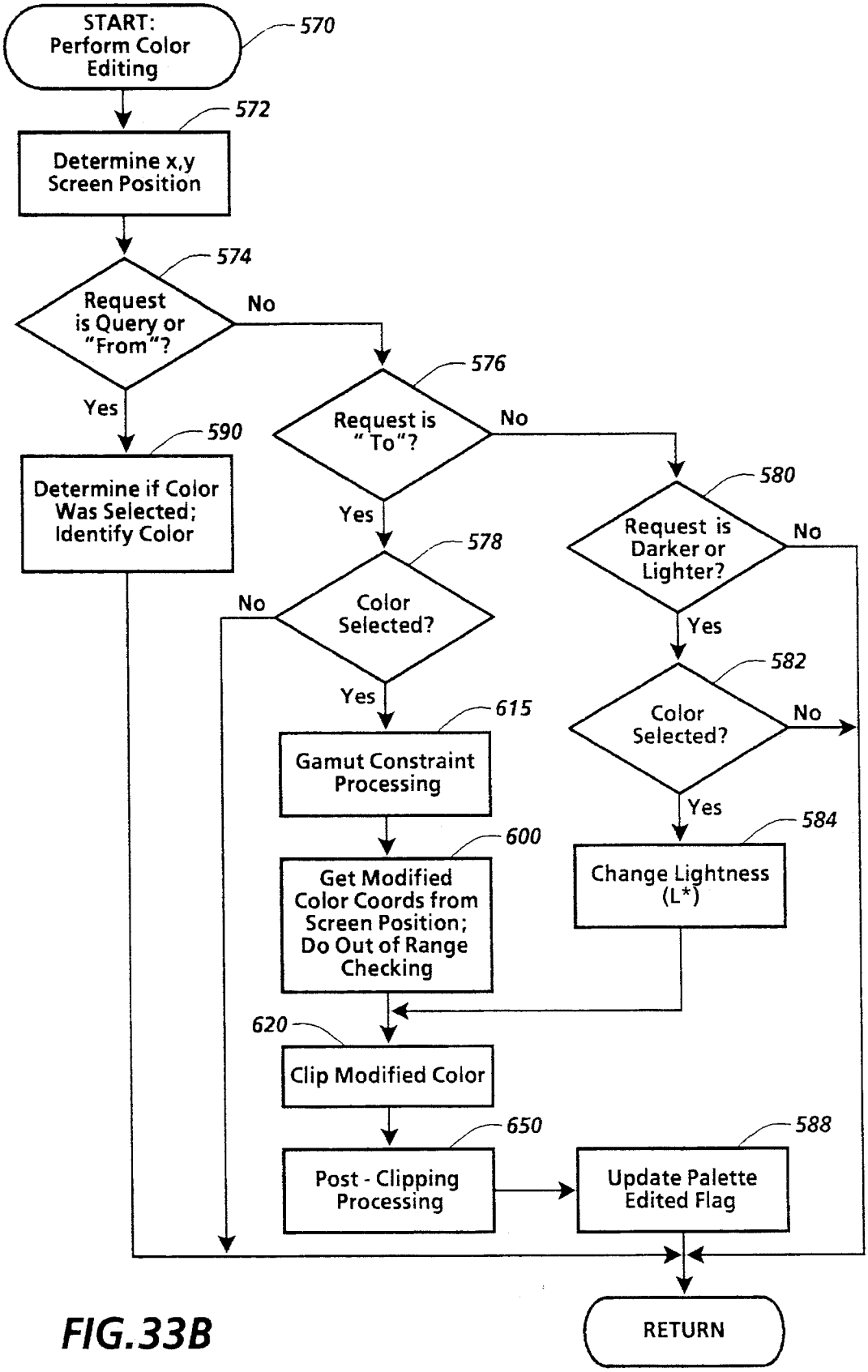

In the illustrated embodiment shown in FIG. 33B, constraint processing, in box 615, (i.e., preventing the user from moving an edited color outside the target device gamut) is executed every time the user moves a palette color. Table 5 provides the Cedar language code that accomplishes Constraint Processing 615.

TABLE 5

CONSTRAINT and INTERSECT PROCEDURES

```
Constrain: PUBLIC PROC [p: VEC, h: Hexagon] RETURNS
          [q: VEC] ~ BEGIN
    [Comment] q = p if p ⊆ h
    [Comment] q = L(p, h.center) ∩ π(h) otherwise
    i: BOOL;
    probe: Segment ~ [a:h.center, b:p];
    FOR s: [1 .. 6] in (1 .. 6] DO
        [i, q] ← Intersect [probe,[h.coords[s−1], h.coords[s]]];
        IF i THEN RETURN
        ENDLOOP;
    [i, q] ← Intersect [probe, [h.coords[6], h.coords[1]]];
    RETURN [IF i THEN q ELSE p]
    END;
Intersect: PUBLIC PROC [s1, s2: Segment] RETURNS
          [incidence: BOOL, p: VEC ← [0, 0]] ~ BEGIN
    [Comment] s1 is the probe, s1.a the center (white) and s1.b
    the cursor position.
    eps: REAL ~ 1.0/2112.0/2112.0;
    a11, a12, a21, a22, v1, v2, det, cof1, cof2, alpha, beta: REAL;
    incidence ← FALSE;
a11 ← s1.b.x−s1.a.x;   a12 ← s2.a.x−s2.b.x;   v1 ← s1.a.x−s2.a.x;
a21 ← s1.b.y−s1.a.y;   a22 ← s2.a.y−s2.b.y;   v2 ← s1.a.y−s2.a.y;
cof1 ← a12 * v2−a22 * v1;        cof2 ← a21 * v1−a11 * v2;
det ← a11 * a22−a12 * a21;
    [Comment] The hexagon is always convex → no degeneracies
    IF ABS [det] < eps THEN RETURN;
    alpha ← cof1/det;                beta ← cof2/det;
    incidence ← ((alpha > −eps) AND (alpha < = 1.0 + eps))
        AND ((beta > = −eps) AND (beta < = 1.0 + eps));
    IF incidence THEN BEGIN
        p.x ← (1.0-alpha) * s1.a.x + alpha * s1.b.x;
        p.y ← (1.0-alpha) * s1.a.y + alpha * s1.b.y
        END
```

TABLE 5-continued

| CONSTRAINT and INTERSECT PROCEDURES |
|---|
| END; |

Briefly described, the Constraint and Intersect processing of Table 5 bring an irreproducible color to the edge of the gamut by determining the shortest vector distance from the color to the gamut. The Constraint procedure receives in input field "h" the data in the StateRec field, "state.gamut-.constraint", created during the gamut trajectory processing described above in conjunction with FIGS. 24 and 26. First, a line segment is created between the x and y coordinates of the modified color and the center, or white point, of the currently selected gamut. Then a loop is executed which tests whether the line segment intersects any of the line segments making up the boundaries of the gamut. The Intersect procedure uses known graphics techniques for testing for the intersection of the line segment and one gamut boundary side, and for finding the coordinates of the intersection point. If an intersection is found, the modified color is outside the gamut. The modified color's coordinates are then replaced with the intersection coordinates and returned from the Constraint procedure, effectively clipping the modified color to the edge of the gamut boundary along a straight line to the measured gamut's reference white point. If no intersection is found, the modified color's coordinates are returned from Constraint unchanged.

For colors constrained within a gamut, color editing GUI 10 will also evaluate the modified color to ensure that the clipped color is producible in the selected gamut, using the processing described below and illustrated in Table 6.

Note that with Constraint and Intersect processing in place, when the user middle clicks only with mouse button 36 on the original color, without dragging the color with the mouse, the same sequence of code is executed as would be executed if the color had been dragged to a new destination location. Constraint and Intersect processing will result in an out-of-gamut color being moved to the edge of the gamut in the shortest distance along a line to the gamut's white point, and the subsequent color gamut clipping algorithms will ensure that the new color is reproducible in the gamut.

2. Moving a Color to Another Gamut

As noted above, the clipping algorithms used in color editing GUI for bringing an irreproducible color inside the target gamut boundary may include any suitable method for clipping the modified color to the target device gamut. Constraint processing, described above in Part H.1, brings an irreproducible color to the edge of the gamut by determining the shortest vector distance from the color to the gamut. The general chroma clipping algorithm described above in the discussion of FIG. 36A, box 622, preserves the achromatic component of the color as nearly as possible, and adjusts the chromatic component to bring the color to the edge of the gamut in such a way that hue constancy is nearly preserved. Another known method compresses, rather than clips, all the colors such that the range of input colors just fits within the range of output colors. This compression can also be done selectively and non-linearly, such that for every quantized achromatic level and hue level, the chromatic component is compressed to fit within the output range possible for the chromatic and achromatic levels while preserving hue as nearly as possible. Similar compressions can be performed as a function of saturation, lightness, hue or any other color metric.

Device gamuts defined in any suitable color space may be utilized for purposes of clipping colors to the device gamut of a target device. Preferably, the device gamut to which palette colors are to be clipped may be defined in the same color space coordinates as the color space in which the user is editing a palette of colors, and simple transformations between gamut coordinates in one color space to those in another, using color transformation equations previously defined above, may be implemented when the color space display is changed.

In the implemented embodiment, the gamut clipping method utilizes a measured target device gamut defined in CIELAB cylindrical coordinates for gamut clipping. CIELAB space defined in cylindrical coordinates is particularly advantageous to use for gamut mismatch correction. Hue information may be preserved (i.e., kept constant) by correcting chromatic and lightness information along a constant hue angle. A color's lightness may be preserved by editing on the a*, b* plane only, and clipping the chroma of any color that is invalid in the gamut for the specified lightness. Similarly, chromatic information, defined on straight lines radiating from the center achromatic axis, may be processed separately and held constant while changing lightness (L*) to find the maximum lightness to support the desired chroma.

a. Lightness Clipping in a Device Gamut

Figure 36B:
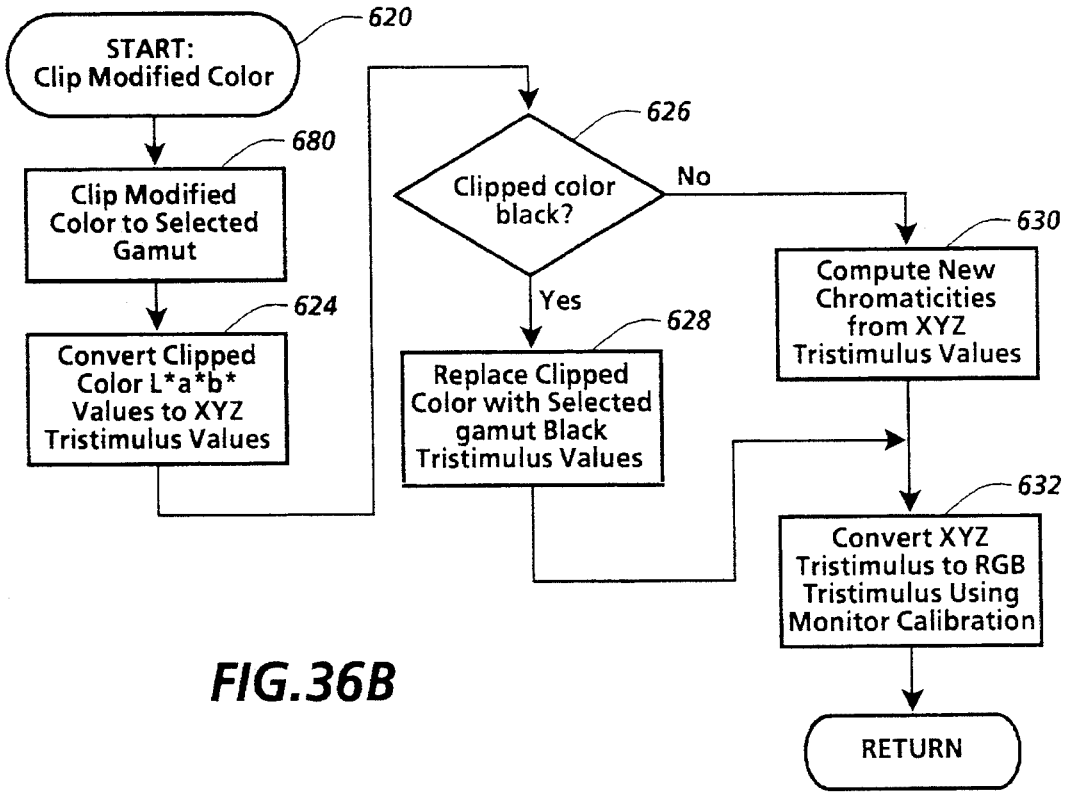

FIG. 36B illustrates processing when control transfers to box 620 to perform the clipping of the modified color in the embodiment of Perform Color Editing procedure 570 shown in FIG. 33B. With reference now to FIG. 36B, the modified color edited by the user is mapped to the target gamut in box 680 using a combination of the techniques described above. Table 6 provides the Cedar language code that accomplishes gamut clipping processing 680. Upon completion of gamut clipping processing 680, the remaining processing in procedure 620 is the same as that described above in the discussion of FIG. 36A, and control returns to Procedure 570 (FIG. 33B) for post-clipping processing in box 650.

TABLE 6

GAMUT CLIPPING PROCEDURE: CLIP LIGHTNESS
FIG. 36B, Box 680

```
ClipLightness: PUBLIC PROC [color: CIELAB] RETURNS
            [CIELAB] ~ BEGIN
    [Comment] Clips a color by constraining only the lightness.
    clipped: CIELAB ← color;
    lch: LCH ← [color.lStar,
        SqRt [color.aStar*color.aStar +
            color.bStar*color.bStar],
        ArcTanDeg [color.bStar, color.aStar]];
    IF (lch.h < 0) THEN lch.h + 360;
    IF (lch.c < 0.5) THEN RETURN [color];
    clipped.lStar ← MAX [ MIN [color.lStar,
        MaxLightness [lch]], MinLightness [lch]];
    RETURN [clipped]
    END;
```

Briefly described, the "ClipLightness" procedure ensures that the L* (lightness) level currently associated with the modified color is equal to or greater than the minimum lightness level and equal to or less than the maximum lightness level which will support the hue and chroma of the modified color in the selected target gamut. The chroma, in turn, is also iteratively evaluated at a constant hue during the processing for finding the optimum lightness level, so that the resulting clipped lightness level of the modified color supports the maximum or desired chroma for a fixed hue angle in CIELAB space.

Gamut clipping processing 680 of color editing GUI 10 may also be implemented using a software modification of that shown in Table 6 which does not result in altering the original color's lightness (L*) value. Such an implementation would be consistent with the feature of color editing GUI 10 which permits the user to manually control the lightness level in predetermined increments, as described above at Part G.4. In this implementation, when gamut clipping processing 680 discovers a color for which the lightness level will not support the desired modified hue and chroma, the processing software may display a warning message to the user and advise the user to lighten or darken the color to achieve the desired hue and chroma.

The MaxLightness procedure, used in the ClipLightness procedure of Table 6, returns the highest lightness level which supports the maximum chroma for the modified color in the gamut. Table 7 provides the Cedar language code for the MaxLightness procedure.

TABLE 7

GAMUT CLIPPING PROCEDURE: MAXLIGHTNESS

```
unknownValue: INT ~ −1;
valueCache: IntChainedHashTable.Table ←
IntChainedHashTable.Create
    [unknownValue, 149];
ValueExtrema: TYPE ~ REF ValueExtremaRep;
ValueExtremaRep: TYPE ~ RECORD [min, max: REAL ←
unknownValue];
MaxLightness: PROC [color: LCH] RETURNS
                [REAL] ~ BEGIN
    probe: LCH;          key: INT ~ Round [color.lStar] +
                         100 * Round [color.c];
    minMax: ValueExtrema ← NARROW
    [valueCache.Fetch[key].value];
[Comment] Color already seen:
    IF (minMax # NIL) AND (minMax.max # unknownValue)
    THEN RETURN [minMax.max];
[Comment] Because chroma may be out of range, test:
    color.c ← MAX [MIN [color.c, MaxChroma
    [color] − 10], 0];
    probe ← color;
    FOR I: [1 .. 19] DECREASING IN [1 .. 19] DO
        probe.lStar ← 1 * 5;
        IF (MaxChroma [probe] > = color.c) THEN BEGIN
            IF (minMax # NIL) THEN BEGIN
            [Comment] This color was already seen for minimum
                minMax.max ← probe.lStar + 2.5;
                IF NOT valueCache.Replace [key, minMax]
                THEN ERROR
                END
            ELSE BEGIN
            [Comment] This color seen for first time
                minMax ← NEW [ValueExtremaRep];
                minMax.max ← probe.lStar + 2.5;
                IF NOT valueCache.Insert [key, minMax]
                THEN ERROR
            END;
            RETURN [minMax.max]
            END
        ENDLOOP;
    ERROR
    END;
```

Similarly, the MinLightness procedure, also used in the ClipLightness procedure of Table 6, returns the lowest lightness level which supports the maximum chroma for the modified color in the gamut. Table 8 provides the Cedar language code for the MinLightness procedure.

TABLE 8

GAMUT CLIPPING PROCEDURE: MINLIGHTNESS

```
MinLightness: PROC [color: LCH] RETURNS
                [REAL] ~ BEGIN
    probe: LCH;          key: INT ~ Round [color.lStar] +
                         100 * Round [color.c];
    minMax: ValueExtrema ← NARROW
    [valueCache.Fetch[key].value];
[Comment] Color already seen:
    IF (minMax # NIL) AND (minMax.min # unknownValue)
    THEN RETURN [minMax.min];
[Comment] Because chroma may be out of range, test:
    color.c ← MAX [MIN [color.c, MaxChroma
    [color] − 10], 0];
    probe ← color;
    FOR I: [1 .. 19] IN [1 .. 19] DO
        probe.lStar ← 1 * 5;
        IF (MaxChroma [probe] > = color.c) THEN BEGIN
            IF (minMax # NIL) THEN BEGIN
            [Comment] This color was already seen for minimum
                minMax.min ← probe.lStar − 2.5;
                IF NOT valueCache.Replace [key, minMax]
                THEN ERROR
                END
            ELSE BEGIN
            [Commnet] This color seen for first time
                minMax ← NEW [ValueExtrmeRep];
                minMax.min ← probe.lStar − 2.5;
                IF NOT valueCache.Insert [key, minMax]
                THEN ERROR
            END;
            RETURN [minMax.min]
            END
        ENDLOOP;
    ERROR
    END;
```

Both the MinLightness and MaxLightness procedures utilize a cache to store minimum and maximum lightness values already found, in order to improve processing speed. If the value is not already in the cache, processing continues with a call to procedure MaxChroma. Both the MinLightness and MaxLightness procedures invoke the MaxChroma procedure to ensure that the modified color's chroma is valid for the original L* level of the color, prior to clipping the lightness level. The MaxChroma procedure, described in more detail below, returns the minimum of the maximum chroma or the actual chroma, for the color in the gamut closest to the desired modified color.

The returned chroma value from the MaxChroma procedure is further processed by ensuring that the chroma value is never less than zero, and that the chroma value is clipped to the minimum of the actual chroma for the color and the maximum gamut chroma minus ten (10). When the actual chroma for the modified color is greater than the maximum chroma supported by the device gamut for the closest measured point in the gamut, the actual chroma value is clipped to this maximum chroma value minus 10, to ensure that the chroma of the modified color is well within the gamut at the closest measured point. Thus, the constant ten (10) represents a judgment as to how far to clip the actual chroma into the gamut and may account for irregularities in the gamut shape that are not accounted for by the color gamut measurements taken; for a color with a chroma well within the gamut (i.e., less than the maximum chroma minus 10) the actual chroma is preserved. Those skilled in the art will recognize that the lightness clipping functions may be implemented with a different constant value for clipping the chroma, depending on the results of the clipping algorithms, the particular device gamut measured, or other factors. The chroma value for the modified color resulting from this post-MaxChroma processing is hereafter called the "processed chroma".

The processed chroma is then used as the chroma for the color that is used as the "probe" into the gamut for finding the maximum (and minimum) lightness. The MaxLightness "probe" loop consists of starting at the highest L* level of the defined device gamut, and finding the maximum chroma at that lightness level for the current hue angle. If the maximum chroma at that lightness level is greater than the processed chroma, the lightness level which produced this higher maximum chroma is incremented by 2.5, and is returned as the quantity known as "max lightness"; if the max chroma at that lightness level is not greater than the processed chroma, that lightness value cannot support the processed chroma in the gamut, so the loop is executed again. The loop index is decremented by 1, the next lowest L* level is computed, and the maximum chroma is again found at that lightness level for the current hue angle. The comparison between the maximum chroma at this next lowest lightness level and the processed chroma is again made, and, if the maximum chroma at that lightness level is greater than the processed chroma, the lightness level which produced this higher maximum chroma is incremented by 2.5, and is returned as the quantity known as "max lightness". The loop continues until the comparison is satisfied, or all L* levels have been exhausted. The processing for the MinLightness procedure is similar; the L* levels of the gamut are explored from the minimum to the maximum level to find the minimum lightness level which will support the processed chroma.

b. Chroma Clipping in a Device Gamut

Table 9 contains the Cedar language code for a simple chroma clipping procedure.

TABLE 9

GAMUT CLIPPING PROCEDURE: MAXCHROMA

```
fineGamut: ARRAY [1 .. 19] OF Exintagon;
Exintagon: TYPE ~ ARRAY [1 .. 60] OF VEC;
MaxChroma: PROC [color:LCH] RETURNS [REAL] ~
            BEGIN
    [Comment] Assume that the gamut is regularly sampled, i.e.,
    there is a meridian every 6° and a circle of latitude every
    5 jnd. Find the closest coordinate in the sampled gamut.
    pos: VEC;
    latitude: INTEGER ~ MAX [MIN [Round
    [color.lStar / 5.0] 19], 1];
    meridian: CARDINAL ← Round [ color.h / 6.0];
    IF meridian = 0 THEN meridian ← 60;
    pos ← fineGamut[latitude][meridian];
    RETURN [SqRt [pos.x*pos.x + pos.y*pos.y]]
END;
```

The data structure utilized for storing the measured colors of the device gamut is a 19 (Lstar level) by 60 (hue angles) array of valid a*,b* points in the gamut. The input L* value is divided by 5 and the result used as the L* level (latitude) index into the gamut array. The software insures that the index is always between valid indices 1 and 19. The hue angle for the modified color is divided by 6 to get the second (meridian) index into the gamut array. If the hue angle is zero, the index is set to 60, the last entry in the array, at hue=360 degrees. The measured gamut point closest to the modified color is then retrieved from the array using these indices, and the chroma is computed for that point in the gamut.

Those skilled in the art will recognize that the chroma clipping function described above may be implemented with a different number of meridians, depending on the accuracy required or desired. Further, it will be recognized that the accuracy of gamut clipping processing 680.is influenced by a number of factors. The number of measured colors used to construct the target gamut data structure will determine how closely the modified color will be to a measured point in the gamut. Color editing GUI 10 may be implemented with any suitably defined gamut, and is not limited to the 19 by 40 or 19 by 60 fineGamut arrays described earlier. In addition, the method used in the MaxChroma procedure to find the measured point in the gamut closest to the user's desired modified color will also affect the accuracy of the final clipped modified color. For example, a gamut clipping approach based on known graphics techniques may be used to compensate for some of the irregularities in the gamut between lightness levels that are not otherwise reflected in the measured gamut. It is to be understood that any suitable method for gamut clipping may be used by color editing GUI 10 to accomplish the manual gamut clipping function provided.

I. CONCLUSION

In recapitulation, the graphical user interface, system and method of the present invention improve the user's ability to specify and control the colors in display and print images having a variety of purposes and information content. The display of an entire palette of colors during color editing enables the user to preserve color relationships among palette colors in order to preserve information or aesthetic content, as needed, in a display or print document or image. Manual placement of colors in the output hardcopy device gamut permits the user to directly control and predict color appearance to achieve consistent and appropriate colors in the display or print image. The ability to easily change between several color spaces for editing supports a broad range of users with varying color usage and graphic arts experience levels.

In the illustrated embodiment, color editing GUI 10 takes advantage of the more predictable and easily perceived relationships among colors in the uniform CIELAB color space. The color editing mechanism is based on simple physical movements in a two dimensional graphical frame of reference. The graphical color space is based on a color model with enhanced visual uniformity in which equal physical distances along any given dimension of either hue, value (or lightness), or chroma represent nearly equally perceived color differences. Internal, device independent colorimetric representation and gamut clipping of colors provides a consistent and accurate color specification that preserves the intended color appearance of the color palette and minimizes color appearance differences when colors are produced on color devices with different color reproduction technologies.

In addition to being implemented as a complete graphical user interface for color editing as described in the illustrated embodiment, the inventive concept of moving colors in a uniform color space in order to modify them and to place them in another device gamut may be implemented in a variety of color systems. The use of palettes of colors stored in external memory by the GUI, system and method of the present invention, permits the color editing features described herein to be used in combination with other color selection software systems or graphics or illustration software for fine tuning colors selected using those systems and for enhancing the functionality of those systems. Examples of such color selection software systems are those described in copending applications by the same inventor and assigned to Xerox Corporation, entitled "Functional Color Selection System", Ser. No. 07/677,682, now issued as U.S. Pat. No. 5,311,212, and "Reference Color Selection System", Ser. No. 07/677,706 now issued as U.S. Pat. No. 5,254,978.

It is therefore evident that there has been provided in accordance with the present invention, a graphical user interface, a system and a method for color editing that fully satisfy the objects, aims, and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

TABLE A.1

APPENDIX A
Menu & Function Selection

| Function Selection | | |
|---|---|---|
| Menu Entry | Mouse Button (MB) and/or Keyboard (KEY) | Color Editing Functions |
| Save | Left MB | Saves the current palette of colors displayed in color space 130 (FIG. 9) in the PaletteRec data structure (see Table A.2). |
| Zoom | Left MB = Zoom In Right MB = Zoom Out | Enlarges or Reduces a designated portion of color spacedisplay window 112 where cursor is currently positioned; permits closer inspection of colors displayed. |
| Reset | Left MB | Sets window view to original size and top position after user has scrolled or zoomed color space display window 112. |
| Color Space | See TABLE 1 | See TABLE 1 and discussion accompanying FIGS. 5–7. |
| Gamuts | Left MB | Presents second menu line containing list of device names for gamuts available for display in color space 130; when the user selects list item, gamut boundary is displayed in color space 130. See discussion accompanying FIGS. 10–12. |
| Calibration | Left MB | Presents second menu line containing list of device names for gamuts available for rough prediction of colors of currently displayed palette. Featrue is described in copending application by inventor herein, Serial No. |
| Palettes | Left MB | Presents second menu line containing a list of color palette names available for editing in color space 130; when the user selects a list item, the input data file of colors identified by that name is displayed in color space 130. See FIGS. 8A, 8B, and 9, and accompanying discussions. |
| Grab | Left MB + SHIFT KEY Right MB + SHIFT KEY | Retrieves color palette data from color map of concurrently executing illustrator or graphics software program, via interface data structure; permits direct modification of colors in image or illustration; |
| Print | Left MB | Prepares a print file of current illustration; from currently displayed palette colors; routes to network printer. |
| | Middle MB | Prepares a print file of tabular display of every color in color map; routes to network printer. |
| | Right MB | Prepares a print file of tabular display of current palette colors from colors currently displayed; routes to network printer. |
| Stop | Left MB | Stops the current function from being completed; useful in cases where the user has inadvertently invoked a computationally expensive function. |
| (None) | Various Mouse Button Commands and Key Combinations as | Edit color by moving color to new location; change color lightness value; identify color; see Table 4 and discussion accompanying FIGS. 33A and 33B. |

TABLE A.2

Palettes Data Structure
Palette Data

| StateRec | | |
|---|---|---|
| Field name | Data Structure | Data Description |
| Palettes | Array of PaletteRec | Array size determined by number of external memory resident files of palette colors available for editing; in illustrated embodiment, Palettes array holds up to 14 palettes. |
| PaletteRec: | Record | color palette information for color editing, retrieved from external file |
| Duplicates | List | index, tag, and UserData for duplicate color entries removed from ColorCoords field of PaletteRec; |
| Edited | Boolean | Flag signalling whether this palette has been edited; initialized to FALSE; |
| gamma | Real | gamma correction factor for RGB values from external file, if any; |
| h | Array of Class; array size determined by program | each instance of Class contains integer values corresponding to indices into palette[s].col array of palette of colors; used for production of histogram color space; see FIGS. 29–31 and accompanying discussion for histogram color space processing details; |
| Class | Record - variably sized, of integers; | Contains indices of palette[s].col array which belong to eachL* level, for histogram display; also contains "size" of record, computed during processing; |
| col | Variable array of ColorCoords | holds palette color data; number of colors in each palette, and number of entries in array, computed during procedure for building ColorCoords; stored as tag field in |

TABLE A.2-continued

Palettes Data Structure
Palette Data

StateRec

| Field name | Data Structure | Data Description |
|---|---|---|
| | | array; |
| ColorCoor | Record | elements of col array; each record contains processing data for one color in the palette; |
| tag | Int. | identifier field of location of color in original file from which palette is derived; |
| userDa | char. | identifying character data found in original file from which palette is derived; |
| tris | record, real | RGB tristimulus values for original color, derived by dividing RGB phosphor gun voltage step levels by 255. |
| chr | record, real | x,y chromaticities of color, converted from XYZ tristimulus values derived from RGB-to-XYZ monitor calibration conversion in calData.calibration; |
| lab | record, real | CIELAB values converted from XYZ tristimulus values using equations (5), (6), (7): |
| lstar | real | L* value, calculated from Eq. (5); |
| astar | real | a* value, calculated from Eq. (6); |
| bstar | real | b* value, calculated from Eq. (7). |
| currPal | integer | identifies which PaletteRec in array of Palettes is currently being edited; |
| target | Record | tracks whether user, via the mouse, has selected a color on the screen in the current palette; |
| hit | Boolean | TRUE if color has been selected, else FALSE; |
| index | Integer | index (entry) of col array identifying the color selected by mouse when target.hit = TRUE; |

TABLE A.3

Palettes Data Structure -
Color Space and Gamut Data

StateRec

| Field name | Data Structure | Data Description |
|---|---|---|
| space | Char. | name of currently displayed color space, selected from list of valid names: xYZ = 1931 Chromaticity Diagram; metric = 1976 USC Diagram; cIELAB = CIEL*a*b* space; cIELABlStar = Histogram display of colors by L*; |
| spectrum-Locus | Window manager and graphics structure | contains graphic trajectory information needed to draw spectrum locus; uses data from spectrum locus coordinates array (Table A.5 below) for plotting points in trajectory; see |
| gamut | Record | graphics information for plotting and drawing device gamut in color space display window; |
| imager | Window manager and graphics | contains starting location and line segments needed by the window manager and graphics software to |

TABLE A.3-continued

Palettes Data Structure -
Color Space and Gamut Data

StateRec

| Field name | Data Structure | Data Description |
|---|---|---|
| | | draw the gamut boundary outline in the color space display window; |
| constraint | Record | the x,y screen coordinates for plotting gamut in the window |
| center | Vector | x,y screen coordinates for white point of gamut boundary; |
| coords | Array of Vectors | Array of x,y screen coordinates for locating gamut boundary vertices; size depends on number of colors |
| gamutData | Record | Color information data about a gamut needed for editing colors within a gamut boundary; |
| type | Char | Valid device type name; |
| coords | Array of real numbers | Array of X,Y,Z tristimulus values for measured gamut boundary colors; size depends on number of colors |

TABLE A.4

Palettes Data Structure -
Calibration and Window Manager Data

StateRec

| Field name | Data Structure | Data Description |
|---|---|---|
| calData | Record | contains calibration data, transformations for selected calibrated monitor; |
| calibration | Record | contains measured device data, calibrations transformations; |
| data | Record | contains measured device data |
| type | Char | device name; |
| red | Record of x,y - Real | measured x,y chromaticity for primary red; |
| green | x,y - Real | measured x,y chromaticity for primary green; |
| blue | x,y - Real | measured x,y chromaticity for primary blue; |
| white | x,y - Real | measured x,y chromaticity for device reference white; |
| YMax | real | maximum measured Y (luminance) tristimulus value for reference white; |
| matrix - RGBtoXYZ | Array | array of real numbers forming a conversion matrix to transform normalized RGB color signals to XYZ tristimulus values for user's monitor: |
| matrix - XYZtoRGB | Array | array of real numbers forming a conversion matrix to transform XYZ tristimulus values to normalized RGB color signals for display on user's monitor: |
| white | Record - real | X,Y,Z tristimulus values for calibrated monitor's white point; |
| black | Record - real | X,Y,Z tristimulus values for calibrated monitor's black point. |
| Window Manager Data Areas | Various structures | Collection of fields needed by window manager for producing color space, palette, and gamut data in color space display window. |

TABLE A.5

| Miscellaneous Data Structures | | |
|---|---|---|
| Data Element | | |
| Item | Structure | Description/Source |
| 1. Measured Printer Gamut Data | 6 × 3 array of reals numbers, for each printer device gamut | For each device, the six rows or elements of the array correspond to the colorimetrically measured colors Cyan, Blue, Magenta, Red, Yellow, and Green primary colors, respectively, of the device; each row contains x,y chromaticity and Y liminance values measured for that color. For more accurate display of gamut boundaries, additional device colors may be color-imetrically measured and included |
| 1. Measured Monitor Gamut Data | table for each monitor device | For each device, the color-imetrically measured x,y chromaticities of the Red, Green, Blue primary colors, and the reference white, and the measured maximum luminance, Y, of the reference white of the device; |
| 2. Spectrum Locus Coordinates | 89 × 3 array | The x,y,z chromaticities, according to the 1964 10° Observer, of the spectrum (monochromatic) colors, according to their wave-lengths in nanometers, for selected wavelengths between 380 and 700 nm. The chromaticities may be found in Wyszecki, G. and Stiles, W. S., Color Science: Concepts and Methods, Quantitative Data and Formulae, 2nd. ed., John Wiley & Sons, 1982, Table I (3.3.2) at pp. 738–747. In the illustrated embodiment, 89 wavelengths in this range were selected, but any suitable number that provide sufficient plotting points may be selected. |
| 3. Graphic Color Spaces Representatio | Program instructions. | Instructions and values needed to draw the coordinate systems of the color spaces available for display in the color space window, provided as procedure in program code. |
| 4. Gamut Data Structure for Gamut Clipping | 19 × 40 array | For performing gamut constraining and gamut clipping processing; contains CIELAB data about measured gamut boundaries; each of the 19 major entries represents a lightness (L*) level; each pair of a*,b* entries for that lightness level represents a color value for every 9 degrees of hue in CIELAB cylindrical coordinates. |

What is claimed is:

1. A processor-controlled system for modifying a plurality of colors, each color being represented by a set of color information signals;

said processor-controlled system comprising a display device for displaying the plurality of colors;

an input device for receiving input signals from a system user;

a processor connected for receiving said input signals from said input device and for providing the color information siqnals representing each of the plurality of colors to said display device; and a memory device for storing data therein; the data stored in the memory device including the color information signals representing the plurality of colors and data indicating instructions the processor executes;

the processor being further connected for accessing the instruction data stored in the memory device; the processor executing the instructions indicated by the instruction data; the processor, in executing the instructions, presenting on said display device a graphical representation of a color space; the graphical representation of said color space including a graphical representation of each respective color of the plurality of colors; the graphical representation of each color being presented in a current location in said color space having coordinates determined from the set of color information signals representing each respective color;

the processor, further in executing the instructions, receiving said input signals from said input device indicating a movement action by the system user moving the graphical representation of one color of the plurality of colors from said current location to a destination location in said color space;

the processor, further in executing the instructions, responding to said input signals indicating the movement action by determining from color space coordinates of said destination location a set of modified color information signals representing a modified color;

presenting on said display device a graphical representation of said modified color in the destination location in said color space; and storing the set of modified color information signals representing the modified color in the memory device.

2. The processor-controlled system of claim 1 wherein the set of color information signals for each color includes a lightness signal, and wherein the processor, further in executing the instructions, receives a second input signal from said input device indicating a lightness modifying request by the system user; the lightness modifying request including a selected one of the plurality of colors; the processor, in response to said second input signal, changing said lightness signal of the selected color to produce said set of modified color information signals.

3. The processor-controlled system of claim 2 further wherein the data stored in the memory device further includes a plurality of colorimetrically measured colors representing a display gamut of colors reproducible by said display device, and wherein the processor, further in executing the instructions, adjusts said set of modified color information signals representing said modified color in said graphical representation of said color space to produce a reproducible color in said display gamut using said display gamut of colors stored in the memory device.

4. The processor-controlled system of claim 8 wherein the processor, further in executing the instructions, receives a third input signal from said input device indicating a selected color space display request by the system user; said selected color space being selected by the system user from a plurality of color spaces; the processor, in response to said third input signal, presenting a graphical representation of said selected color space on said display device; the graphical representation of said selected color space including a graphical representation of each respective color of the plurality of colors.

5. The processor-controlled system of claim 4 wherein one of said plurality of color spaces is a lightness frequency distribution color space, and wherein, when the selected color space is the liqhtness frequency distribution color space, the processor, further in executing the instructions, presents the graphical representation of each of the plurality of colors according to said lightness signal thereof in said lightness frequency distribution color space.

6. The system of claim 4 wherein said selected color space selected by the system user is a uniform color space.

7. A method for modifying the appearance of a plurality of colors in a color display system having input signal receiving means for receiving signals from a user, a display device, and a memory for storing a set of color information signals corresponding to each color of the plurality of colors, the method comprising the steps of:

drawing on the display device a graphical representation of a colorspace;

plotting the plurality of colors in said color space, each color being plotted in a current location in said color space, said current location having coordinates defined by the set of color information signals of each color of the plurality of colors;

modifying any one of the plurality of colors in response to signals received from the input signal receiving means, said modifying step including the step of moving the one color from said current location to a destination location in said color space, said destination location having coordinates defining a set of modified color information signals representing a modified color in said color space; and storing said set of modified color information signals in the color display system memory.

8. The method of claim 7 wherein the set of color information signals of each color includes a lightness signal, and wherein said modifying step further includes a lightness modifying step of modifying said lightness signal, in response to at least one of said input signals, to produce said set of modified color information signals.

9. The method of claim 7 further including the steps of colorimetrically measuring a plurality of colors representing the gamut of reproducible colors of the display device; and storing said display gamut in the color display system memory;

and wherein said modifying step further includes adjusting said set of modified color information signals representing said modified color to represent a reproducible color in said display gamut.

10. The method of claim 7 wherein said color space is a uniform colorspace.

11. The method of claim 7 further including, prior to the step of drawing on the display device the graphical representation of the color space, selecting said color space for display on the display device from a plurality of color spaces in response to at least one of the input signals; said drawing step thereby drawing the graphical representation of said selected color space on the display device; said plotting step thereby plotting the plurality of colors in said selected color space.

12. The method of claim 11 wherein the set of color information signals for each color includes a lightness signal;

one of said plurality of color spaces is a lightness frequency distribution color space; and when said selected color space is the lightness frequency distribution color space, the step of plotting the plurality of colors in said selected color space further includes plotting the plurality of colors according to said lightness signal thereof in said lightness frequency distribution color space.

* * * * *